(12) United States Patent
Zhang et al.

(10) Patent No.: US 12,458,363 B2
(45) Date of Patent: Nov. 4, 2025

(54) CLIP DEVICES, CLIP APPARATUSES, AND METHODS FOR UNLOCKING OF CLIP DEVICES

(71) Applicant: HANGZHOU AGS MEDTECH CO., LTD., Zhejiang (CN)

(72) Inventors: Cheng Zhang, Hangzhou (CN); Baiming Shi, Hangzhou (CN); Chao Yan, Hangzhou (CN); Feng Yao, Hangzhou (CN)

(73) Assignee: HANGZHOU AGS MEDTECH CO., LTD., Hangzhou (CN)

( * ) Notice: Subject to any disclaimer, the term of this patent is extended or adjusted under 35 U.S.C. 154(b) by 195 days.

(21) Appl. No.: 18/350,766

(22) Filed: Jul. 12, 2023

(65) Prior Publication Data

US 2023/0346386 A1    Nov. 2, 2023

Related U.S. Application Data

(63) Continuation of application No. PCT/CN2022/071679, filed on Jan. 12, 2022.

(30) Foreign Application Priority Data

Jan. 13, 2021 (CN) .......... 202110043045.7
Jul. 30, 2021 (CN) .......... 202110874523.9

(51) Int. Cl.
*A61B 17/122* (2006.01)
*A61B 17/128* (2006.01)
*A61B 17/00* (2006.01)

(52) U.S. Cl.
CPC ...... *A61B 17/1222* (2013.01); *A61B 17/1285* (2013.01); *A61B 2017/00477* (2013.01)

(58) Field of Classification Search
CPC . A61B 17/122; A61B 17/1285; A61B 17/083; A61B 17/10; A61B 17/1227; A61B 2017/00477

See application file for complete search history.

(56) References Cited

U.S. PATENT DOCUMENTS

2016/0242778 A1   8/2016   Xu et al.
2016/0367258 A1   12/2016  Jin et al.
(Continued)

FOREIGN PATENT DOCUMENTS

CN   102626335 B   4/2014
CN   204909551 U   12/2015
(Continued)

OTHER PUBLICATIONS

First Examination Report in Australian Application No. 2022208119 mailed on Jun. 6, 2024, 2 pages.
(Continued)

*Primary Examiner* — Ryan J. Severson
(74) *Attorney, Agent, or Firm* — METIS IP LLC

(57) ABSTRACT

The present disclosure provides a clip device. The clip device may include a clip and a storage tube. The clip may include clip arms including a first clip arm and a second clip arm; the storage tube including a channel, a proximal end of the first clip arm, and a proximal end of the second clip arm being stowable within the channel; the clip being capable of being switched from a locked state to an unlocked state; wherein in the locked state, the distal end of the first clip arm and the distal end of the second clip arm are closed and the storage tube restricts a movement of the clip relative to the storage tube toward the distal end of the first clip arm and the distal end of the second clip arm; in the unlocked state, a movement restriction of the clip by the storage tube is
(Continued)

released and the distal end of the first clip arm and the distal end of the second clip arm are able to be reopened.

20 Claims, 60 Drawing Sheets

(56) References Cited

U.S. PATENT DOCUMENTS

| | | |
|---|---|---|
| 2018/0085122 A1 | 3/2018 | Ryan et al. |
| 2019/0231353 A1 | 8/2019 | Saenz Villalobos et al. |
| 2020/0008811 A1 | 1/2020 | Itoh et al. |
| 2020/0113568 A1 | 4/2020 | Tsuchiya et al. |
| 2020/0113573 A1 | 4/2020 | Shi |

FOREIGN PATENT DOCUMENTS

| | | |
|---|---|---|
| CN | 208355513 U | 1/2019 |
| CN | 208640801 U | 3/2019 |
| CN | 110037756 A | 7/2019 |
| CN | 112135572 A | 12/2020 |
| WO | 2019205332 A1 | 10/2019 |

OTHER PUBLICATIONS

The Extended European Search Report in European Application No. 22739065.5 mailed on Apr. 26, 2024, 9 pages.
International Search Report in PCT/CN2022/071679 mailed on Apr. 13, 2022, 7 pages.
Written Opinion in PCT/CN2022/071679 mailed on Apr. 13, 2022, 7 pages.

C-C

CLIP DEVICES, CLIP APPARATUSES, AND METHODS FOR UNLOCKING OF CLIP DEVICES

CROSS-REFERENCE TO RELATED APPLICATIONS

This application is a continuation of International Application No. PCT/CN2022/071679, filed on Jan. 12, 2022, which claims priority to Chinese Application No. 202110043045.7 filed on Jan. 13, 2021, and priority to Chinese Application No. 202110874523.9 filed on Jul. 30, 2021, the contents of each of which are incorporated herein by reference.

TECHNICAL FIELD

The present disclosure relates to the field of a medical device, in particular to a clip device, a clip apparatus, and a method for unlocking a clip device.

BACKGROUND

The biological gastrointestinal tract often bleeds due to various diseases or accidental injuries or injuries after endoscopic treatment, and active bleeding can be treated by mechanical compression with hemostatic clips to stop bleeding. The mechanical compression of hemostatic clips is more reliable for the treatment of active bleeding not caused by varicose veins and has also been recognized by physicians and patients. The hemostatic clips also provide a degree of closure of mucosal injuries in the gastrointestinal tract to promote wound healing. However, once the clip device is locked, a locking relationship cannot be lifted without damage, and can only be removed by violent destruction, forcing a clipping part to be forcibly separated from the tissue, which can cause secondary tissue injury or re-bleeding.

Therefore, it is necessary to propose a clip device, a clip apparatus, and a method for unlocking a clip device, which can solve the problem that the locking relationship is removed by only violent damaged after the clip is locked.

SUMMARY

An aspect of the present disclosure provides a clip device, comprising: a clip and a storage tube, the clip including clip arms, the clip arms including a first clip arm and a second clip arm, a distal end of the first clip arm and a distal end of the second clip arm being for ligation; the storage tube including a channel, a proximal end of the first clip arm, and a proximal end of the second clip arm being stowable within the channel; the clip being capable of being switched from a locked state to an unlocked state; wherein in the locked state, the distal end of the first clip arm and the distal end of the second clip arm may be closed and the storage tube may restrict a movement of the clip relative to the storage tube toward the distal end of the first clip arm and the distal end of the second clip arm; in the unlocked state, a movement restriction of the clip by the storage tube may be released and the distal end of the first clip arm and the distal end of the second clip arm are able to be reopened.

In some embodiments, the clip may include a locked portion, the locked portion being connected with the clip arms; the storage tube may include an outer wall and a locking portion, the locking portion being restricted in movement relative to the outer wall toward the distal end of the first clip arm and the distal end of the second clip arm; the locking portion may cooperate with the locked portion to cause the storage tube to form the movement restriction on the clip when the clip is in the locked state.

In some embodiments, the termination of a cooperation relationship between the locked portion and the locking portion may cause the termination of the movement restriction of the clip caused by the storage tube and the clip may be switched from the locked state to the unlocked state.

In some embodiments, deformation, breakage, or displacement of the locking portion may cause the termination of the cooperation relationship between the locking portion and the locked portion.

In some embodiments, the locking portion may include a shrapnel, the shrapnel including a first end, a second end, and a third end, the first end being connected with the outer wall of the storage tube, the second end being provided at a proximal end of the first end, the third end being provided at a distal end of the first end, the second end forming the locking portion.

In some embodiments, when the clip is in the locked state, the second end may extend inside the channel and the third end may extend outside the outer wall; and when the clip is switched from the locked state to the unlocked state, the second end may extend outside the outer wall and the third end may extend inside the channel.

In some embodiments, deformation, breakage, or displacement of the locking portion may cause the termination of the cooperation relationship between the locking portion and the locked portion.

In some embodiments, the locked portion may include a connecting pin, the connecting pin being connected with the clip arms; compression of the connecting pin by a force in a radial direction of the storage tube may cause the termination of the cooperation relationship between the locking portion and the locked portion.

In some embodiments, the connecting pin may include a movable end and a spring connected with the movable end, the movable end being forced to compress the spring in the radial direction of the storage device such that a radial dimension of the connecting pin is less than a distance of the locking portion.

In some embodiments, the clip arm s may include protrusions provided at proximal ends of the clip arms, the protrusions constituting the locked portion; the protrusions being forced to displace in the radial direction of the storage tube such that the cooperation relationship between the locked portion and the locked portion is released.

In some embodiments, the protrusions may include a first protrusion provided at the proximal end of the first clip arm and a second protrusion provided at the proximal end of the second clip arm, the first protrusion and the second protrusion being radially distant from each other; the storage tube may be provided with a locking slot, the locking slot constituting the locking portion; the first protrusion and the second protrusion, when extended into the locking slot, may cause the locking portion and the locked portion to cooperate with each other; the first protrusion and the second protrusion, when withdrawn from the locking slot, may cause the termination of the cooperation relationship between the locking portion and the locked portion.

In some embodiments, the clip arms may further include a sliding slot and the storage tube may further include a pin, the sliding slot being slidably connected with the pin.

In some embodiments, the storage tube may be further provided with an unlocking portion abutting the locked portion, the termination of the cooperation relationship between the locked portion and the locking portion may be caused by a force of the unlocking portion.

In some embodiments, the unlocking portion may include a shrapnel provided on the outer wall; the shrapnel and the protrusions may be butted against each other, and the shrapnel may be forced to drive the protrusions to deflect, in the radial direction of storage tube toward an inner side of the channel, causing the termination of the cooperation relationship between the locked portion and the locking portion.

In some embodiments, the outer wall may be provided with a slot, the slot extending along an axial direction of the storage tube; the shrapnel may include a fixed end and a free end, the fixed end being fixedly connected with the outer wall, the free end being provided along the slot; the free end being deflectable in the radial direction of the storage tube relative to the fixed end.

In some embodiments, the free end may be provided with a butt portion extending radially curved toward an interior of the channel, the butt portion being, in the radial direction of the storage tube, deflectable within the locking slot or deflectable outside of the locking slot.

In some embodiments, the storage tubes may include a first storage tube and a second storage tube, a distal end of the second storage tube being sleeved to a proximal end of the first storage tube; the unlocking portion being provided in the first storage tube and the locking slot being provided in the second storage tube.

In some embodiments, the locking portion may include a pin provided in the storage tube, the pin running in the radial direction of the storage tube through the storage tube; the clip arms may include a sliding slot, the sliding slot being slidably connected with the pin; the locked portion may include an elastic blocking member provided in a path of the sliding slot.

In some embodiments, the elastic blocking member may be forced to deflect to cause termination of the cooperation relationship between the locked portion and the locking portion.

In some embodiments, the pin may be forced to compress in the radial direction of the storage tube away from the storage tube to cause the termination of the cooperation relationship between the locked portion and the locked portion.

In some embodiments, the clip may include a tie rod and a linkage structure, the linkage structure being connected with the proximal end of the clip arms, the tie rod being connected with a proximal end of the linkage structure; the linkage structure driving the clip arms to close when the tie rod drives the linkage structure to move from the distal ends of the clip arms to the proximal ends of the clip arms.

In some embodiments, the locked portion may be provided at the proximal end of the linkage structure.

In some embodiments, a connection relationship between the locked portion and the clip arms may be released such that the movement restriction of the storage tube to the clip is released.

In some embodiments, deformation, breakage or displacement of the clip arms by a force may cause the termination of the connection relationship between the locked portion and the clip arms.

In some embodiments, the clip may include a connecting pin, the first clip arm and the second clip arm being connected by the connecting pin or a proximal end of the first clip arm and a proximal end of the second clip arm forming an accommodation space, the connecting pin extending in the radial direction of the storage tube through the accommodation space, one end of the connecting pin forming the locked portion, or both ends of the connecting pin forming the locked portion.

In some embodiments, a portion of the clip arms disposed on a proximal side of the connecting pin may constitute a first connecting portion, the clip and the locked portion forming a connection relationship through the first connecting portion; deformation, breakage or displacement of the first connecting portion by a radial squeezing force toward an inside of the channel to which the first connecting portion is subjected may cause the termination of the connection relationship between the clip and the locked portion.

In some embodiments, a release of the movement restriction of the locking portion relative to the outer wall may cause a release of the movement restriction of the storage tube to the clip.

In some embodiments, the storage tubes may include a first storage tube and a second storage tube, the second storage tube being provided inside the first storage tube, the outer wall being provided on the first storage tube, and the locking portion being provided on the second storage tube; the first storage tube being fixed relative to the second storage tube when the clip is in the locked state; the first storage tube being movable relative to the second storage tube when the clip is switched from the locked state to the unlocked state.

In some embodiments, the first storage tube may be provided with a hook-up slot and the second storage tube may be provided with a hook-up portion; the hook-up slot and the hook-up portion may be mutually hooked up such that the first storage tube is fixed relative to the second storage tube; the hook-up portion may be detached from the hook-up slot such that the first storage tube is movable relative to the second storage tube.

In some embodiments, the second storage tube may include shrapnel, the shrapnel including a first end and a second end; the first end constituting the hook-up portion; the second end extending inside the second storage tube channel and constituting the locking portion.

In some embodiments, deformation, breakage or displacement of the first shrapnel end by a force may cause the hook-up portion to detach from the hook-up slot.

Another aspect of the present disclosure provides a clip apparatus, comprising a clip device, and a delivery device connected with the clip device; the delivery device being configured to deliver the clip device to a target region for performing a specified operation; wherein the delivery device may include an operating portion, the operating portion being capable of driving the clip device to perform the specified operation; the delivery device being detachably connected with the clip device.

In some embodiments, the clip device may include a clip, the clip including a locked state and an unlocked state; the clip apparatus may further include a disassembly device used to switch the clip from the locked state to the unlocked state.

Another aspect of the present disclosure provides a method for unlocking of a clip device, wherein the clip device may include a clip and a storage tube, the clip including a locked portion, the storage tube including a locking portion, the locking portion cooperating with the locked portion to keep the clip in a locked state and a clip arm of the clip being closed; the method comprises: operating a disassembly device to provide a disassembly force to the clip in the locked state; applying the disassembly force to the locked portion to release a cooperation relationship between the locked portion and the locked portion to cause the clip to switch from the locked state to an unlocked state; or applying the disassembly force to the locking portion to release the cooperation relationship between the locking portion and the locked portion to cause the clip to switch from the locked state to the unlocked state; or applying the disassembly force to the clip arms of the clip to release a connection relationship between the clip arms and the locked portion to cause the clip to switch from the locked state to the unlocked state; or applying the disassembly force to the storage tube such that the locking portion moves toward distal ends of the clip arms relative to the outer wall of the storage tube, causing the clip to switch from the locked state to the unlocked state; wherein when the clip is in the unlocked state, the clip arms may be open at the distal ends.

BRIEF DESCRIPTION OF THE DRAWINGS

The present disclosure is further illustrated in terms of exemplary embodiments. These exemplary embodiments are described in detail with reference to the drawings. These embodiments are not restrictive, in which the same numbering indicates the same structure, wherein.

Figure 1:
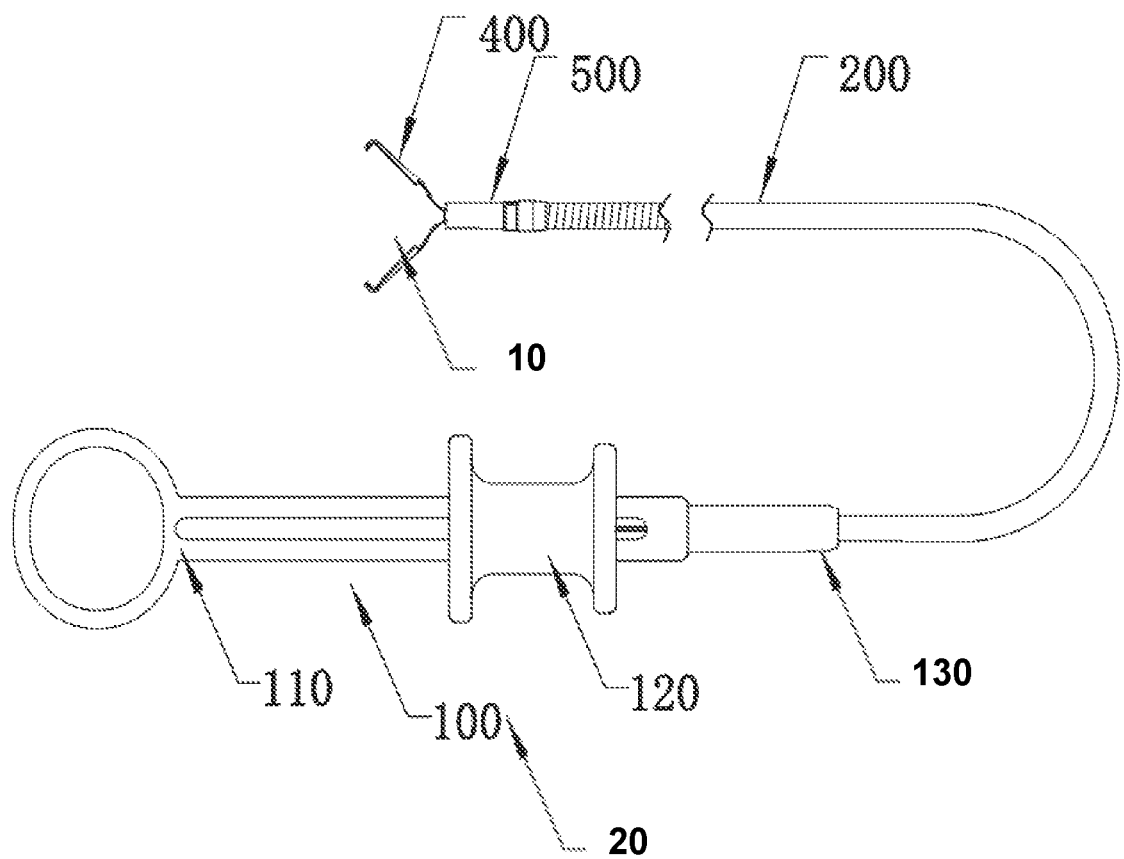
FIG. 1 is an overall schematic diagram illustrating a clip apparatus according to some embodiments of the present disclosure.

1: clip apparatus; 10: clip device; 20: delivery device;
100: operating portion; 110: operating handle; 120: sliding portion; 130: delivery portion;
200: sheath tube; 201: end cover; 202: restriction recess; 210: mandrel; 211: connecting end; 212: large diameter portion; 213: small diameter portion; 214: connecting piece;
300: tissue;
400: clip; 402: elastic ring; 410: first clip arm; 411: first bent portion; 411A: first bonding portion; 412: first hole; 420: second clip arm; 421: second bent portion; 421A: second bent portion; 422: second hole; 432: sleeve hole; 440: sliding slot; 450: elastic blocking member; 461: first protrusion; 462: second protrusion;
500: storage tube; 501: first storage tube; 502: second storage tube; 503: guideway slot; 504: connecting hole; 505: positioning convex; 510: shrapnel; 510A: first end; 510B: second end; 510C: third end; 511: locking portion; 512: unlocking portion; 513: blocking portion; 520: restriction protrusion; 530: hook-up slot; 531: first hook-up slot; 532: second hook-up slot; 540: hook-up portion; 541: first hook-up portion; 542: second hook-up portion; 550: pin; 560: locking slot; 570: slot; 571: fixed end; 572: free end; 573: docking portion;
601: connecting pin; 602: locked portion; 603: pin fixing portion; 604: spring; 606: tie rod; 605: linkage structure;
700: disassembly device; 701: first disassembly arm; 702: second disassembly arm.

DETAILED DESCRIPTION

In order to more clearly illustrate the technical solutions of the embodiments of the present disclosure, the following is a brief description of the accompanying drawings that need to be used in the description of the embodiments. Obviously, the accompanying drawings in the following description are only some examples or embodiments of the present disclosure, and it is possible for those skilled in the art to apply the application to other similar scenarios without creative effort. Unless obviously obtained from the context or the context illustrates otherwise, the same numeral in the drawings refers to the same structure or operation.

It should be understood that the terms "system", "device", "unit" and/or "module" as used herein are a way to distinguish between different levels of components, elements, parts, sections or assemblies. However, if other words can achieve the same purpose, said words can be replaced by other expressions.

As used in the disclosure and the appended claims, the singular forms "a," "an," and "the" include plural referents unless the content clearly dictates otherwise. In general, the terms "including" and "comprising" suggest only the inclusion of clearly identified steps and elements that do not constitute an exclusive list, and the method or apparatus may also contain other steps or elements.

Flow charts are used in the present disclosure to illustrate the operations performed by the system according to embodiments of the present disclosure. It should be understood that the preceding or following operations are not necessarily performed in exact order. Instead, the individual steps can be processed in reverse order or simultaneously. It is also possible to add other operations to these procedures, or to remove a step or steps from them.

Embodiments of the present disclosure relate to a clip device, a clip apparatus for operating a clip device, and a method for unlocking a clip device by operating the clip device to perform an unlocking operation. In some embodiments, an end-effector machine may include a clip device and a delivery device, the delivery device may be used to deliver the clip device to a position on a medically manipulated object where a medical operation is to be performed, and the clip device may be used to perform the medical operation on the medical object. In some embodiments, the medical operations performed by the clip device may include surgical hemostasis, wound healing, tissue fixation, etc., and the clip device may perform these medical operations by closing clip arms. In some embodiments, in order to maintain the medical operations performed by the clip device, the clip device may include a locked state, and the clip arms of the clip device may remain closed when the clip device is in the locked state. In some embodiments, the clip device may be retained on the medically manipulated object (e.g., clipped to the tissue) by maintaining the locked state. In some embodiments, the clip device may include a clip and a storage tube, and the clip may be stored in the storage tube while remaining closed. The storage tube may be provided with a locking portion and the clip may be provided with a locked portion. By a cooperation relationship between the locking portion and the locked portion, the storage tube may be made to restrict a movement of the clip relative to an outer wall of the storage tube, thus keeping the clip closed.

In some embodiments, when the medical operation needs to be released, the clip device may be switched from a locked state to an unlocked state in order to allow the clip device to reopen and leave the medically manipulated object without causing damage to the medically manipulated object. In some embodiments, termination of the cooperation relationship between the locking portion and the locked portion on the clip device, or termination of a connection relationship between the locked portion and the clip arms, or termination of the movement restriction of the locking portion relative to the outer wall, etc., may cause termination of a movement restriction of the storage tube on the clip, and thus allows the locking and unlocking process of the clip.

FIG. 1 is an overall schematic diagram illustrating a clip apparatus according to some embodiments of the present disclosure. As shown in FIG. 1, the clip apparatus 1 may include a clip device 10 (including a clip 400 and a stowage tube 500) and a delivery device 20 (including an operating portion 100 and a delivery portion 130) releasably connected with the clip device 10. The releasable connection may be a connection in which a connection relationship between the clip device 10 and the delivery device 20 may be removed and released.

The delivery device 20 may be configured to be able to deliver the clip device 10 to a target region where a specified operation is performed. In some embodiments, the target region may be a region within a target object where a specified operation needs to be performed (e.g., a lesion). In some embodiments, the specified operation may be a medical operation performed in surgery, e.g., hemostasis, ligation, etc. In some embodiments, the target object may be an object undergoing a medical operation. In some embodiments, the target object may include a biological object or a non-biological object, the biological object may include a human (e.g., a patient), an animal, or a plant, etc., and the non-biological object may include an experimental model (e.g., an organ model, etc.). In some embodiments, the delivery device 20 may also be used to operate the clip device 10 to perform a specified operation in the target region. In some embodiments, the delivery device 20 may include an operating portion 100 and a delivery portion 130. In some embodiments, the delivery portion 130 may be used to deliver the clip device 10 to the target region within the target object. In some embodiments, the operating portion 100 may drive the clip device 10 to perform a specified operation. In some embodiments, the region within the target object where the specified operation is to be performed may be a human or animal lesion region. In some embodiments, the operating portion 100 of the delivery device 20 may include an operating handle 110 and a sliding portion 120, specifically, an operator (e.g., a physician) may operate the clip device 10 to stop bleeding, ligate, etc. by operating the operating handle 110 and the sliding portion 120. In some embodiments, the delivery portion 130 of the delivery device 20 may include a sheath tube 200 and a mandrel 210. In some embodiments, the sheath tube 200 may be a tubular structure that provides an internal channel for other components (e.g., the mandrel 210). In some embodiments, the mandrel 210 may be a long shaft-like structure provided within the internal channel of the sheath tube for driving the movement of the clip device 10. In some embodiments, the delivery device 20 may be connected with the clip device 10 via the sheath tube 200 and the mandrel 210. For more information about the connection relationship between the delivery device 20 and the clip device 10, please refer to FIG. 3 and its related description in the present disclosure.

The clip device 10 may include a clip 400 and a storage tube 500, with a proximal end of the clip 400 stored in a channel of the storage tube 500 and a distal end of the clip used to perform a specified operation (e.g., hemostasis, ligation). The terms "proximal" and "distal" in these embodiments may indicate orientation, meaning that along a length direction of the clip apparatus 1 (e.g., an extension direction of the delivery device 20), or along a direction of entry of the clip apparatus 1 into the human body, a side close to the operator and away from the target object is located as the "proximal end" and a side close to the target object and away from the operator is located as the "distal end", and the terms "proximal" and "distal" should not be understood to indicate only the end.

Figure 2:
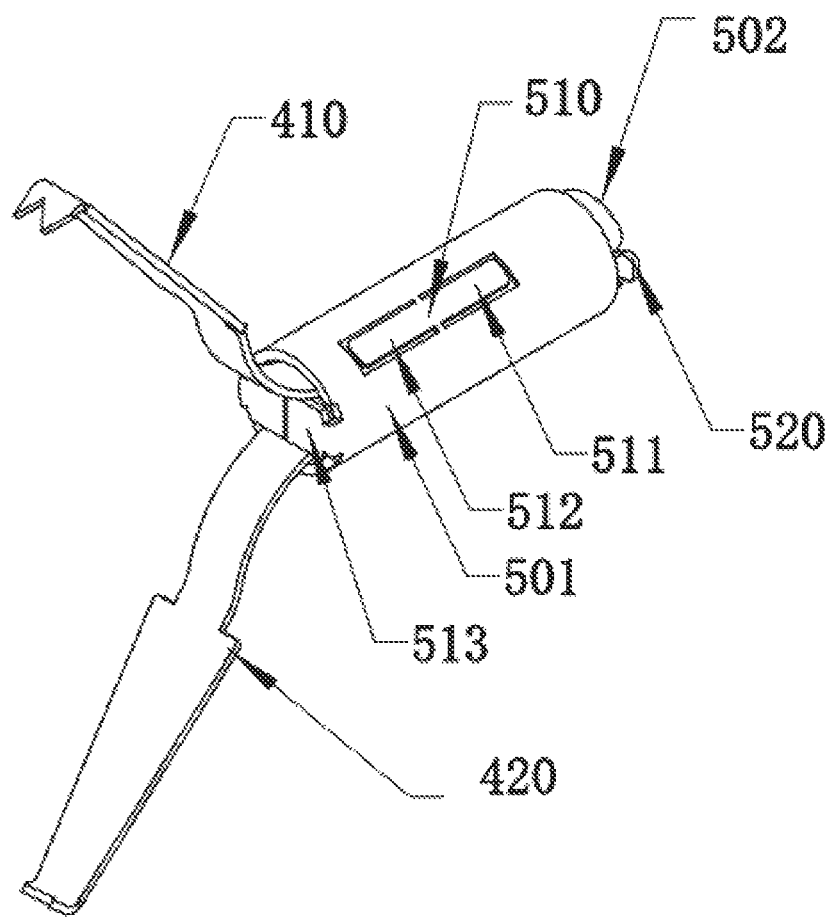
FIG. 2 is a schematic diagram illustrating a clip device according to some embodiments of the present disclosure.

As shown in FIG. 2, in some embodiments, the clip may include clip arms. The clip arms may include a first clip arm 410 and a second clip arm 420. A distal end of the first clip arm 410 and a distal end of the second clip arm 420 may be used for ligation. The storage tube 500 may include a tubular structure, the tubular structure may include an outer wall and a channel surrounded by the outer wall, a proximal end of the first clip arm 410 and a proximal end of the second clip arm 420 may be stored in the channel of the storage tube 500. In some embodiments, when the clip moves toward the proximal end relative to the storage tube, the distal ends of the first clip arm 410 and the second clip arm 420 may approach each other, the first clip arm 410 and the second clip arm 420 may be gradually stored in the channel of the storage tube 500, and the clip closes. In some embodiments, when the clip moves toward the distal end relative to the storage tube, the first clip arm 410 and the second clip arm 420 may exit from the storage tube 500, the distal ends of the first clip arm 410 and the second clip arm 420 may move away from each other, and the clip may open. For more information about the structure of the clip device 10, please refer to the description elsewhere in the present disclosure.

In some embodiments, as shown in FIG. 3-FIG. 8, in order to achieve the connection between the delivery device 20 and the clip device 10, the clip 400 may include a sleeve hole 432, and the mandrel 210 may be sleeved in the sleeve hole 432 to complete the connection with the clip 400. Specifically, the mandrel 210 may include a large diameter portion 212 and a small diameter portion 213, and a diameter of the large diameter portion 212 of the mandrel 210 may be larger than an inner diameter of the sleeve hole 432, and a diameter of the small diameter portion 213 may be smaller than the inner diameter of the sleeve hole 432. In some embodiments, the small diameter portion 213 may be fixedly connected with a distal end of the mandrel 210 and the large diameter portion 212 may be fixedly connected with the small diameter portion 213. In some embodiments, the distal end of the mandrel 210 may be fixedly connected with a connecting end 211, a distal end of the connecting end 211 may be fixedly connected with the small diameter portion 213, and a distal end of the small diameter portion 213 may be fixedly connected with the large diameter portion 212. In some embodiments, the large diameter portion 212 and the small diameter portion 213 of the mandrel 210 may be integrally formed, or the large diameter portion 212 of the mandrel 210 may be fixedly connected with the small diameter portion 213 by gluing, fastening, welding, etc.

Figure 3:
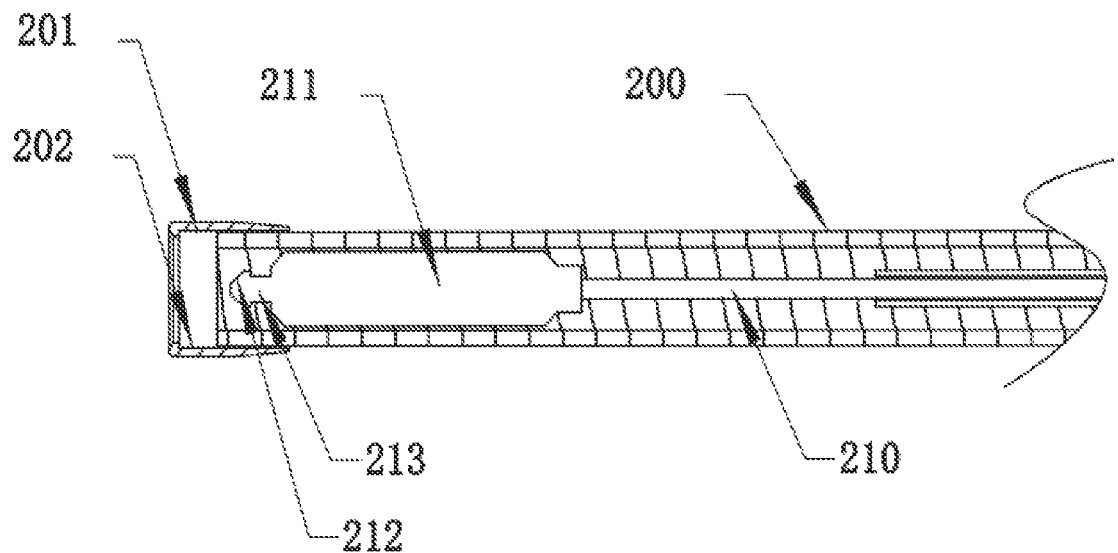
FIG. 3 is a cross-sectional view illustrating a clip device according to some embodiments of the present disclosure.

In some embodiments, a distal end of the sheath tube 200 may include a restriction recess 202, and the proximal end of the storage tube 500 may be further provided with a restriction protrusion 520, which is used to cooperate with the restriction recess 202 at the distal end of the sheath tube 200 to complete the connection and release of the sheath tube 200 and the storage tube 500. As shown in FIG. 3, in some embodiments, the distal end of the mandrel 210 may include a connecting end 211, and when the distal end of the mandrel 210 extends into the storage tube 500, the restriction protrusion 520 may be squeezed by the connecting end 211 toward the restriction recess 202 due to the elasticity of the restriction protrusion 520, causing the restriction protrusion 520 to be squeezed by the connecting end 211 into the restriction recess 202. An outer diameter of the connecting end 211 may be larger than an inner diameter of the restriction protrusion 520, and the inner diameter of the restriction protrusion 520 may be an inner diameter of a second storage tube 502. When the distal end of the mandrel 210 exits the storage tube, the restriction protrusion 520 may be no longer squeezed by the connecting end 211, and the restriction protrusion 520 may return to elastic deformation and thus may exit from the restriction recess 202. In some embodiments, the distal end of the mandrel 210 may also not include the connecting end 211. An outer diameter of the mandrel 210 may be larger than the inner diameter of the restriction protrusion 520, and after the mandrel 210 extends into the restriction protrusion 520, the restriction protrusion 520 may be directly squeezed so that the restriction protrusion 520 extends into the restriction recess 202.

In some embodiments, the mandrel 210 may drive the clip 400 to move relative to the storage tube 500 after the connection of the delivery device 20 to the clip device 10. In some embodiments, when the mandrel 210 moves toward the proximal end, the mandrel 210 may drive the clip 400 toward the proximal end relative to the stowage tube 500, and the clip 400 closes. In some embodiments, when the clip 400 is closed, the clip 400 may be further locked to limit the movement of the clip 400 relative to the outer wall of the storage tube 500 toward the distal end, keeping the clip 400 closed and leaving the clip 400 in the locked state. That is, the locked state may be a state in which the clip 400 is closed and the movement of the clip 400 is restricted relative to the outer wall of the storage tube 500. In some embodiments, a position at which the clip 400 is in the locked state may be defined as a first position. In some embodiments, the clip 400 may include a locked portion and the storage tube 500 may include a locking portion. In some embodiments, the locking portion may be restricted in its movement toward the distal end relative to the outer wall of the storage tube. In some embodiments, the locking portion may be connected with the outer wall of the storage tube 500 (e.g., fixedly connected or removably connected) such that the movement of the locking portion is restricted relative to the outer wall of the storage tube 500 toward the distal end. The cooperation relationship between the locking portion and the locked portion enables the storage tube 500 to form a movement restriction on the clip 400 and realize the locking of the clip 400. In some embodiments, the movement restriction of the storage tube 500 to the clip 400 means that the storage tube 500 is capable of restricting the tendency of the clip 400 to move toward the distal end relative to the outer wall of the storage tube 500. In some embodiments, by keeping the clip 400 in the locked state allows the clip 400 to continuously clip human tissue to achieve hemostasis and ligation.

In some embodiments, the locked state of the clip 400 may be released, and after the locked state is released, the clip 400 may move toward the distal end relative to the outer wall of the storage tube 500, and the clip 400 may be re-opened, at which point the clip 400 may be switched from the locked state to the unlocked state. That is, the unlocked state may be a state in which the movement restriction of the clip 400 relative to the outer wall of the storage tube 500 is released and the clip 400 may be opened. In some embodiments, a position at which the clip 400 is switched from the locked state to the unlocked state may be defined as a second position. In some embodiments, the movement restriction of the clip 400 relative to the outer wall of the storage tube 500 may be a restriction that prevents the clip 400 from moving toward the distal end relative to the outer wall of the storage tube 500. In some embodiments, after the clip 400 is switched from the locked state to the unlocked state, the clip 400 may release the clipped human tissue to achieve the detachment of the clip device 10 from the human tissue.

In some embodiments, the clip apparatus 1 may also include a disassembly device 700 for switching the clip 400 from the locked state to the unlocked state. In some embodiments, the disassembly device 700 may be a clamp capable of providing a disassembly function, or a biopsy clamp, or a trap, or an energy instrument, or a specialized disassembly device, etc. The disassembly device 700 may approach the clip device 10 through an endoscopic jaw channel, and by applying force to the relevant parts of the clip device 10 (including, but not limited to, the locked portion, or the locking portion, or a first connecting portion where the clip is connected with the locked portion, or a second connecting portion where the storage tube 500 is connected with the locking portion), the relevant parts are deformed, or broken, or displaced by the force, and the unlocking operation is finally completed. In some embodiments, the manner in which the force applied by the disassembly device 700 to a target part may include a radially inward application of pressure, or a radially inward contact with the target part followed by an axial application of force, or an axial application of force. For more information about completing the unlocking operation of the clip device 10 by the disassembly device 700, please refer to the description elsewhere in the present disclosure.

Figure 4:
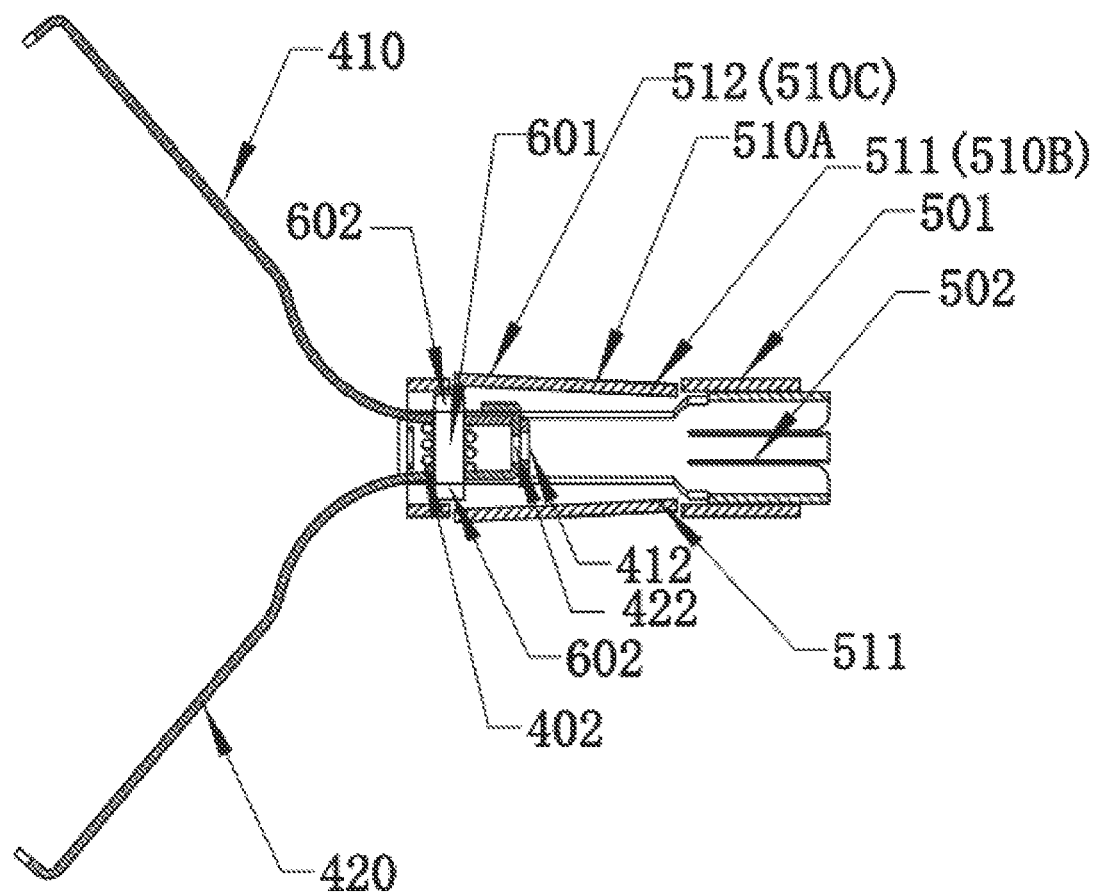
FIG. 4 is a cross-sectional view illustrating a clip device according to some embodiments of the present disclosure.
Figure 5:
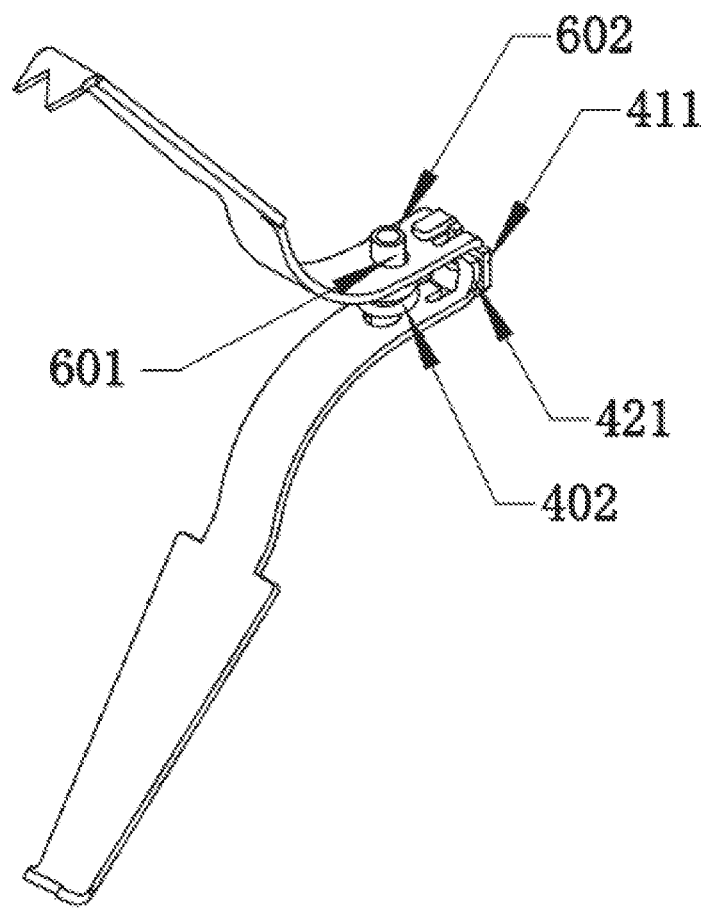
FIG. 5 is a schematic diagram illustrating a clip according to some embodiments of the present disclosure.
Figure 6:
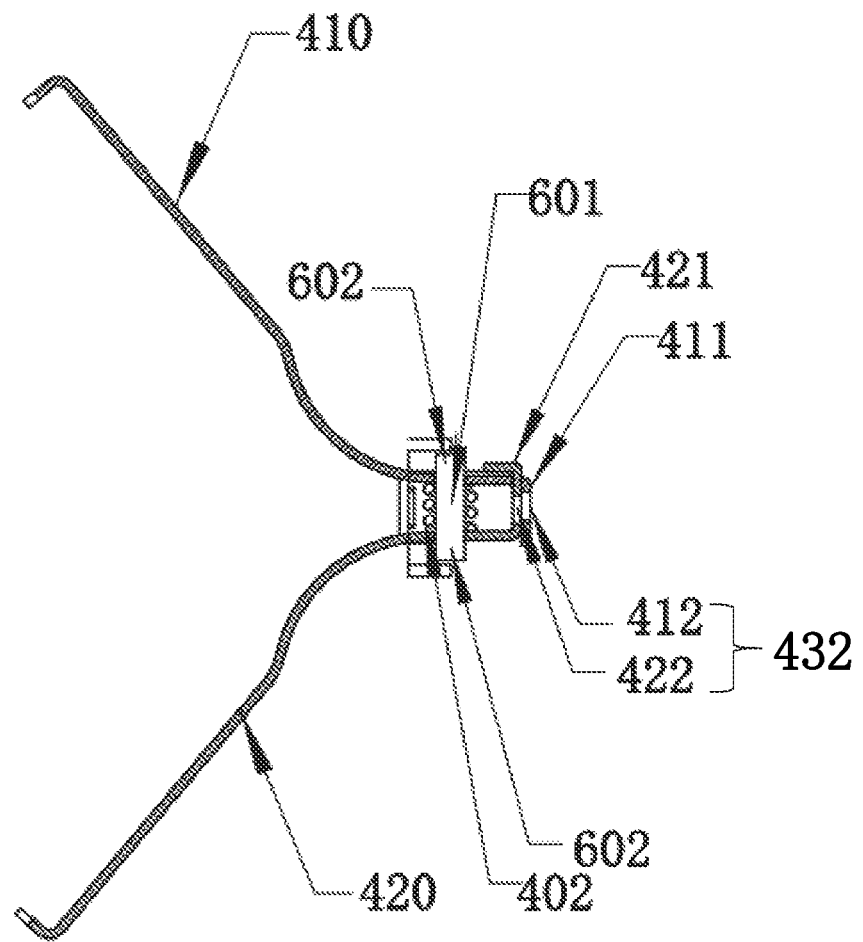
FIG. 6 is a side view of FIG. 5.

In some embodiments, as shown in FIGS. 4 and 5, the proximal end of the first clip arm 410 may be provided with a first bent portion 411 that bends toward the second clip arm 420. The first bent portion 411 may be provided with a first hole 412. The proximal end of the second clip arm 420 may be provided with a second bent portion 421 that bends toward the first clip arm 410. The second bent portion 421 may be provided with a second hole 422. In some embodiments, a bending angle between the first bent portion 411 and the first clip arm 410 may be 85° to 95°, and a bending angle between the second bent portion 421 and the second clip arm 420 may be 85° to 95°. In some embodiments, a sum of the bending angles of the first bend portion 411 and the second bend portion 421 may be 180°. In some embodiments, at least a portion of the first hole 412 and the second hole 422 may overlap and may be connected, and the portion of the first hole 412 and the second hole 422 that overlaps and is connected constitutes the sleeve hole 432. The "at least a portion" overlap may include a partial overlap connection, a partial overlap connection where the first hole 412 and the second hole 422 are slightly staggered but not fully overlapped, and a full overlap connection where the first hole 412 is fully overlapped within the second hole 422 or the second hole 422 is fully overlapped within the first hole 412. The overlap may be understood as an interconnection of two holes. After the first hole 412 and the second hole 422 are connected, a portion of the first hole 412 and the second hole 422 that is connected may constitute the sleeve hole 432. In some embodiments, the sleeve hole 432 may also be an aperture with a snap-in space, as constituted by other means.

In some embodiments, the first clip arm 410 and the second clip arm 420 may be elastic, and the distal end of the first clip arm 410 and the distal end of the second clip arm 420 may be away from each other when not under stress, and the clip 400 may be in an expanded (or open) state. In some embodiments, when the clip moves toward the proximal end relative to the storage tube, the first clip arm 410 and the second clip arm 420 may be gradually stored in the channel of the storage tube 500, and the distal ends of the first clip arm 410 and the second clip arm 420 may be close to each other and the clip may be closed due to the limiting effect of the channel of the storage tube 500. In some embodiments, when the clip moves toward the distal end relative to the storage tube, the first clip arm 410 and the second clip arm 420 may exit from the storage tube 500, the first clip arm 410 and the second clip arm 420 may be no longer restricted by the storage tube 500, the distal ends of the first clip arm 410 and the second clip arm 420 may move away from each other under the action of elastic force, and the clip may open.

In some embodiments, referring to FIGS. 4 and 5, the clip 400 may also include a connecting pin 601 to which the first clip arm 410 and the second clip arm 420 are pinned by the connecting pin 601. In some embodiments, one end of the connecting pin 601 may form the locked portion 602. In some embodiments, both ends of the connecting pin 601 may form the locked portion 602.

In some embodiments, referring to FIGS. 4 and 5, an axial direction of the connecting pin 601 may be provided in a direction parallel to a direction in which the first clip arm 410 and the second clip arm 420 are away from each other (i.e., the open direction of the clip arms). In some embodiments, the first clip arm 410 and the second clip arm 420 may be provided with pinning holes, and the connecting pin 601 may be pinned to the first clip arm 410 and the second clip arm 420 through the pinning holes. In some embodiments, the connecting pin 601 may pass through the first clip arm 410 and the second clip arm 420 toward the ends of the storage tube 500 to form the locked portion. In some embodiments, the clip 400 may also include an elastic ring 402. The elastic ring 402 may be sleeved outside the connecting pin 601. The elastic ring 402 may be located between the first clip arm 410 and the second clip arm 420. When the first clip arm 410 and the second clip arm 420 are closed, the elastic ring 402 may be compressed by the first clip arm 410 and the second clip arm 420. The elastic ring 402 may provide elastic force, an elastic direction of the elastic ring 402 may be a direction that causes the first clip arm 410 and the second clip arm 420 to move away from each other in a position where the elastic ring 402 is against. Preferably, the elastic ring 402 may be a coil spring, and the coil spring may be provided outside the connecting pin 601 by its coil.

Figure 7:
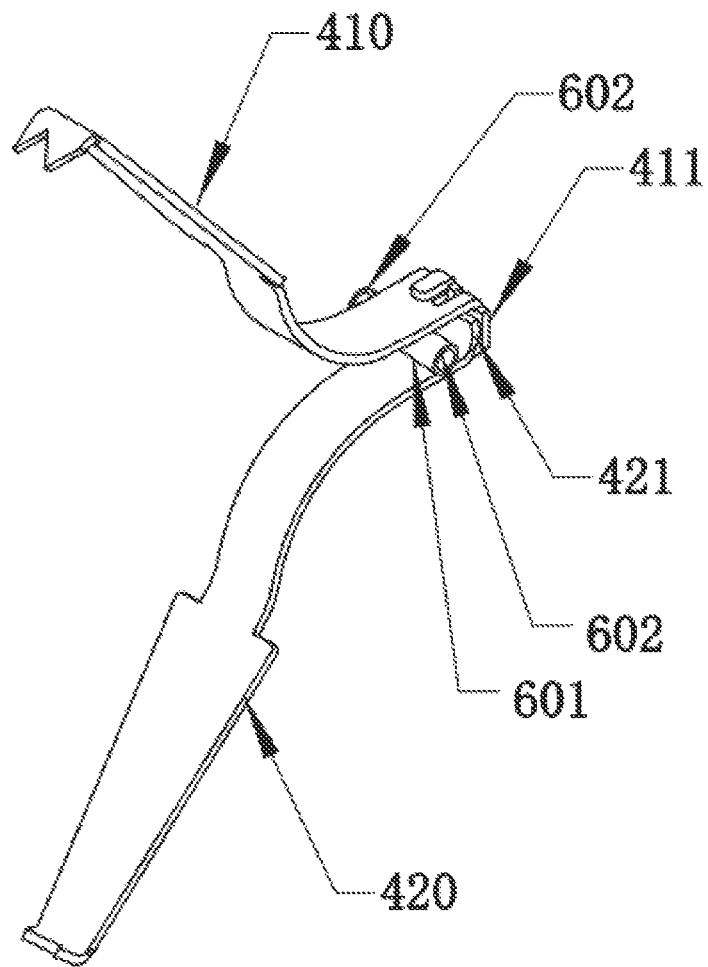
FIG. 7 is a schematic diagram illustrating a clip according to some embodiments of the present disclosure.
Figure 8:
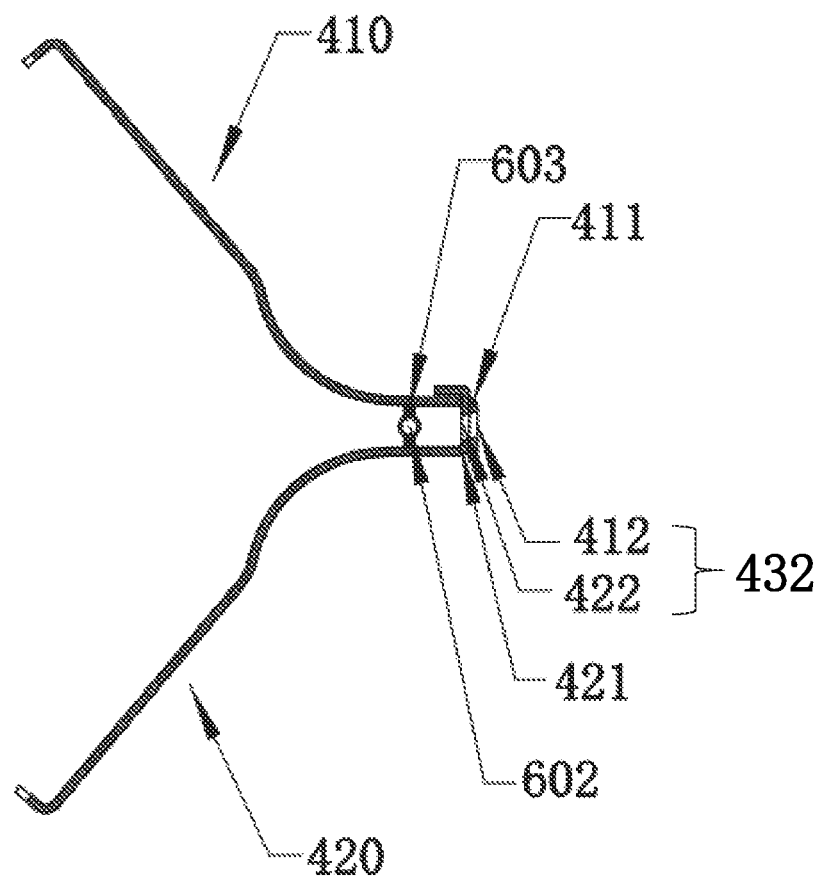
FIG. 8 is a side view of FIG. 7.

In some embodiments, referring to FIGS. 7 and 8, the axial direction of the connecting pin 601 may also be provided in a direction perpendicular to the direction in which the first clip arm 410 and the second clip arm 420 are away from each other (i.e., the open direction of the clip arms). As shown in FIGS. 7 and 8, in some embodiments, the clip 400 may include a connecting pin 601. The first clip arm 410 and the second clip arm 420 may form an accommodation space at their proximal ends. The connecting pin 601 may extend radially through the accommodation space, and the connecting pin 601 may be connected with the first clip arm 410 and the second clip arm 420, respectively, by a pin fixing portion 603. In some embodiments, one end of the connecting pin 601 may form the locked portion 602. In some embodiments, both ends of the connecting pin 601 may form the locked portion 602.

In some embodiments, the first clip arm 410 and the second clip arm 420 may also be non-elastic, and the first clip arm 410 and the second clip arm 420 may be opened and closed by providing a guiding structure. In some embodiments, the guiding structure may include, but is not limited to, a sliding slot or a linkage structure.

In some embodiments, the proximal end of the first clip arm 410 and the proximal end of the second clip arm 420 may be provided with sliding slots, and the storage tube 500 may include a pin, and the pin and the storage tube 500 may be fixedly connected. In some embodiments, the pin may be provided in the sliding slot, and the sliding slot may slide relative to the pin. In some embodiments, the sliding slot at the proximal end of the first clip arm 410 may be a first sliding slot, and the sliding slot at the proximal end of the second clip arm 420 may be a second sliding slot. In some embodiments, the first sliding slot and the second sliding slot may extend in a direction that is not parallel to an axial direction of the storage tube. In some embodiments, the sliding slots of the first clip arm 410 and the second clip arm 420 may be provided symmetrically relative to the axis of the storage tube 500. In some embodiments, the pin may be provided in a radical direction of the storage tube 500, with the pin passing through the first sliding slot and the second sliding slot. In some embodiments, when the clip 400 moves relative to the outer wall of the storage tube 500 in the axial direction of the storage tube 400, the first sliding slot and the second sliding slot may slide relative to the pin, allowing the opening and closing of the clip arms. For more information about the sliding slot cooperates with the pin fit to achieve the opening and closing of the clip arms, please refer to the description elsewhere in the present disclosure.

In some embodiments, referring to FIG. 11-FIG. 15, the clip 400 may include a linkage structure 605. In some embodiments, the linkage structure 605 may include a four-link structure. The four-link structure may include a first distal rod and a second distal rod located at the distal end, and a first proximal rod and a second proximal rod located at the proximal end. In some embodiments, the first clip arm 410 and the second clip arm 420 may be hinged, with a portion located proximal to the hinge point of the first clip arm 410 constituting the first distal rod and a portion located proximal to the hinge point of the second clip arm 420 constituting the second distal rod. In some embodiments, the distal end of the first proximal rod may be hinged to the first clip arm, the distal end of the second proximal rod may be hinged to the second clip arm, and the proximal end of the first proximal rod may be hinged to the proximal end of the second proximal rod. In some embodiments, each of the hinge points of the linkage structure may be connected by the connecting pin. In some embodiments, the clip 400 may also include a tie rod, with a distal end of the tie rod connected with a hinge point on the linkage structure 605 located at the proximal end. In some embodiments, a proximal end of the tie rod may be connected with the mandrel 210. In some embodiments, the linkage structure 605 may drive the clip arms to close as the tie rod drives the linkage structure 605 from the distal end to the proximal end.

Figure 12:
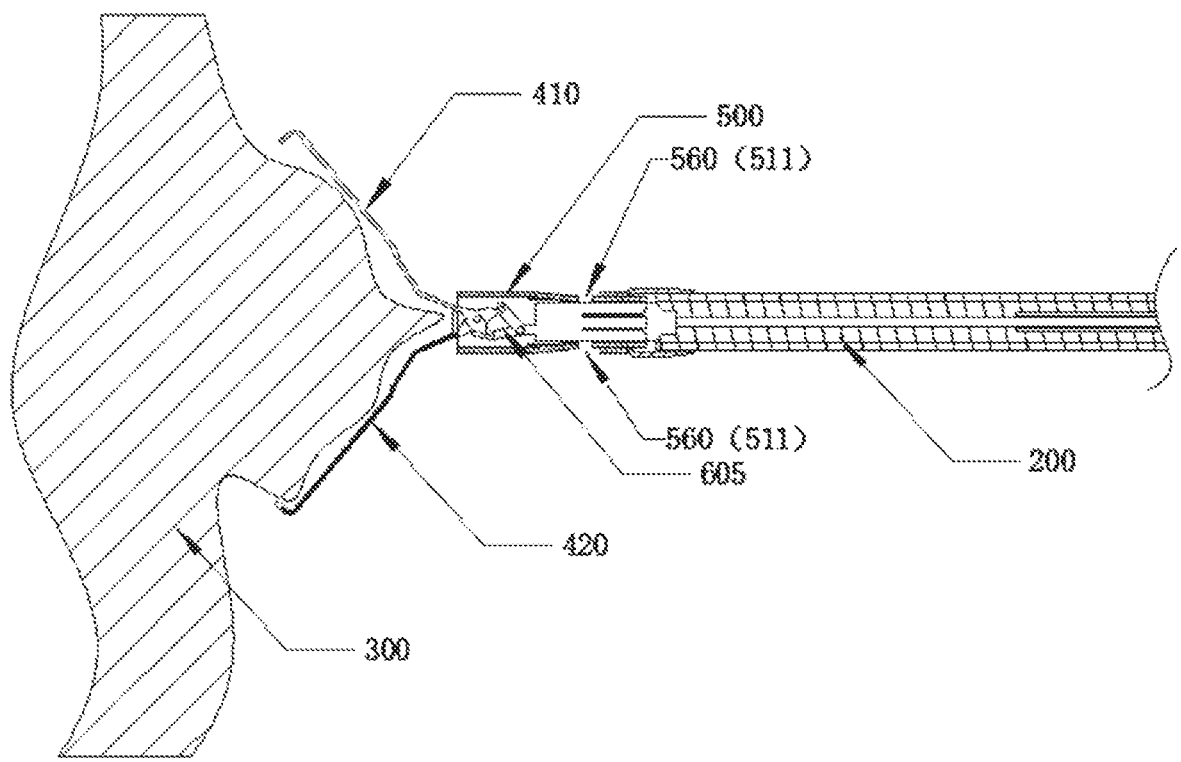
FIG. 12 is a schematic diagram illustrating a clip in an unlocked state according to some embodiments of the present disclosure.
Figure 13:
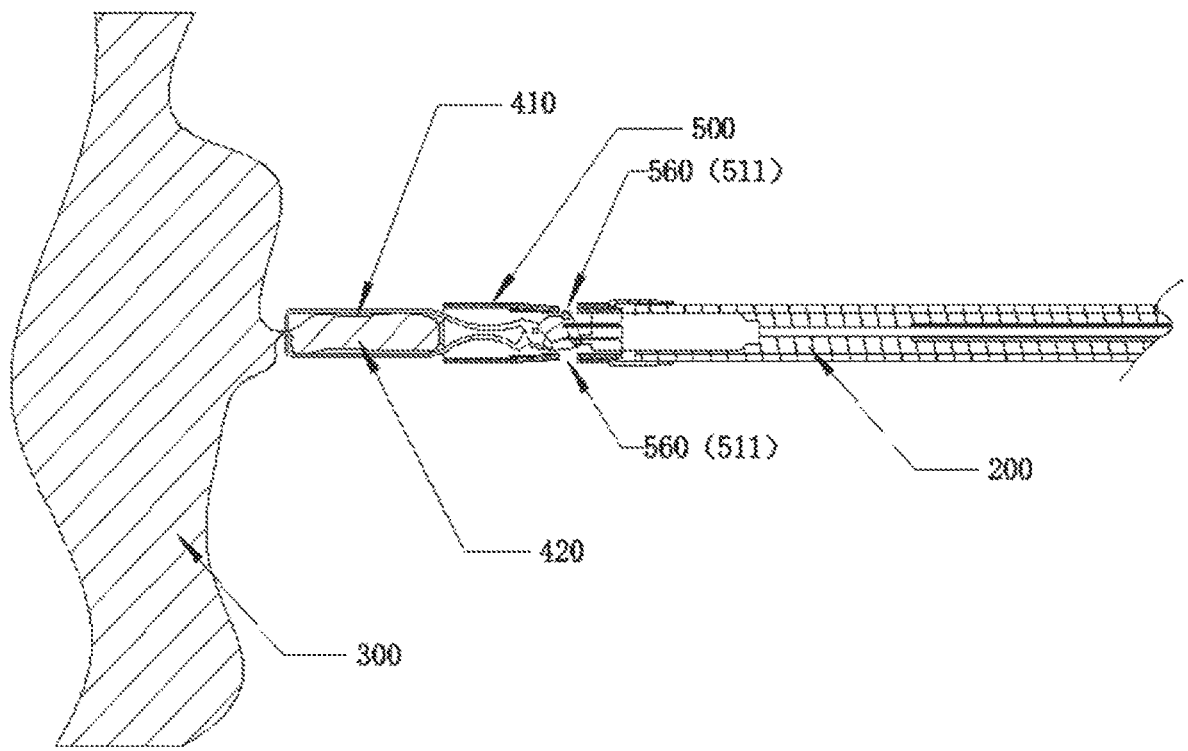
FIG. 13 is a schematic diagram illustrating a clip in a locked state according to some embodiments of the present disclosure.
Figure 14:
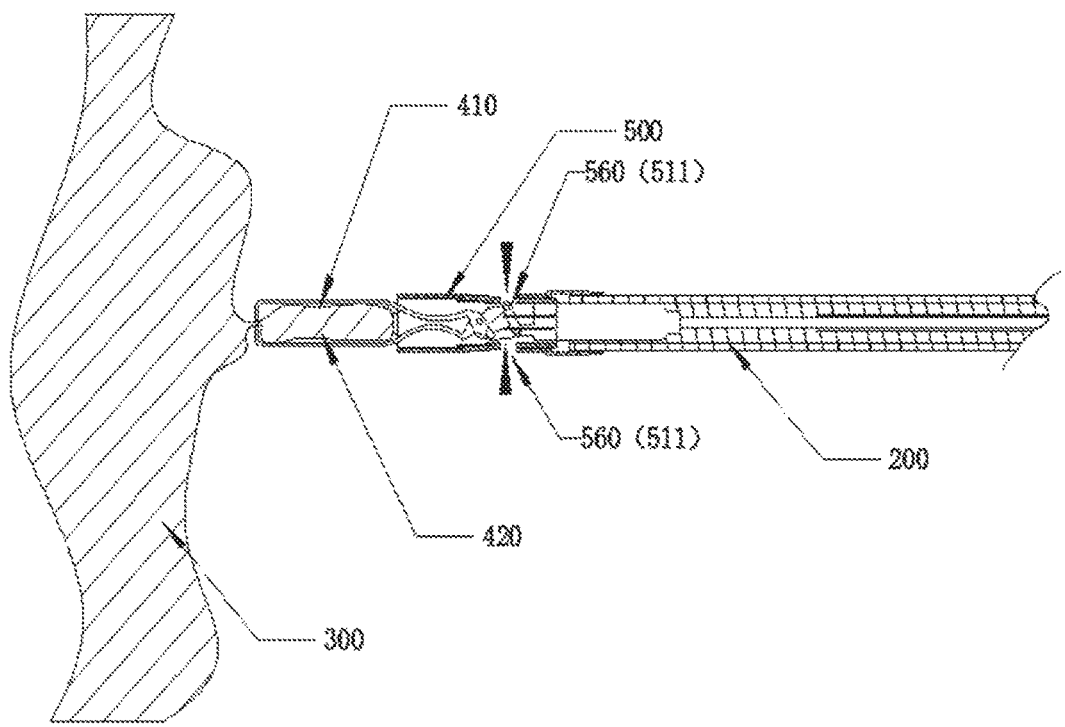
FIG. 14 is a schematic diagram illustrating a clip in a locked state according to some embodiments of the present disclosure.
Figure 15:
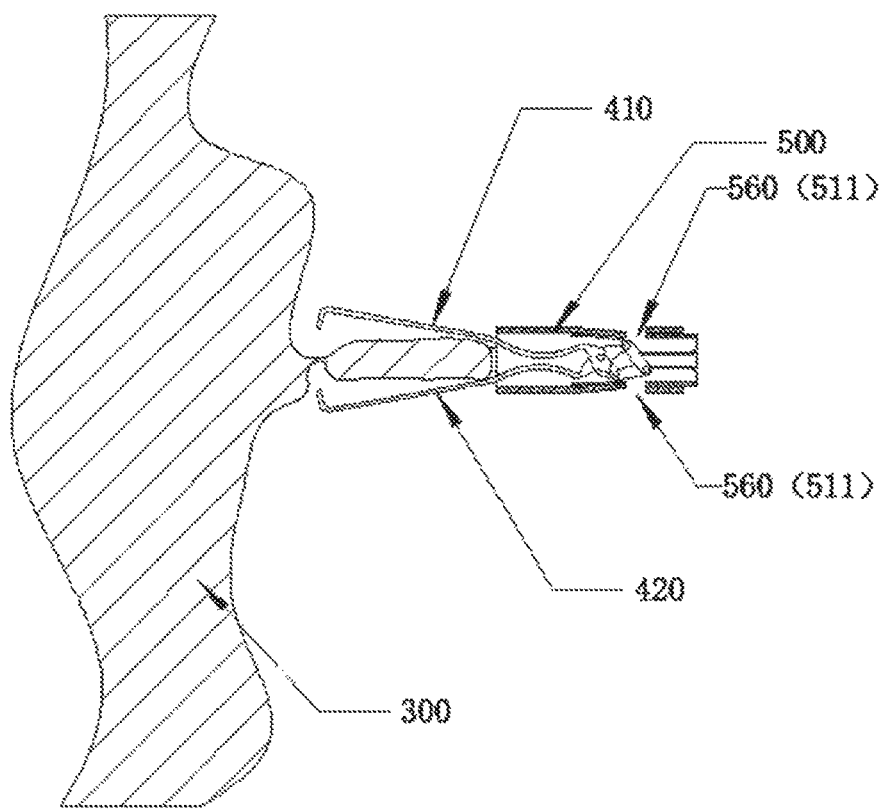
FIG. 15 is a schematic diagram illustrating a clip in an unlocked state according to some embodiments of the present disclosure.

As shown in FIGS. 11 to 15, the proximal end of the first clip arm 410 and the proximal end of the second clip arm 420 may be connected by the linkage structure 605, and when the tie rod 606 drives the linkage structure 605 to move from the distal end to the proximal end, an angle between the first proximal rod and the second proximal rod may decrease, thereby driving an angle between the first clip arm and the second clip arm to decrease, causing the first clip arm 410 and the second clip arm 420 to close. As shown in FIG. 12, the clip is in the open state, and at this time the tie rod 606 is not moving toward the proximal end. As shown in FIG. 13, the tie rod 606 moves from the distal end to the proximal end, when the clip is in the closed state.

In some embodiments, the clip 400 may also not include a tie rod, and the proximal end of the first proximal rod and the proximal end of the second proximal rod may be also provided with a sleeve hole for connecting the mandrel 210 near the hinge point, which may be an aperture opened in the connecting pin at that hinge point. In some embodiments, the mandrel 210 may be connected directly to the proximal end of the linkage structure 605 through the sleeve hole, allowing the mandrel 210 to drive the linkage structure 605 from the distal end to the proximal end. In some embodiments, when the mandrel 210 drives the linkage structure 605 from the distal end to the proximal end, the angle between the first proximal rod and the second proximal rod may decrease, thereby driving the angle between the first clip arm 410 and the second clip arm 420 to decrease, causing the first clip arm 410 and the second clip arm 420 to gradually close.

Figure 9:
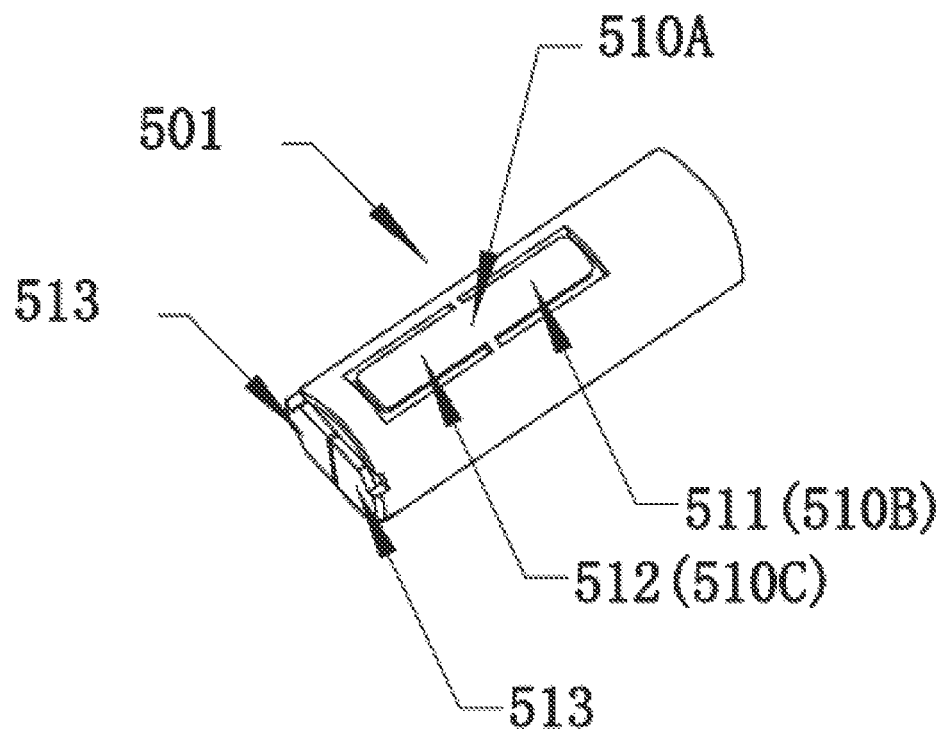
FIG. 9 is a schematic diagram illustrating a first stowage tube according to some embodiments of the present disclosure.
Figure 10:
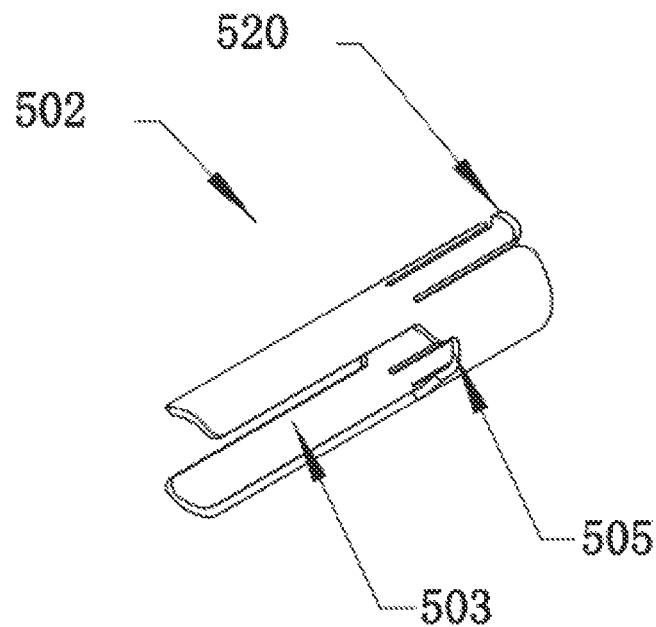
FIG. 10 is a schematic diagram illustrating a second stowage tube according to some embodiments of the present disclosure.
Figure 11:
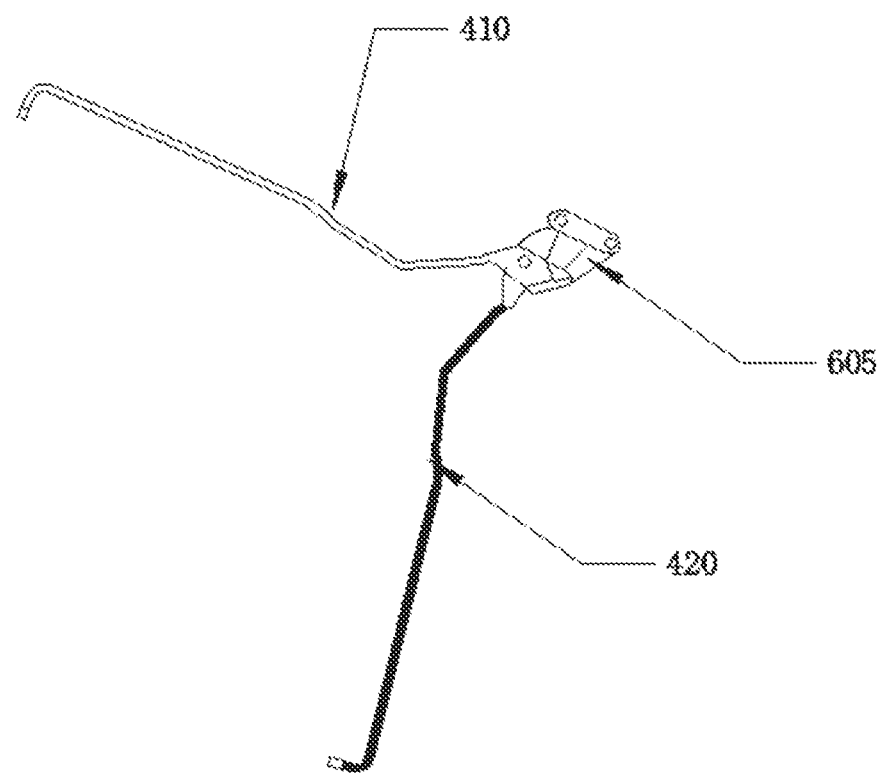
FIG. 11 is a side view illustrating a clip according to some embodiments of the present disclosure.

In some embodiments, referring to FIGS. 9 and 10, the storage tubes 500 may include a first storage tube 501 and a second storage tube 502, with at least a portion of the second storage tube 502 sleeved within a channel of the first storage tube 501, with an outer wall of the first storage tube 501 constituting the outer wall of the storage tube 500. In some embodiments, the second storage tube 502 and the first storage tube 501 may be fabricated separately from the two tube structures and then assembled together, or the second storage tube 502 and the first storage tube 501 may be machined separately on one tube structure. In some embodiments, the material of the first storage tube 501 may include, but is not limited to, stainless steel, titanium, tantalum, platinum, palladium, etc. In some embodiments, the material of the second storage tube 502 may include, but is not limited to, stainless steel, titanium, tantalum, platinum, palladium, etc. In some embodiments, the material of the first storage tube 501 may be the same as the material of the second storage tube 502. In some embodiments, the material of the first storage tube 501 may also be different from the material of the second storage tube 502. For example, the first storage tube 501 may use a higher strength titanium material, and the second storage tube 502 may use a tougher stainless steel material.

As shown in FIG. 9, in some embodiments, the distal end of the storage tube 500 may be provided with a blocking portion 513, which extends into the channel of the storage tube 500, and the blocking portion 513 may be located at the distal end of the connecting pin 601, which prevents the clip 400 from dislodging from the distal end of the storage tube 500 due to the blocking portion 513.

As shown in FIG. 10, in some embodiments, in order to facilitate movement of the clip 400 relative to the storage tube 500, the storage tube 500 may be provided with a guideway slot 503 along the axial direction. In some embodiments, the guideway slot 503 may be provided on the second storage tube 502, for example, the guideway slot 503 may be laser cut out of a side wall of the second storage tube 502. In some embodiments, the connecting pin 601 is capable of sliding within the guideway slot 503, the locked portion 602 may extend into the guideway slot 503, and the guideway slot 503 may guide the locked portion 602 into a locking position that mates with the locking portion 511.

In some embodiments, in order to restrict the movement of the clip 400 relative to the storage tube 500 so that the clip 400 can be locked, the clip 400 may include a locked portion and the storage tube 500 may include a locking portion. The locking portion may be an assembly on the storage tube 500 for use with the locked portion to restrict the movement of the clip 400 toward the distal end relative to the storage tube 500. In some embodiments, the locking portion may be a structure or an assembly such as a shrapnel, a recess, a pin, etc. on the storage tube 500. The locked portion may be a structure or an assembly on the clip 400 that cooperates with a structure or an assembly such as a shrapnel, a recess, a pin, etc. In some embodiments, the locked portion may be a structure or an assembly such as a protrusion, a connecting pin, an elastic blocking piece, etc.

In some embodiments, the cooperation relationship between the locked portion and the locking portion may be one-to-one; for example, the locked portion may be a protrusion provided on the clip 400 and the locking portion may be a shrapnel provided on the storage tube 500; for example, the locked portion may be a protrusion provided on the clip 400 and the locking portion may be a recess provided on the storage tube 500; for example, the locked portion may be a connecting pin provided on the clip 400 and the locking portion may be a shrapnel provided on the storage tube 500; for example, the locked portion may be a connecting pin provided on the clip 400 and the locking portion may be a recess provided on the storage tube 500; for example, the locked portion may be an elastic blocking member provided in a sliding slot on the clip 400 and the locking portion may be a pin provided on the storage tube 500; for example, the locked portion may be a connecting pin provided at the proximal end of the linkage structure 605 and the locking portion may be a shrapnel provided on the storage tube 500; for example, the locked portion may be a protrusion provided at the proximal end of the linkage structure 605, and the locking portion may be a shrapnel provided at the proximal end of the linkage structure 605. The above-mentioned locked portion or (and) the locking portion may be deformed, or broken, or displaced by force, and the cooperation relationship between the locked portion and the locking portion may be released.

In some embodiments, because the movement of the locking portion is restricted relative to the outer wall of the storage tube 500 toward the distal end, when the locked portion and the locking portion cooperate, the movement of the clip may be also restricted relative to the outer wall of the storage tube 500 toward the distal end, i.e., the storage tube 500 constitutes a movement restriction on the clip 400, leaving the clip 400 in the locked state.

In some embodiments, when the movement restriction of the clip 400 toward the distal end relative to the outer wall of the storage tube 500 is released, the clip 400 may move toward the distal end relative to the storage tube 500 and the clip arm may reopen, i.e., the clip 400 is switched from the locked state to the unlocked state, also called the switch of the clip 400 from the first position to the second position.

In some embodiments, the termination of the cooperation relationship between the locking portion and the locked portion may cause the termination of the movement restriction of the storage tube 500 on the clip 400, and the clip 400 may be switched from the locked state to the unlocked state. In some embodiments, deformation, or breakage, or displacement of the locked portion or (and) the locking portion by force may cause the termination of the cooperation relationship between the locked portion and the locking portion.

In some embodiments, the termination of the connection relationship between the locked portion and the clip arms may cause the termination of the movement restriction of the storage tube 500 to the clip 400 and the clip 400 may be switched from the locked state to the unlocked state. In some embodiments, the connection relationship between the locked portion and the clip arms may be released and the clip 400 may transition from the first position (where the distal end of the first clip arm and the distal end of the second clip arm remain closed) to the second position (where the distal end of the first clip arm and the distal end of the second clip arm reopen); the connection method of the locked portion and the clip arms may be adapted to different connection and release methods, such as the locked portion may be a protrusion provided at the clip arms, the connection method of the locked portion and the clip arms may be integrally formed, and the connection relationship between the locked portion and the clip arms may be released when the protrusion is broken; if the locked portion is a connecting pin provided at the clip 400, the first clip arm 410 and the second clip arm 420 may be connected by the connecting pin 601, and the first connecting portion of the first clip arm 410 and/or the second clip arm 420 and the connecting pin 601 against each other may be deformed that the connection relationship between the locked portion and the clip arms may be released; if the locked portion is the connecting pin 601 provided at the clip arms, the first clip arm 410 and the second clip arm 420 may form an accommodation space at the proximal end, the connecting pin 601 may extend radially through the accommodation space, and the connecting pin 601 may be displaced from the first connection portion where the first clip arm 410 and the second clip arm 420 are interlocked, i.e., the connection relationship between the locked portion and the clip arm may be released; if the locked portion is a blocking member provided in the sliding slot of the clip arms, the blocking member and the sliding slot of the clip arms may be fixedly connected, and the connection relationship between the locked portion and the clip arms may be released when the blocking member breaks.

In some embodiments, the termination of the movement restriction of the locking portion relative to the outer wall may cause the termination of the movement restriction of the storage tube 500 to the clip 400, causing the clip 400 to be switched from the locked state to the unlocked state. In some embodiments, termination of a connection relationship between the locking portion and the other positions of the storage tube 500 may cause the termination of the movement restriction of the locking portion relative to the outer wall, and the clip may transition from the first position (the distal end of the first clip arm and the distal end of the second clip arm remain closed) to the second position (the distal end of the first clip arm and the distal end of the second clip arm reopen); the locking portion and the storage tube may be adapted to be connected and unconnected in different ways, such as the locking portion may be a shrapnel, and the second storage tube 502 and the first storage tube 501 provided with the shrapnel may be connected through a hook-up portion and a hook-up slot, and if a hook-up relationship between the hook-up portion and the hook-up slot is released it occurs that the connection relationship between the locking portion and the storage tube 500 may be released; if the locking portion is a pin on the storage tube 500, the pin may be radially contracted, and a connection relationship between the pin and the storage tube 500 may be released i.e. the connection relationship between the locking portion and the storage may be released.

Referring to FIG. 16-FIG. 25 for a description of the working process of the clip device 10. The working process of the clip device 10 may include, but is not limited to, the following steps, and the order of some of these steps may be adjusted as appropriate, and some steps may be repeated. "clip is in the locked state" and "clip is in the unlocked state" are for convenience only and do not represent the initial state of the clip as being in the "locked state" or the final state of the clip as being in the "unlocked state", but are only used to indicate that the unlocking method converts the clip from the "locked state" to the "unlocked state"; when the clip is in the locked state, it meets the distal end of the first clip arm and the distal end of the second clip arm remain closed, and when the clip is in the unlocked state, it meets the distal end of the first clip arm and the distal end of the second clip arm reopen.

In some embodiments, deformation, or breakage, or displacement of the locking portion by force may cause the termination of the cooperation relationship between the locking portion and the locked portion. In some embodiments, the force applied to the locking portion may be applied by the disassembly device 700. As shown in FIG. 16-FIG. 25, in some embodiments, the clip 400 may be in the unlocked state and the locking portion 511 may be deformed, or broken, or displaced in the radial direction of the storage tube.

Figure 16:
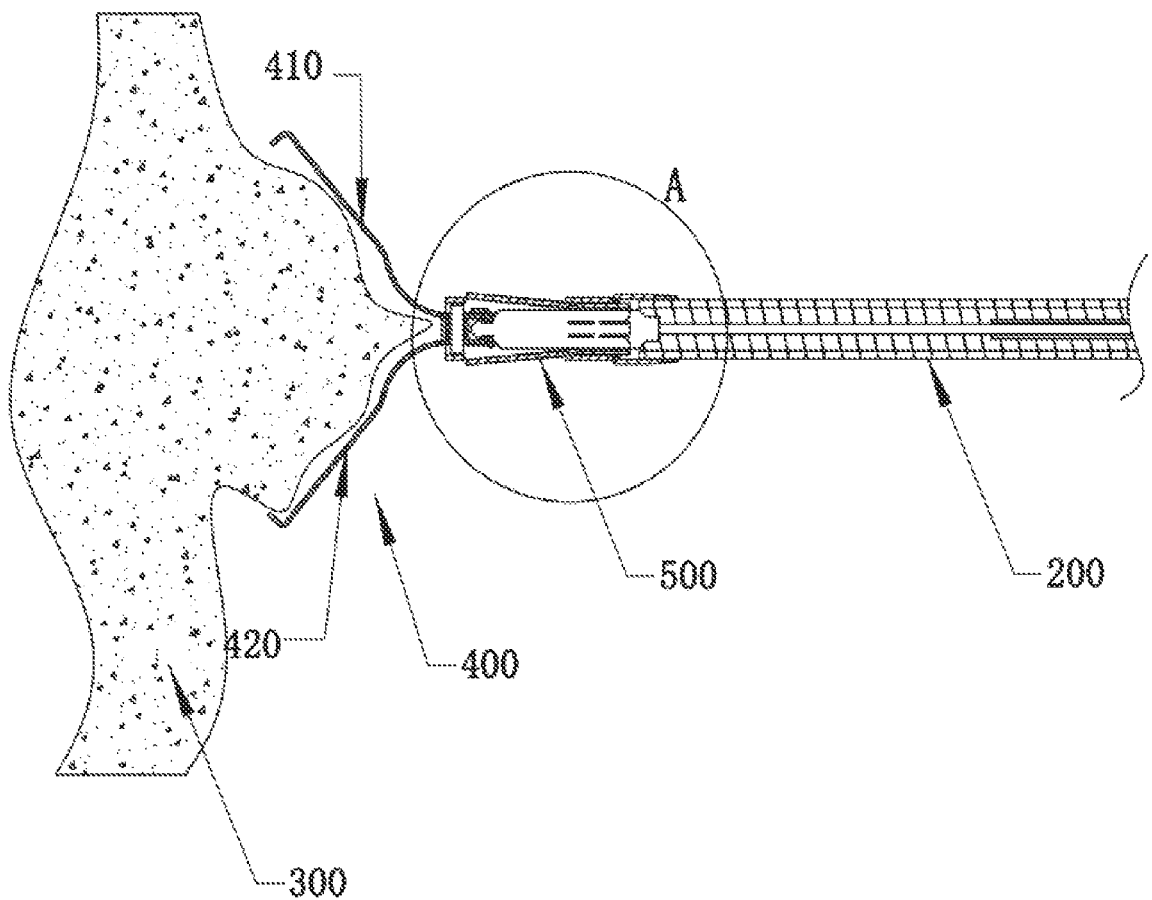
FIG. 16 is a schematic diagram I illustrating a working process of a clip device according to some embodiments of the present disclosure.
Figure 17:
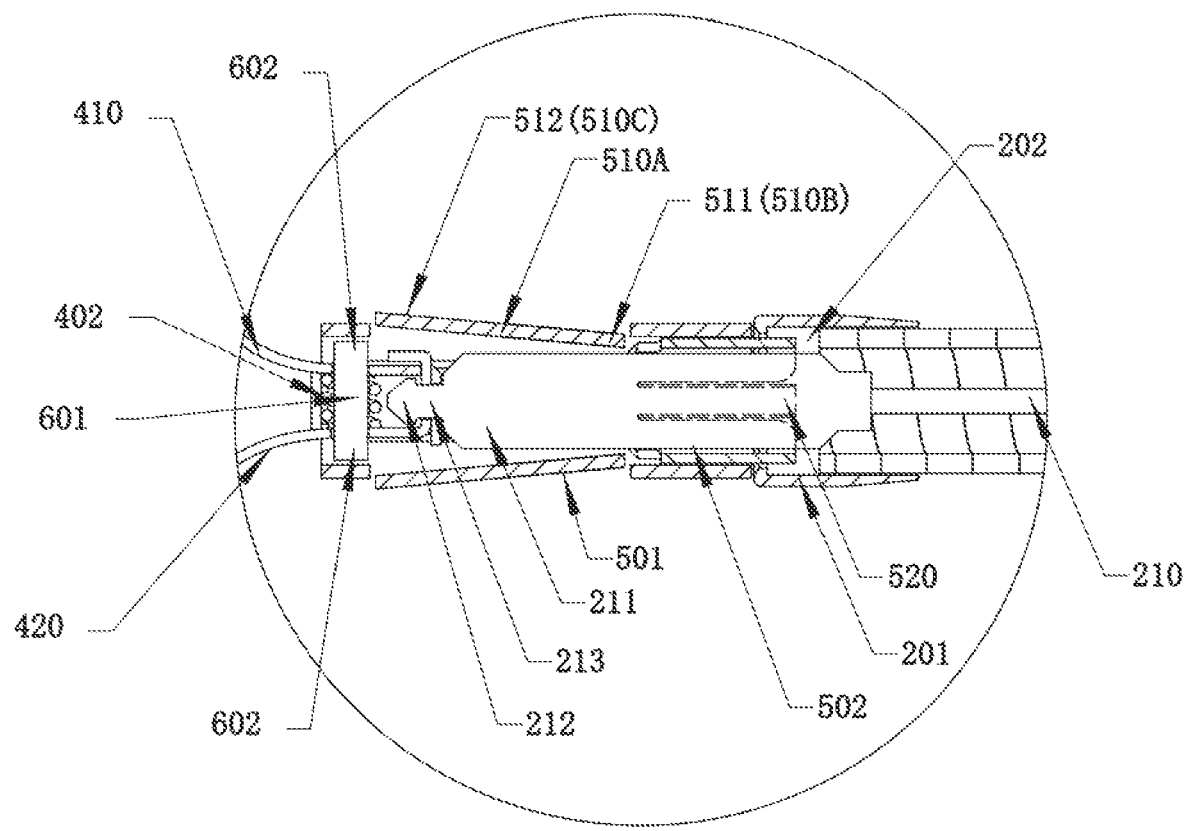
FIG. 17 is a partial A enlarged view of FIG. 16.

As shown in FIGS. 16 and 17, in some embodiments, the clip device 10 may include a restriction protrusion 520, the delivery device 20 may include a restriction recess 202, and the restriction protrusion 520 may be an assembly for limiting the movement of the clip device 10 in conjunction with the restriction recess 202. In some embodiments, the clip 400 is in the open state, the restriction protrusion 520 of the clip device 10 and the restriction recess 202 of the delivery device 20 may cooperate with each other to achieve an outer connection, and the sleeve hole 432 of the clip device 10 and the large diameter portion 212 of the connecting end 211 may cooperate with each other to achieve an inner connection. The movement of the mandrel 210 from the proximal end to the distal end drives the clip 400 to move from the proximal end to the distal end, causing the distal end of the first clip arm 410 and the distal end of the second clip arm 420 to move away from each other and the first clip arm 410 and the second clip arm 420 to move closer to the tissue 300.

In some embodiments, the locking portion 511 may include a shrapnel 510, which may be provided on the outer wall of the storage tube 500. In some embodiments, the shrapnel 510 may include a first end 510A, a second end 510B and a third end 510C. The first end 510A may be fixedly connected with the first storage tube 501, the second end 510B may be provided at a proximal end of the first end 510A, the third end 510C may be provided at a distal end of the first end 510A, and the second end 510B may form the locking portion. In some embodiments, a count of shrapnel 510 may include two, and the two shrapnel 510 may be provided symmetrically along a circumference of the outer wall of the storage tube 500.

In some embodiments, the locked portion 602 may include a connecting pin 601. In some embodiments, referring to FIGS. 4 to 7, the clip 400 may include the first clip arm 410, the second clip arm 420, and the connecting pin 601, the first clip arm and the second clip arm may be connected by the connecting pin 601, and the two ends of the connecting pin 601 may form the locked portion 602. In some embodiments, referring to FIGS. 11 to 15, the clip 400 may include the first clip arm 410, the second clip arm 420, and the linkage structure 605. A proximal hinge point and/or a distal hinge point of the linkage structure 605 may include a connecting pin. In some embodiments, the connecting pin provided at the proximal hinge point of the linkage structure 605 (i.e., the proximal end of the first proximal rod to the proximal end of the second proximal rod) may constitute the locked portion 602. In some embodiments, the connecting pin provided at the distal hinge point of the linkage structure 605 (i.e., the hinge point of the first clamp arm and the second clamp arm) may constitute the locked portion 602. In some embodiments, the clip 400 may further include a tie rod connected with the linkage structure 605, and the tie rod may be connected with the proximal end of the linkage structure 605 by the connecting pin, which may form the locked portion 602.

Figure 18:
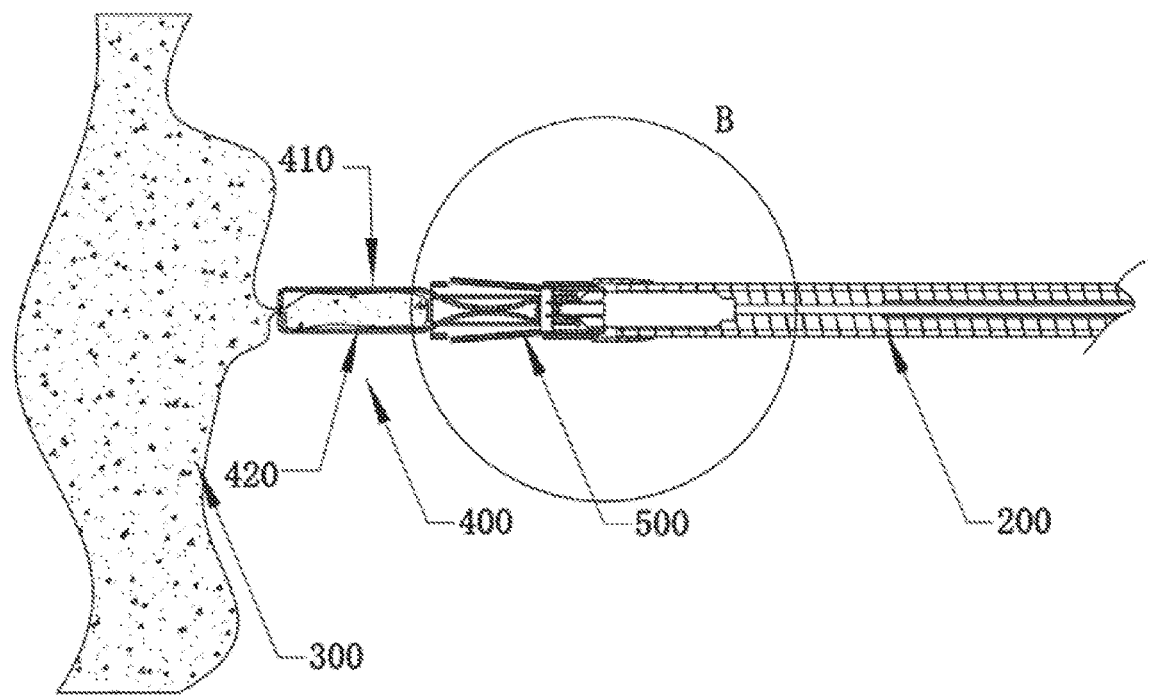
FIG. 18 is a schematic diagram II illustrating a working process of a clip device according to some embodiments of the present disclosure.
Figure 19:
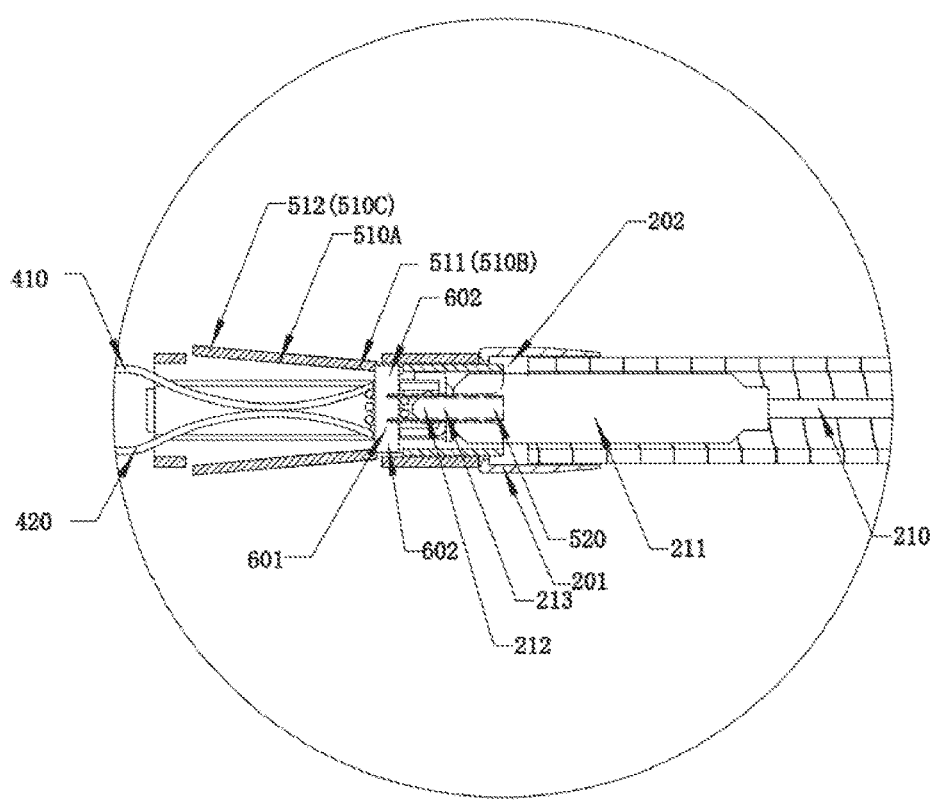
FIG. 19 is a partial B enlarged view of FIG. 18.

As shown in FIGS. 18 and 19, in some embodiments, the clip 400 is in the closed state, the restriction protrusion 520 of the clip device 10 and the restriction recess 202 of the delivery device 20 may cooperate with each other to achieve the outer connection, and the sleeve hole 432 of the clip device 10 and the large diameter portion 212 of the connecting end 211 may cooperate with each other to achieve the inner connection. The clip 400 may be switched from the open state to the closed state by the following operation: the movement of the mandrel 210 from the distal end to the proximal end may drive the movement of the clip 400 from the distal end to the proximal end, so that the distal end of the first clip arm 410 and the distal end of the second clip arm 420 are close to each other and the distal end of the first clip arm 410 and the distal end of the second clip arm 420 grip the tissue 300. The connecting pin 601 may move from the distal end to the proximal end in the channel of the storage tube 500, and the two ends of the connecting pin 601 (i.e., the locked portion 602) may be not yet located at the proximal end of the second end 510B (locking portion 511), i.e., the locked portion 602 and the locking portion 511 have not yet cooperated with each other, i.e., the clip 400 is only in the closed but not locked state. At this time, if the tissue 300 clamped by the distal end of the first clip arm 410 and the distal end of the second clip arm 420 is not properly clamped, the mandrel 210 may be pushed from the proximal to the distal end, causing the distal end of the first clip arm 410 and the distal end of the second clip arm 420 to move away from each other, i.e., the clip 400 is switched from the closed state to the re-opened state.

Figure 20:
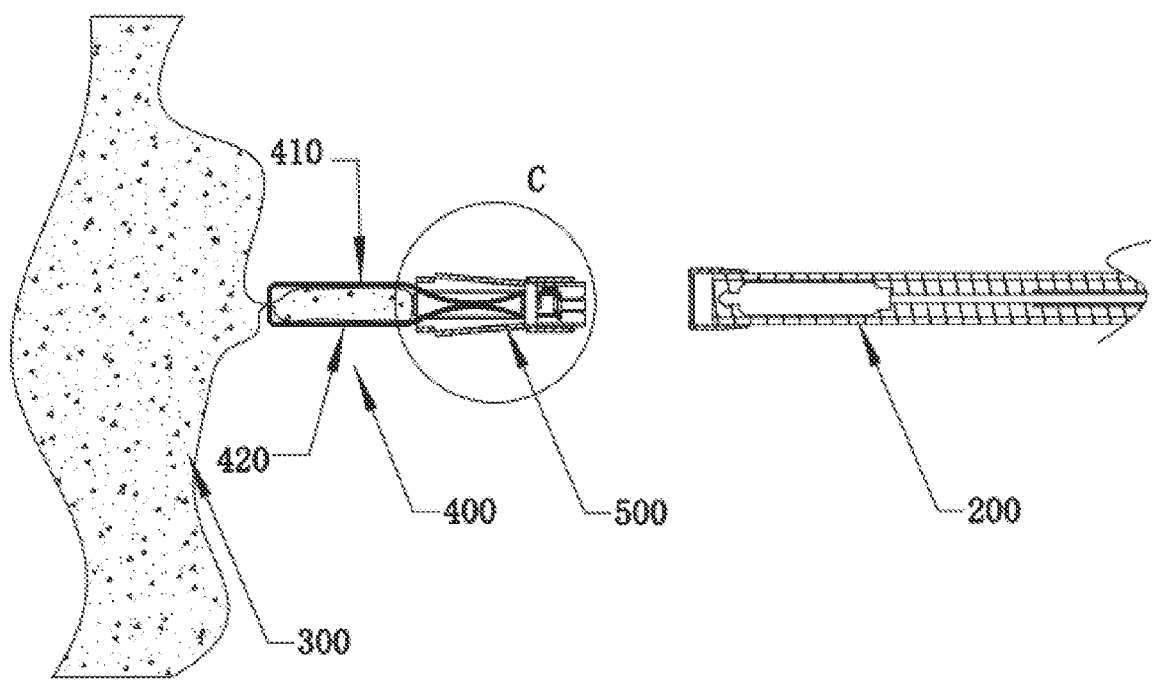
FIG. 20 is a schematic diagram III illustrating a working process of a clip device according to some embodiments of the present disclosure.
Figure 21:
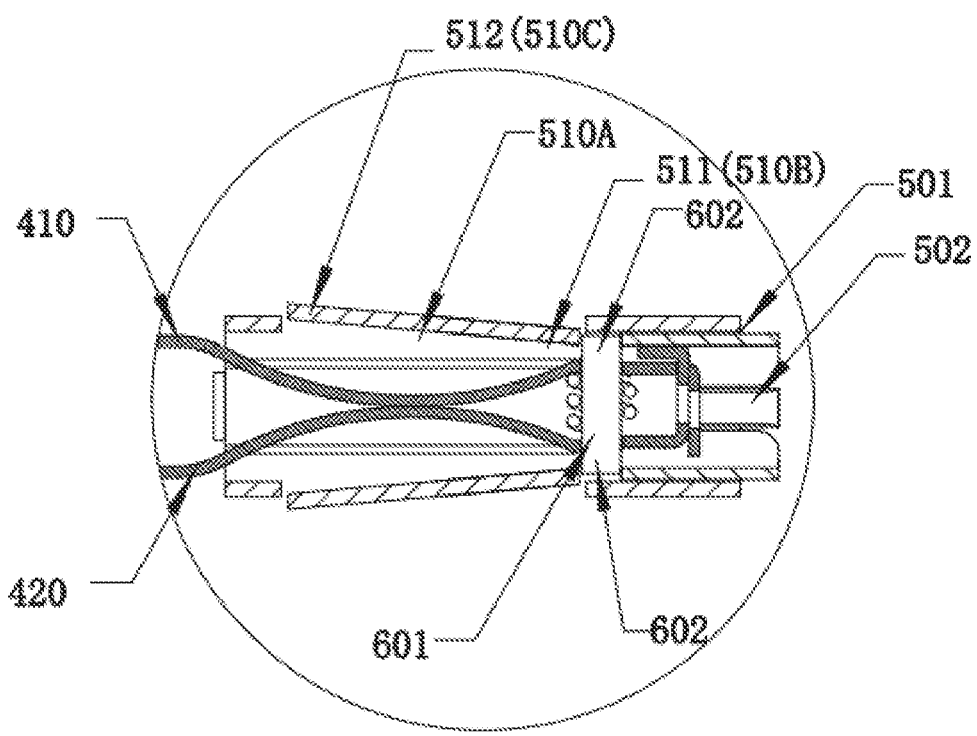
FIG. 21 is a partial C enlarged view of FIG. 20.

In some embodiments, the first storage tube 501 may include a shrapnel 510. The shrapnel 510 may include a first end 510A, a second end 510B and a third end 510C. The first end 510A may be fixedly connected with the outer wall of the first storage tube 501, the second end 510B may be provided at the proximal end of the first end 510A, the third end 510C may be provided at the distal end of the first end 510A, and the second end 510B of the shrapnel may form the locking portion. In some embodiments, the second end 510B may extend inside the channel and the third end 510C may extend outside the outer wall when the clip 400 is in the locked state; when the clip 400 is switched from the locked state to the unlocked state, the second end 510B may extend outside the outer wall and the third end 510C may extend inside the channel. In some embodiments, the first clip arm 410 and the second clip arm 420 may be connected by the connecting pin 601, with the ends of the connecting pin 601 forming the locked portion 602. As shown in FIG. 20-FIG. 21, in some embodiments, the clip 400 is in the locked state and the connection of the clip device 10 to the delivery device 20 may be released. In some embodiments, the termination of the connection between the clip device 10 and the delivery device 20 may include termination of a connection outside the restriction protrusion 520 of the clip device 10 and the restriction recess 202 of the delivery device 20. In some embodiments, the termination of the connection between the clip device 10 and the delivery device 20 may also include termination of a connection between the sleeve hole 432 of the clip device 10 and the large diameter portion 212 within the connecting end 211. When the clip 400 is in the locked state, the clip 400 may be fixed at the tissue 300 and the delivery device 20 may be withdrawn through the endoscopic jaw channel. The clip 400 may be switched from the closed state to the locked state by operating as follows: the mandrel 210 may move from the distal end to the proximal end to drive the clip 400 to move from the distal end to the proximal end, the connecting pin 601 may move from the distal end to the proximal end within the storage tube 500 channel, the two ends of the connecting pin 601 (i.e., the locked portion 602) may cross over the second end 510B (locking portion 511) and may be located proximal to the second end 510B (locking portion 511), the second end 510B (locking portion 511) may extend inside the channel of the storage tube 500, and the third end 510C may extend outside the channel of the storage tube 500, and a radial distance of the second end 510B (locking portion 511) may be smaller than a radial distance of the locked portion 602, therefore, the connecting pin 601 is blocked by the second end 510B (locking portion 511) so that an axial movement of the clip 400 is blocked from the proximal end to the distal end, i.e. the distal end of the first clip arm 410 and the distal end of the second clip arm 420 remain closed, i.e. the clip 400 is in the locked state. That is, when the clip 400 is in the locked state, the second end may extend inside the channel, the third end may extend outside the outer wall, the two ends of the connecting pin 601 (i.e., the locked portion 602) and the second end 510B (the locking portion 511) may cooperate with each other, the storage tube 500 may constitute a movement restriction for the clip 400, and the distal ends of the first clip arm 410 and the second clip arm 420 remain closed.

Figure 22:
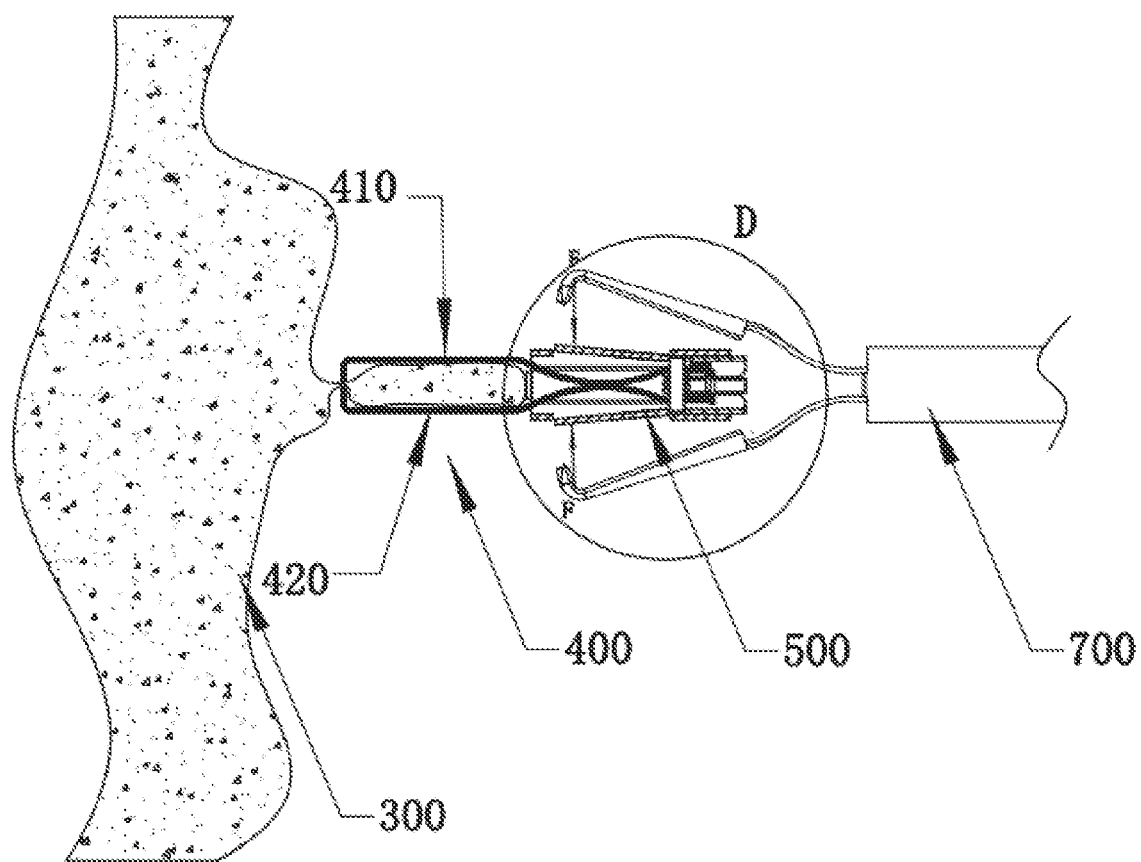
FIG. 22 is a schematic diagram IV illustrating a working process of a clip device according to some embodiments of the present disclosure.
Figure 23:
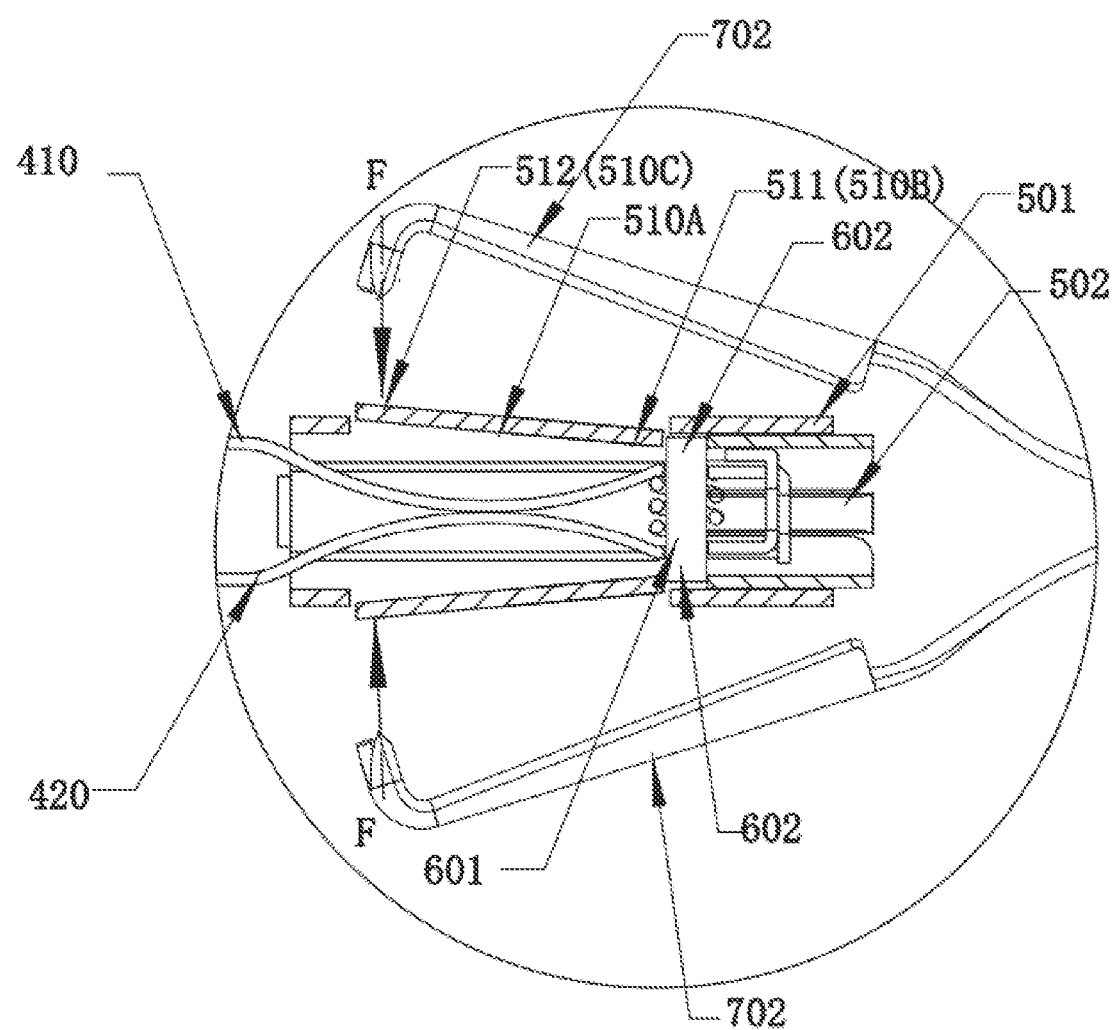
FIG. 23 is a partial D enlarged view of FIG. 22.

As shown in FIG. 22-FIG. 23, in some embodiments, the clip 400 may be in a state waiting to be disassembled. The disassembly device 700 may be accessed through the endoscopic jaw channel. A first disassembly arm 701 and a second disassembly arm 702 of the disassembly device 700 may be spread close to the unlocking portion 512 of the clip 400 that is already in the locked state.

In some embodiments, after the clip 400 is in the locked state, the clip 400 may be switched from the locked state to the unlocked state by the termination of the cooperation relationship between the locking portion 511 and the locked portion 602.

In some embodiments, the deformation, or fracture, or displacement of the locking portion 511 may cause the termination of the cooperation relationship between the locking portion 511 and the locked portion 602.

Figure 24:
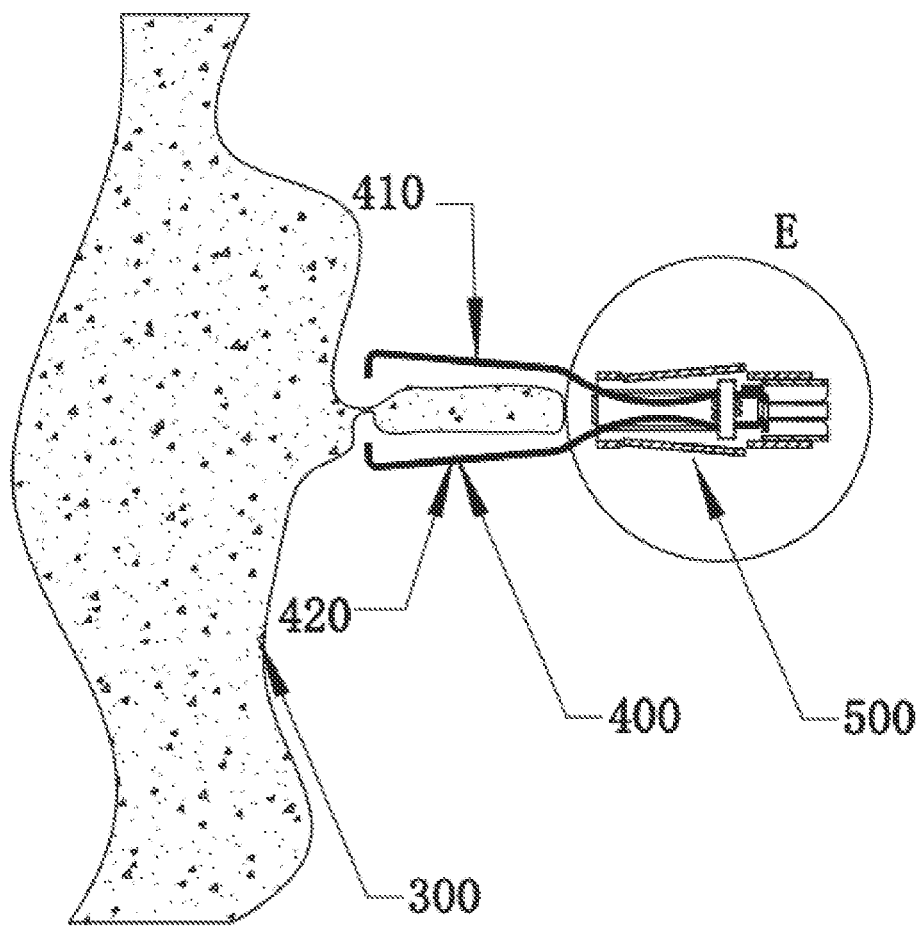
FIG. 24 is a schematic diagram V illustrating a working process of a clip device according to some embodiments of the present disclosure.
Figure 25:
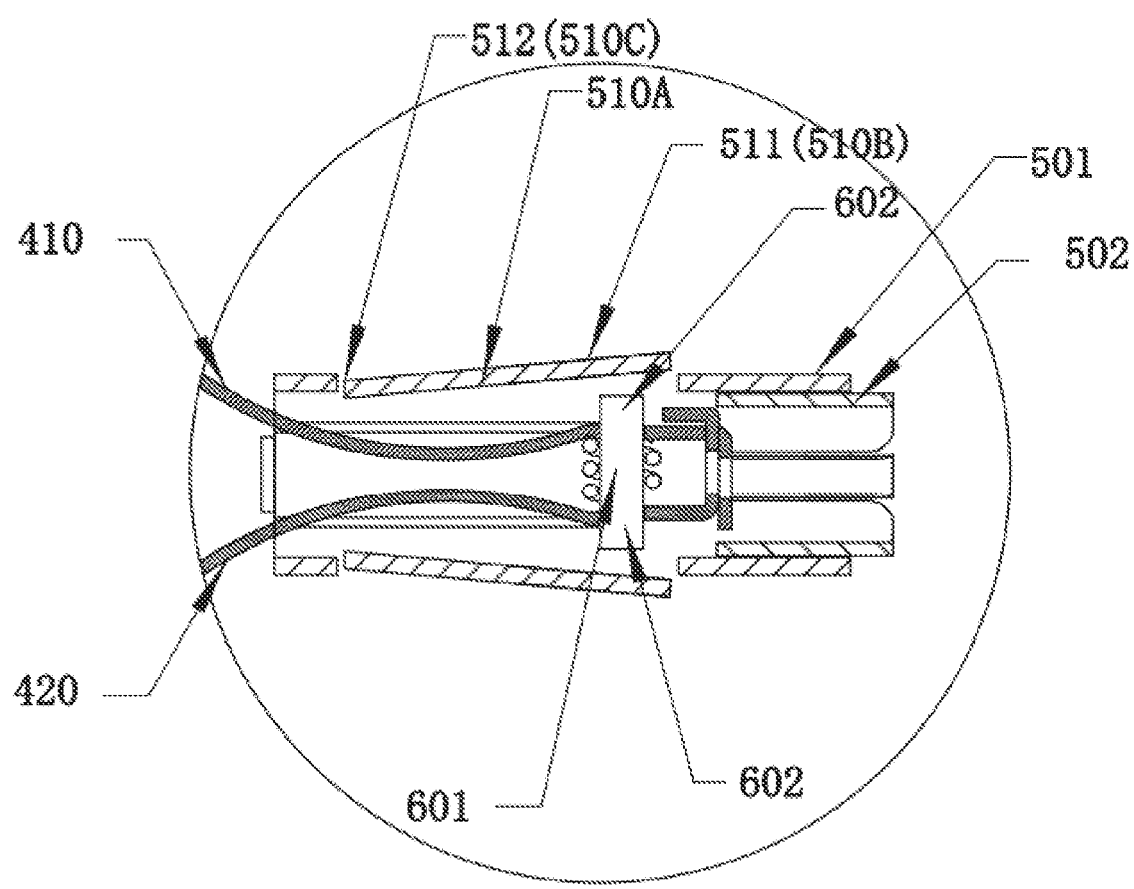
FIG. 25 is a partial E enlarged view of FIG. 24.

As shown in FIG. 24-FIG. 25, in some embodiments, the clip 400 may be in the re-opened state, i.e., the clip 400 is in the unlocked state. The clip may be switched from the locked state to the unlocked state as follows: the first disassembly arm 701 and the second disassembly arm 702 may radially apply force inward to the third end 510C (unlocking portion 512), and the third end 510C may be switched from the state of extending outside the channel of the storage tube 500 to the state of extending inside the channel of the storage tube 500, thereby driving the second end 510B to be displaced radially outward, i.e., the second end 510B is switched from the state of extending inside the channel of the storage tube 500 to the state of extending outside the channel of the storage tube 500. That is, the third end 510C may be subjected to a force radially toward the inside of the storage tube, the third end 510C may extend into the inside of the channel of the storage tube 500, the second end 510B (locked part 511) may extend outside the outer wall of the channel of the storage tube 500, a distance between the two ends of the connecting pin 601 (i.e., the locked portion 602) may be smaller than a distance between the second end 510B (locked portion 511), the cooperation relationship between the second end 510B (locking portion 511) and the two ends of the connecting pin 601 (i.e., the locked portion 602) may be released, and the movement restriction of the storage tube 500 on the clip 400 may be released. In some embodiments, the locked portion 602 may be a protrusion located at the distal end of the first clip arm 410 and the proximal end of the second clip arm 420, with a distance of the locked portion 602 being a protrusion distance. The clip 400 is in the unlocked state, causing the distal end of the first clip arm 410 and the distal end of the second clip arm 420 to move away from each other, i.e., the clip 400 is switched from the closed state to the re-opened state.

In some embodiments, deformation, or fracture, or displacement of the locked portion 602 of the clip 400 may cause the termination of the cooperation relationship between the locked portion 511 and the locked portion 602.

Figure 26:
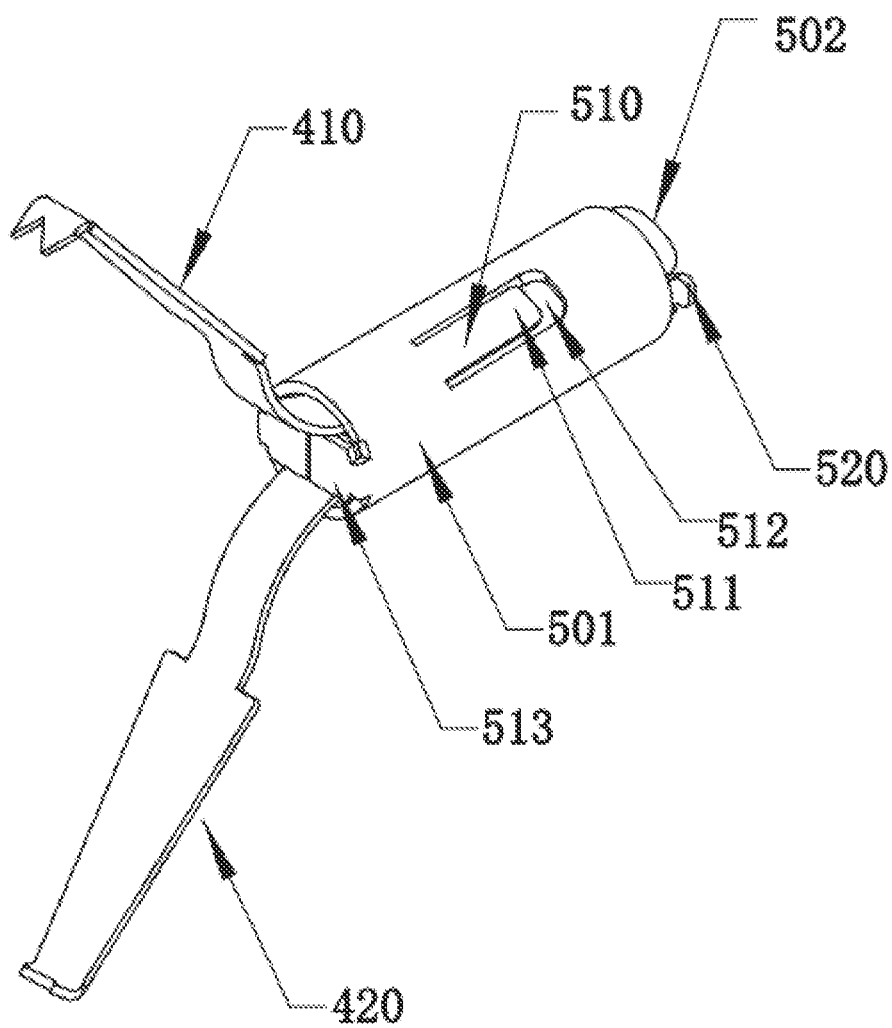
FIG. 26 is a schematic diagram illustrating a clip device according to some embodiments of the present disclosure.
Figure 27:
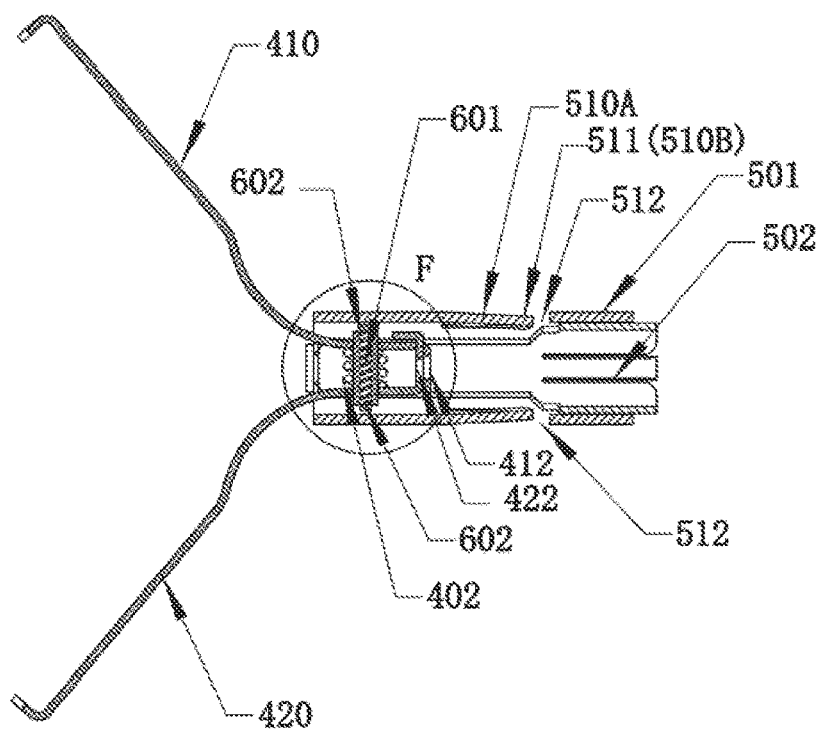
FIG. 27 is a cross-sectional view illustrating a clip device according to some embodiments of the present disclosure.

In some embodiments, the locked portion 602 may include the connecting pin 601. The connecting pin 601 may be connected with the clip arms. Compression of the connecting pin along a radical direction of the storage tube may cause the termination of the cooperation relationship between the locking portion 511 and the locked portion 602. As shown in FIG. 26-FIG. 27, in some embodiments, the locking portion 511 may include the shrapnel 510. In some embodiments, the shrapnel 510 may include a first end 510A and a second end 510B. The first end 510A may be fixedly connected with the storage tube 500; the second end 510B may extend inside the channel of the storage tube 500. In some embodiments, referring to FIGS. 23 to 25, the shrapnel may also include a first end 510A, a second end 510B and a third end 510C. The first end 510A may be fixedly connected with the first storage tube 501, the second end 510B may be provided at the proximal end of the first end 510A and the third end 510C may be provided at the distal end of the first end 510A of the shrapnel. In some embodiments, the second end 510B may form the locking portion 511. In some embodiments, a count of shrapnel 510 may include two, and the two shrapnel 510 may be provided symmetrically along the circumference of the outer wall of the storage tube 500. In some embodiments, the storage tube 500 may also not include the shrapnel 510, but have a recess in the outer wall of the storage tube 500 toward the distal end, with the recess forming the locking portion. In some embodiments, a count of recesses may include two, and the two recesses may be provided symmetrically along the circumference of the outer wall of the storage tube 500.

Figure 28:
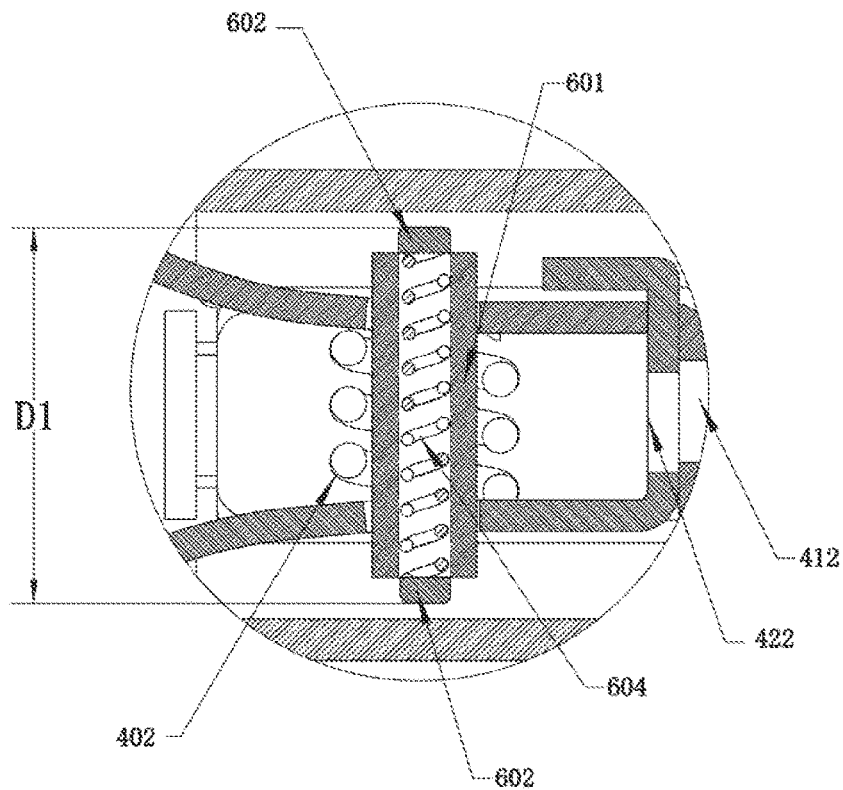
FIG. 28 is a partial F enlarged view of FIG. 27.

In some embodiments, the clip 400 may include the connecting pin 601, which may be deformed along its own axis, changing a length of the connecting pin 601 in its own axial direction. In some embodiments, one end of the connecting pin 601 may form the locked portion 602. In some embodiments, both ends of the connecting pin 601 may form the locked portion 602. In some embodiments, the connecting pin 601 may include movable ends provided at both ends of the connecting pin 601 and a spring 604 connecting the movable ends, and the movable ends may be compressed by force along the axial direction of the connecting pin 601 (or the radial direction of the storage tube 500) to compress the spring 604 so that a dimension of the connecting pin 601 along the radial direction of the storage tube 500 is less than the distance of the locking portion 511 (e.g., a distance between two second ends 510B, or, a distance between two recesses). As shown in FIG. 28, the connecting pin 601 may include the spring 604, which is radially inwardly contracted when the spring 604 is subjected to a radially inward squeezing force, and a radial distance between the movable ends of the spring 604 (the locked portion 602) becomes smaller; the radial distance between the movable end of the spring 604 (the locked portion 602) may be less than the distance of the locked portion 511 (e.g., the second end 510B), and the clip 400 may be switched from the locked state to the unlocked state.

In some embodiments, as shown in FIG. 29-FIG. 32, the clip 400 may be switched from the locked state (the clip 400 is in a locked and waiting to be removed state) to the unlocked state (the clip 400 is in the re-opened state).

Figure 29:
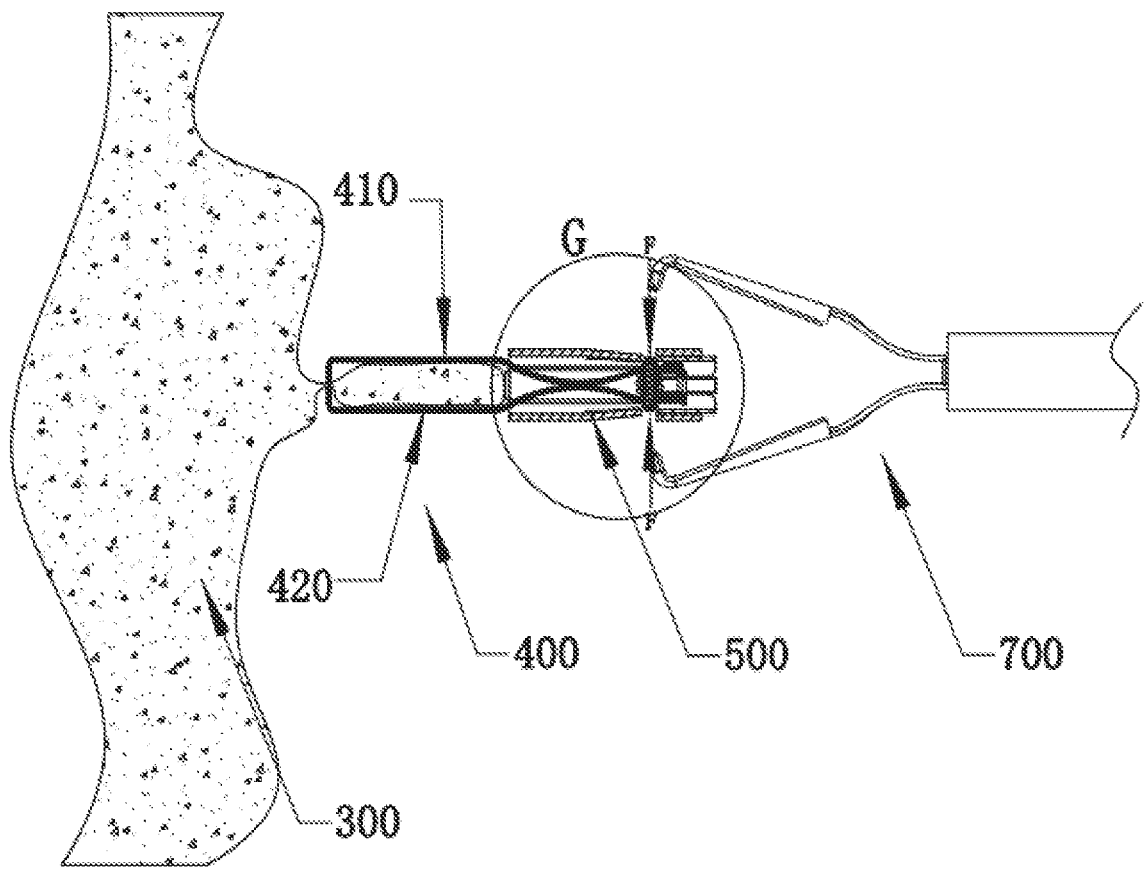
FIG. 29 is a schematic diagram IV illustrating a working process of a clip device according to some embodiments of the present disclosure.
Figure 30:
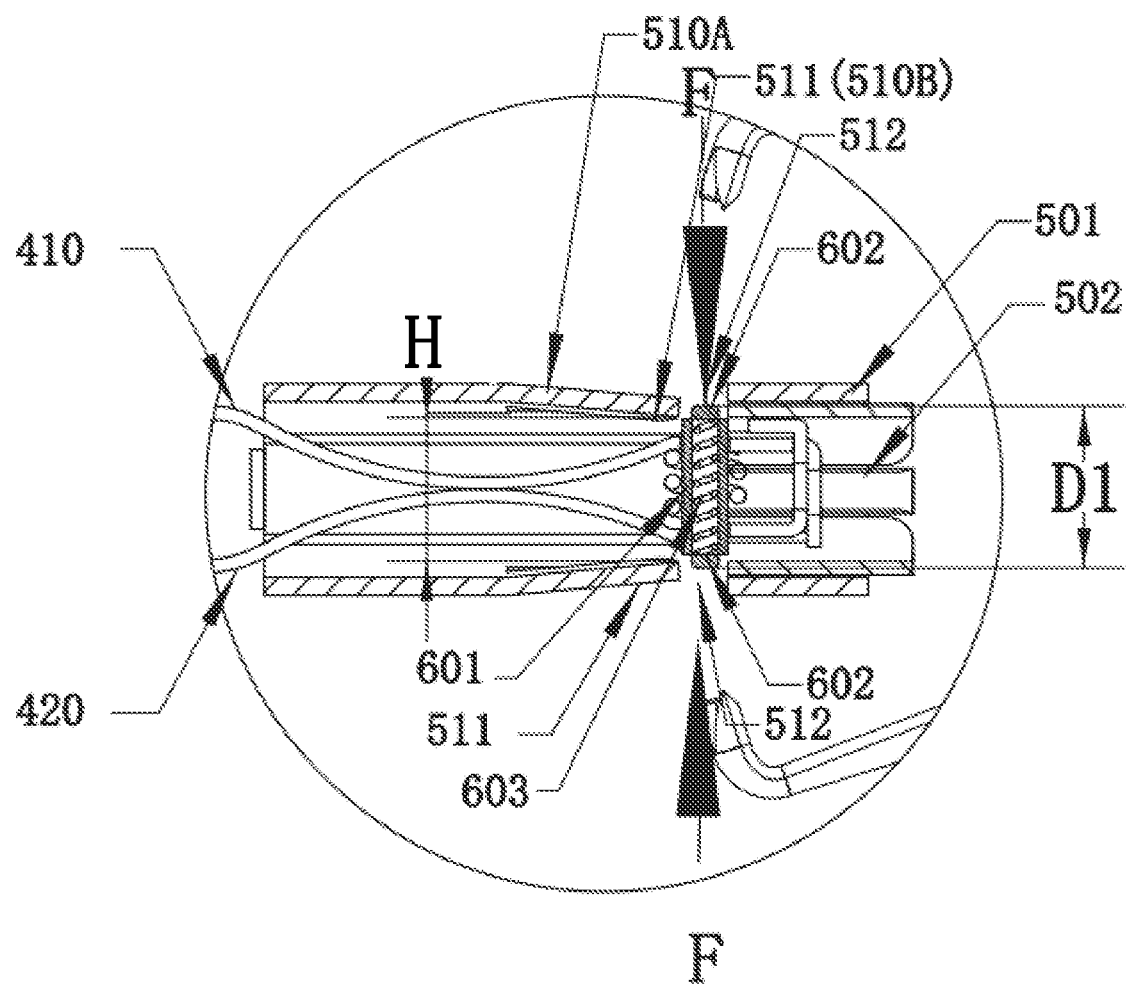
FIG. 30 is a partial G enlarged view of FIG. 29.

As shown in FIG. 29-FIG. 30, in some embodiments, the clip 400 may be in the locked state, the restriction protrusion 520 of the clip device 10 and the restriction recess 202 of the delivery device 20 may be unconnected externally, the sleeve hole 432 of the clip device 10 and the large diameter portion 212 of the connecting end 211 may be unconnected internally, the clip 400 may be fixed at the tissue 300, and the delivery device 20 may be withdrawn through the endoscopic jaw channel. The clip 400 may be switched from the closed state to the locked state by operating as follows: the movement of the mandrel 210 from the distal end to the proximal end may drive the clip 400 to move from the distal end to the proximal end, the connecting pin 601 may move from the distal end to the proximal end within the channel of the storage tube 500, the ends of the connecting pin 601 (i.e., the locked portion 602) may cross over the second end 510B (locking portion 511) and may be located at the proximal end of the second end 510B (locking portion 511), the second end 510B (locking portion 511) may extend into the channel of the storage tube 500, and a radial distance H of the second end 510B (locking portion 511) may be smaller than a radial distance D1 of the locked portion 602, so that the connecting pin 601 is blocked by the second end 510B (locking portion 511), and the axial movement of the clip 400 is blocked from the proximal end to the distal end. That is, the distal end of the first clip arm 410 and the distal end of the second clip arm 420 remain closed, that is, the clip 400 is in the locked state. That is, the clip 400 is in the locked state, the two ends of the connecting pin 601 (i.e., the locked portion 602) and the second end 510B (the locking portion 511) may cooperate with each other, and the distal ends of the first clip arm 410 and the second clip arm 420 remain closed. In some embodiments, when the movement of the mandrel 210 from the distal end to the proximal end drives the movement of the clamp 400 from the distal end to the proximal end, the connecting pin 601 may be in a compressed state within the channel of the storage tube 500, when the length of the connecting pin 601 along the radial direction of the storage tube is less than an initial length along the radial direction of the storage tube when the connecting pin 601 is not compressed. In some embodiments, when the connecting pin 602 moves toward the proximal end to cross the locking portion 511 (e.g., the second end 510B, or the recess in the outer wall of the storage tube), the compression of the connecting pin by the storage tube may be released and the connecting pin 601 may return to its initial length. In some embodiments, the initial length of the connecting pin 601 may be greater than the radial distance H of the locking portion 511, and the locking portion 511 may act as a block to the connecting pin 602, so that the axial movement of the clip 400 from the proximal end to the distal end is restricted.

When the clip needs to be disassembled, the disassembly device 700 may be accessed through the endoscope clamp channel. The first disassembly arm 701 and the second disassembly arm 702 of the disassembly device 700 may be spread close to the unlocking portion 512 of the clip 400 that is already in the locked state.

Figure 31:
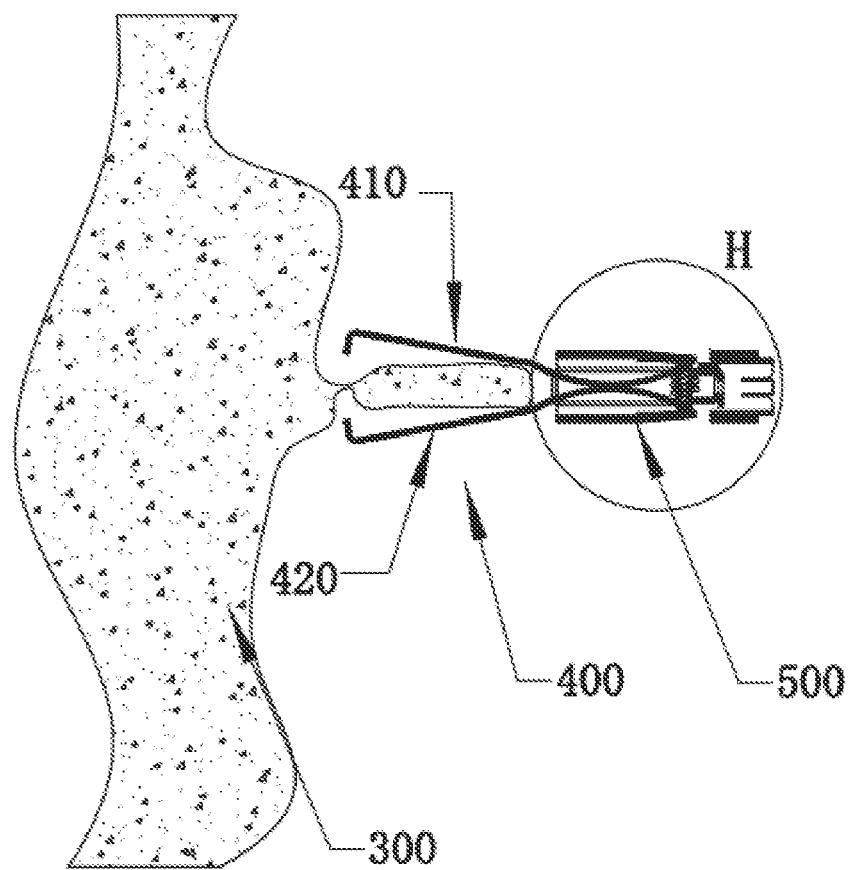
FIG. 31 is a schematic diagram V illustrating a working process of a clip device according to some embodiments of the present disclosure.
Figure 32:
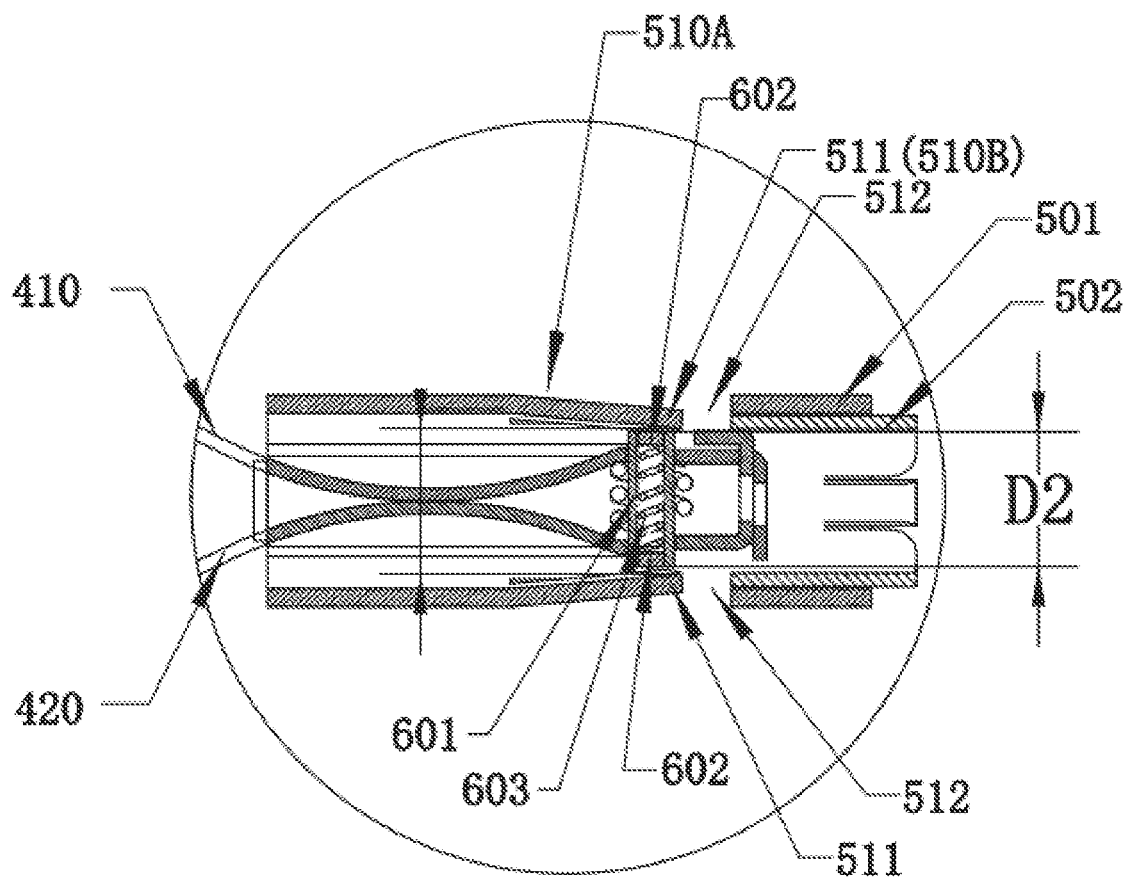
FIG. 32 is a partial H enlarged view of FIG. 31.
Figure 33:
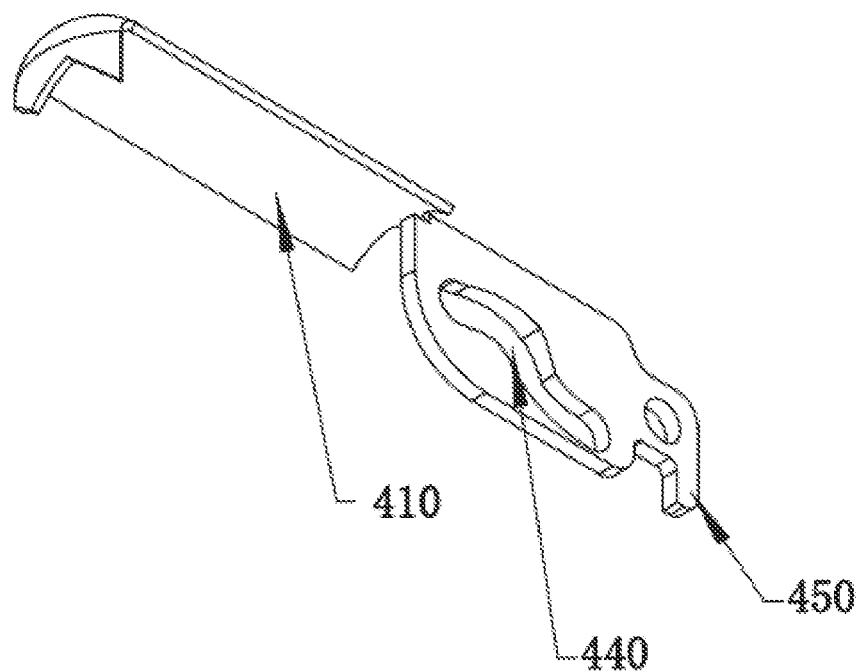
FIG. 33 is a schematic diagram illustrating a first clip arm according to some embodiments of the present disclosure.
Figure 34:
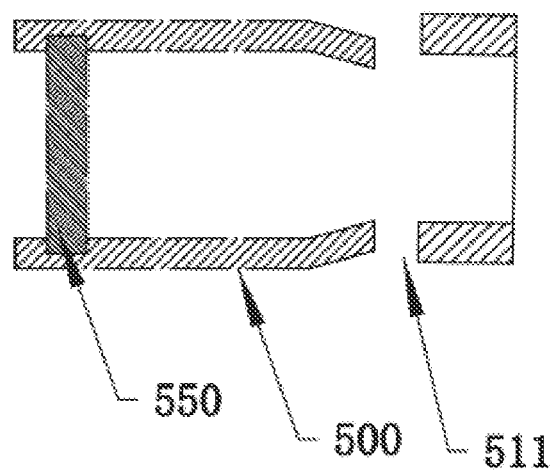
FIG. 34 is a cross-sectional view illustrating a stowage tube according to some embodiments of the present disclosure.

As shown in FIG. 31-FIG. 32, in some embodiments, the clip 400 may be in the re-opened state, i.e., the clip is in the unlocked state. The first disassembly arm 701 and the second disassembly arm 702 may apply radially inward force to the locked portion 602 (e.g., the movable ends of the connecting pin 601) through the unlocking portion 512, and the spring 604, which is interlocked with the locked portion 602, contracts radially inward when subjected to the radially inward squeezing force, i.e., the radial distance of the locked portion 602 becomes smaller; the radial distance D2 of the locked portion 602 may be smaller than the distance H of the locking portion 511, and the clip 400 may be switched from the locked state to the unlocked state. In some embodiments, the locking portion 511 may be a locking slot provided in the storage tube. The clip 400 is in the unlocked state, causing the distal end of the first clip arm 410 and the distal end of the second clip arm 420 to move away from each other, i.e., the clip 400 is switched from the closed state to the re-opened state.

In some embodiments, the clip arms may include a protrusion disposed at the proximal end of the clip arms, the protrusion may be an assembly for cooperating with the locking slot to achieve a locked state, and the protrusion may form the locked portion; the protrusion may be displaced by the force along the radial direction of the storage tube, and the cooperation relationship between the locking portion and the locked portion may be released.

In some embodiments, the protrusions may include a first protrusion provided at the proximal end of the first clip arm 410 and a second protrusion provided at the proximal end of the second clip arm 420. The first protrusion and the second protrusion may be radially distant from each other. The storage tube 500 may be provided with a locking slot. The locking slot may form the locking portion 511. The first protrusion and the second protrusion may extend into the locking slot so that the locking portion 511 and the locked portion 602 may cooperate with each other; after the first protrusion and the second protrusion exit the locking slot, so that the cooperation relationship between the locking portion 511 and the locked portion 602 is released. In some embodiments, the clip 400 may also include a sliding slot, the sliding slot may be provided at the proximal ends of the clip arms, and the storage tube 500 may also include a pin, and the sliding slot may be slidably connected with the pin.

As shown in FIG. 33-FIG. 36, in some embodiments, the proximal ends of the clamp arms may be provided with the sliding slots 440, and the storage tube 500 may include the pin 550, which is fixedly connected with the storage tube 500. In some embodiments, the pin 550 may be provided through the sliding slot 440, which extends in a direction that is not parallel to the axial direction of the storage tube. In some embodiments, a sliding slot of the first clip arm 410 (e.g., a first sliding slot) and a sliding slot of the second clip arm 420 (e.g., a second sliding slot) may be provided symmetrically with respect to the axial direction of the storage tube, and the proximal end of the first clip arm 410 and the proximal end of the second clip arm 420 may be subject to axial pull from the distal end to the proximal end, and the sliding slot 440 may move from the distal end to the proximal end relative to the pin 550, with the distal end of the first clip arm 410 and the distal end of the second clip arm 420 gradually approaching.

Figure 35:
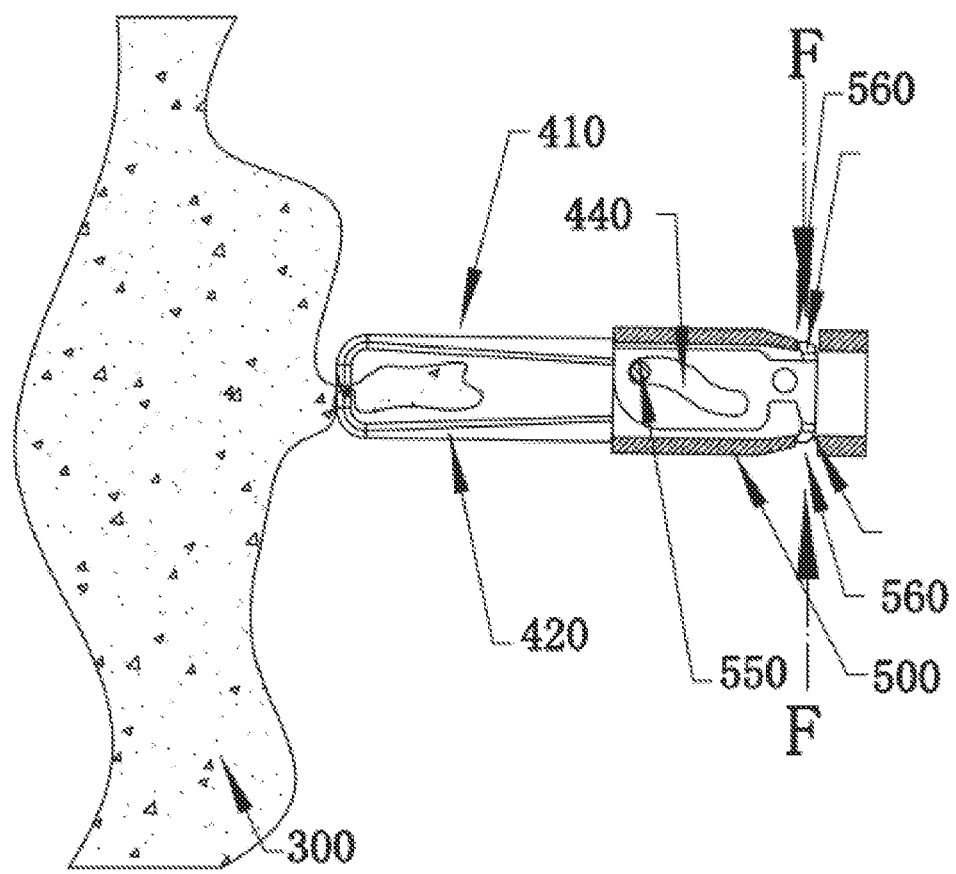
FIG. 35 is a schematic diagram IV illustrating a working process of a clip device according to some embodiments of the present disclosure.
Figure 36:
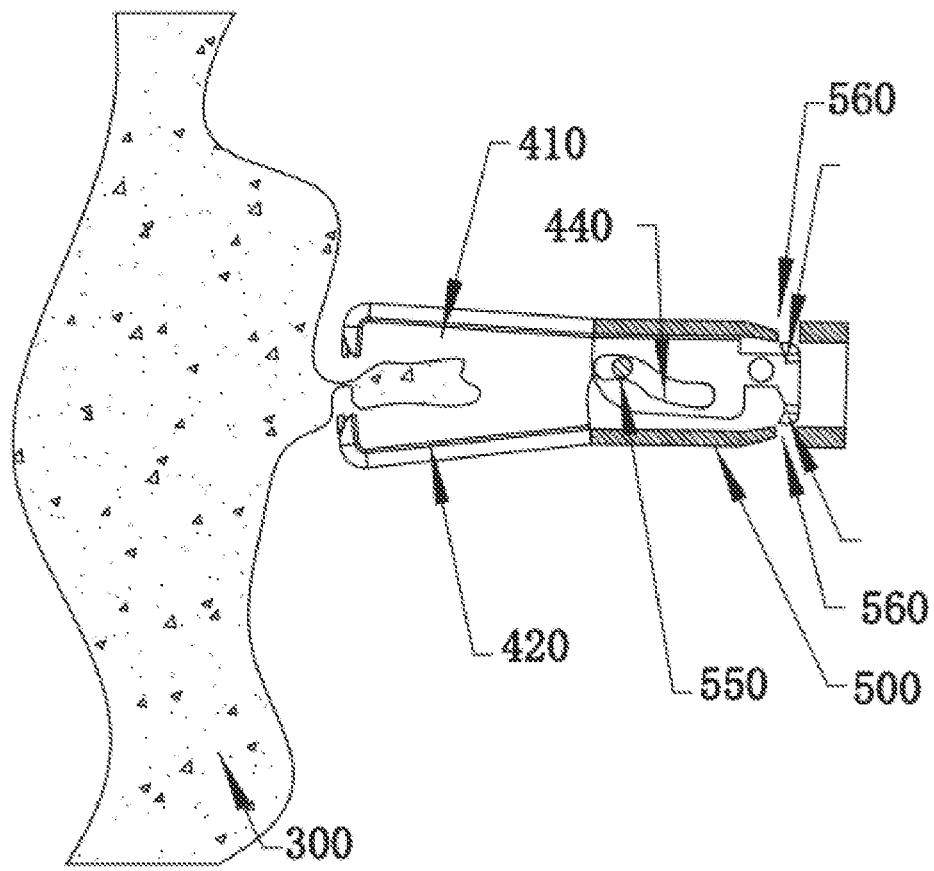
FIG. 36 is a schematic diagram V illustrating a working process of a clip device according to some embodiments of the present disclosure.
Figure 37:
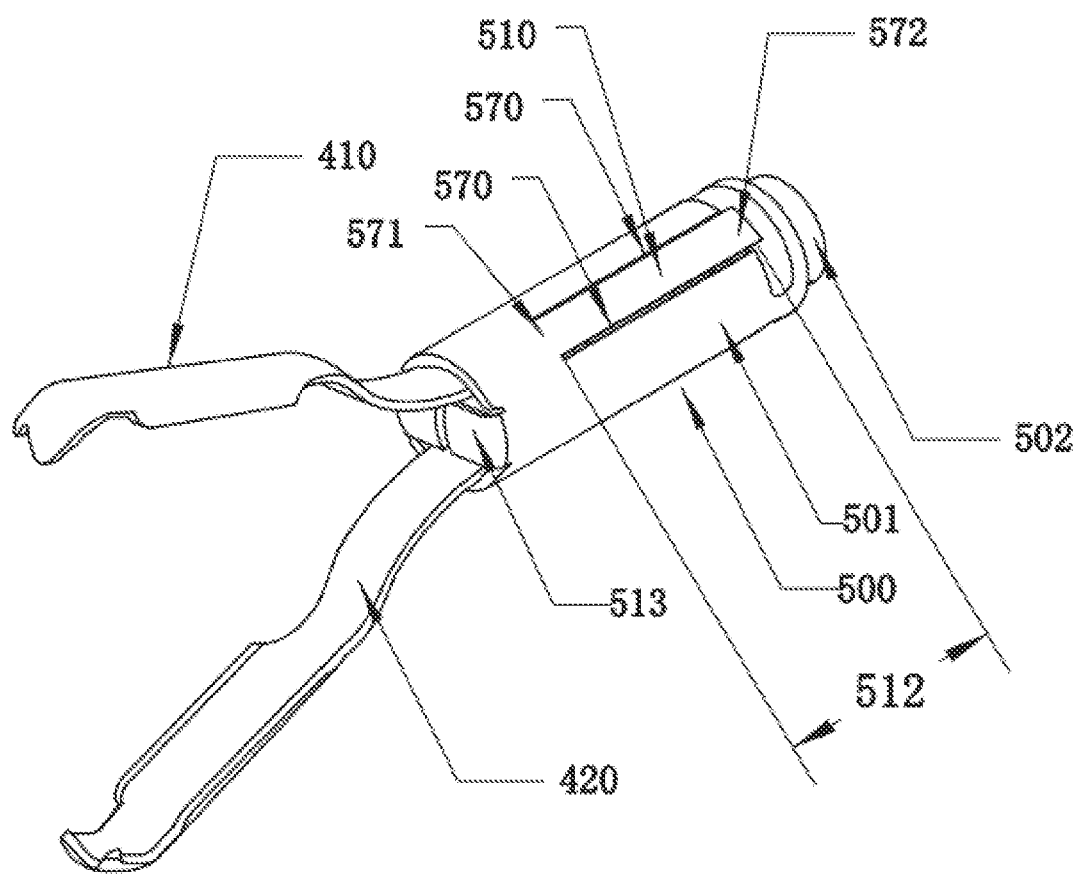
FIG. 37 is a schematic diagram illustrating a clip device according to some embodiments of the present disclosure.
Figure 38:
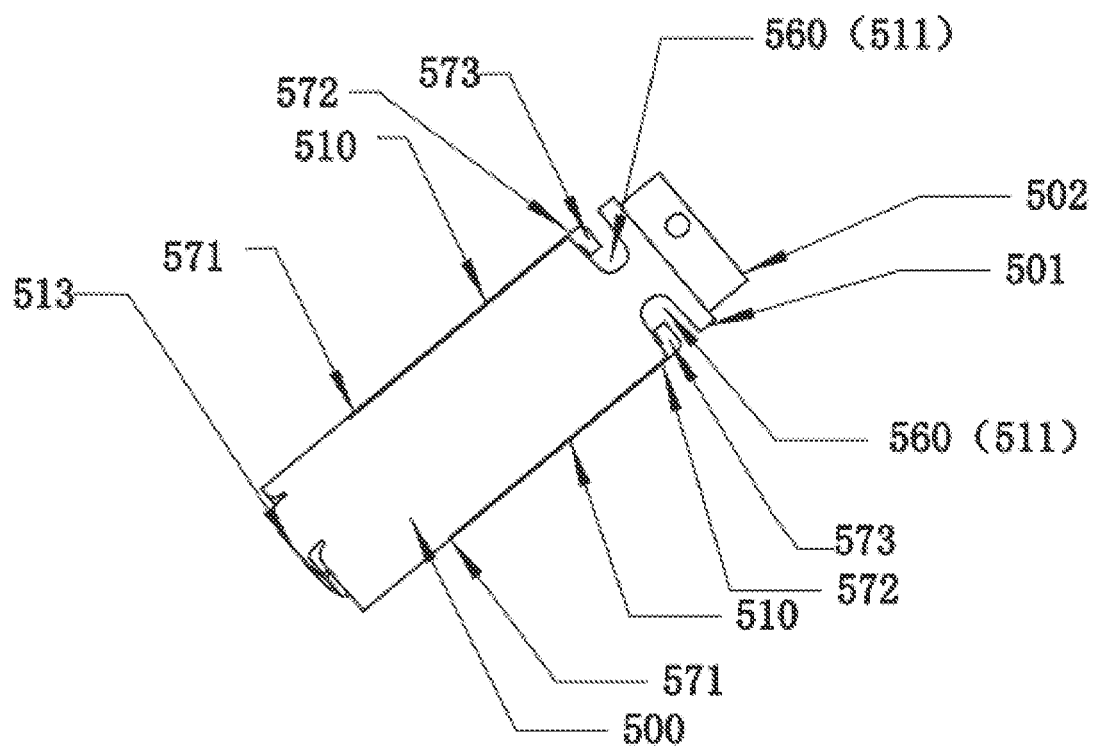
FIG. 38 is a schematic diagram illustrating a stowage tube according to some embodiments of the present disclosure.
Figure 39:
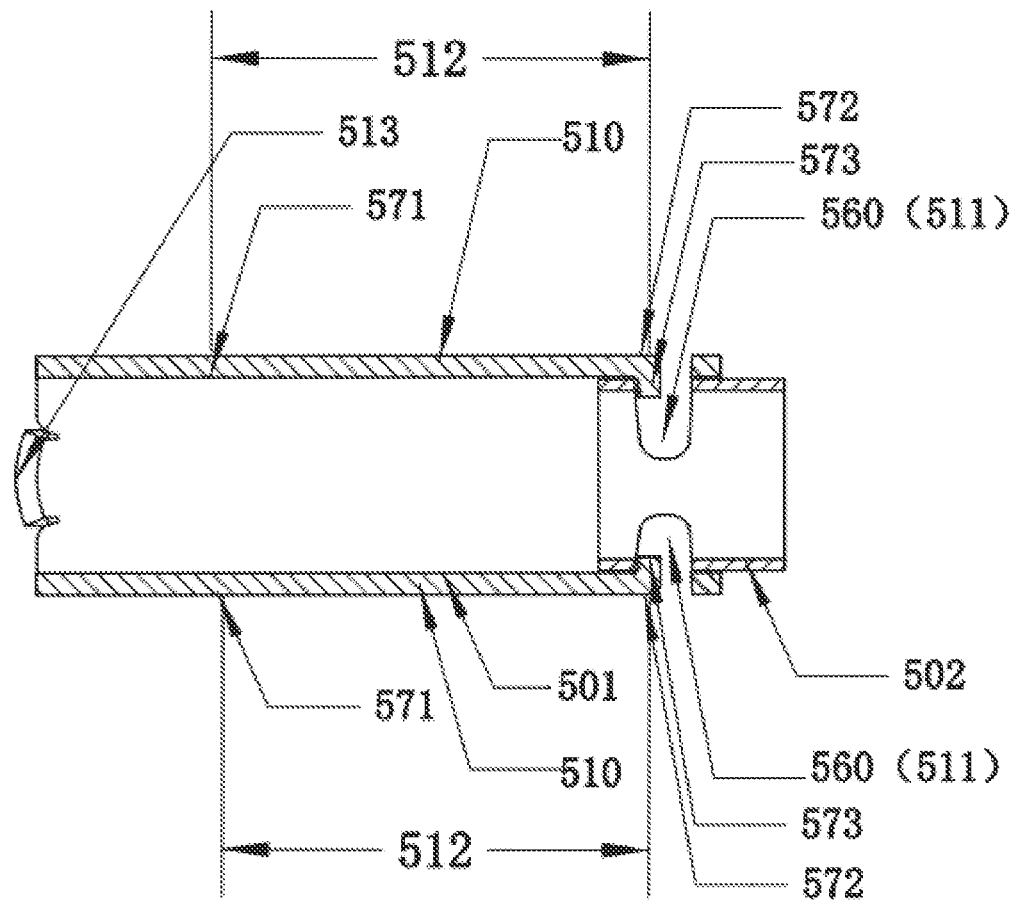
FIG. 39 is a cross-sectional view illustrating a stowage tube according to some embodiments of the present disclosure.
Figure 40:
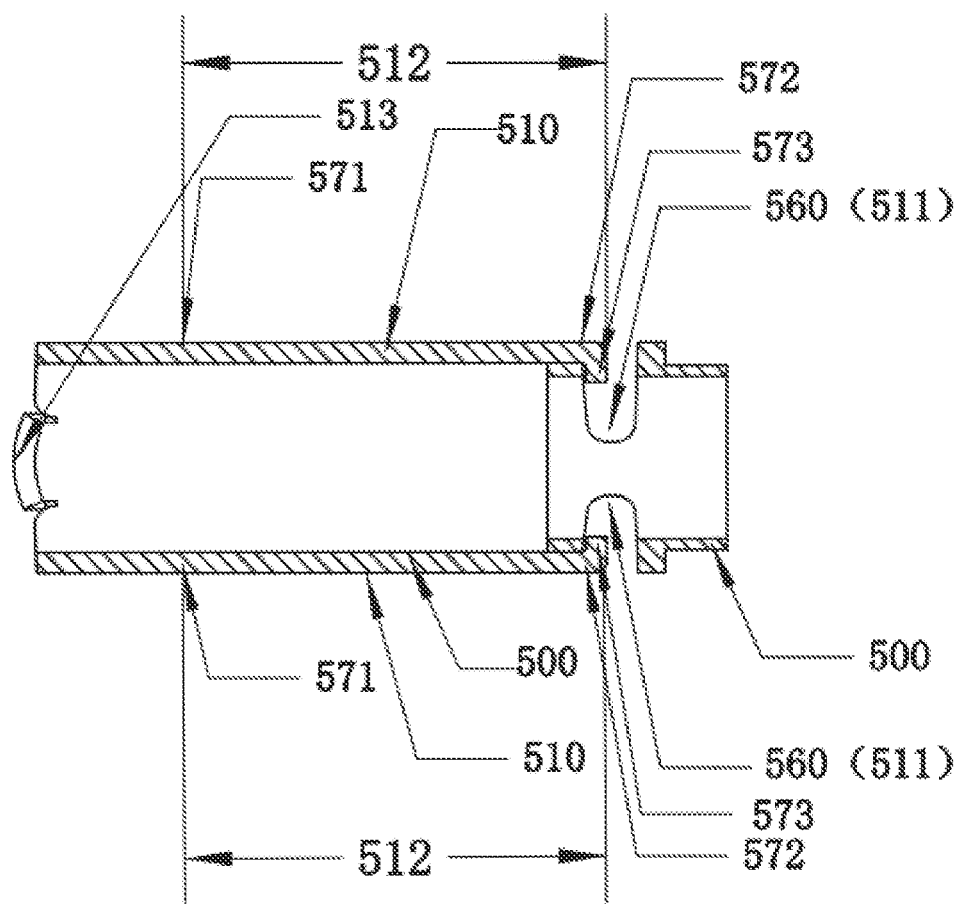
FIG. 40 is a cross-sectional view illustrating a stowage tube according to some embodiments of the present disclosure.
Figure 41:
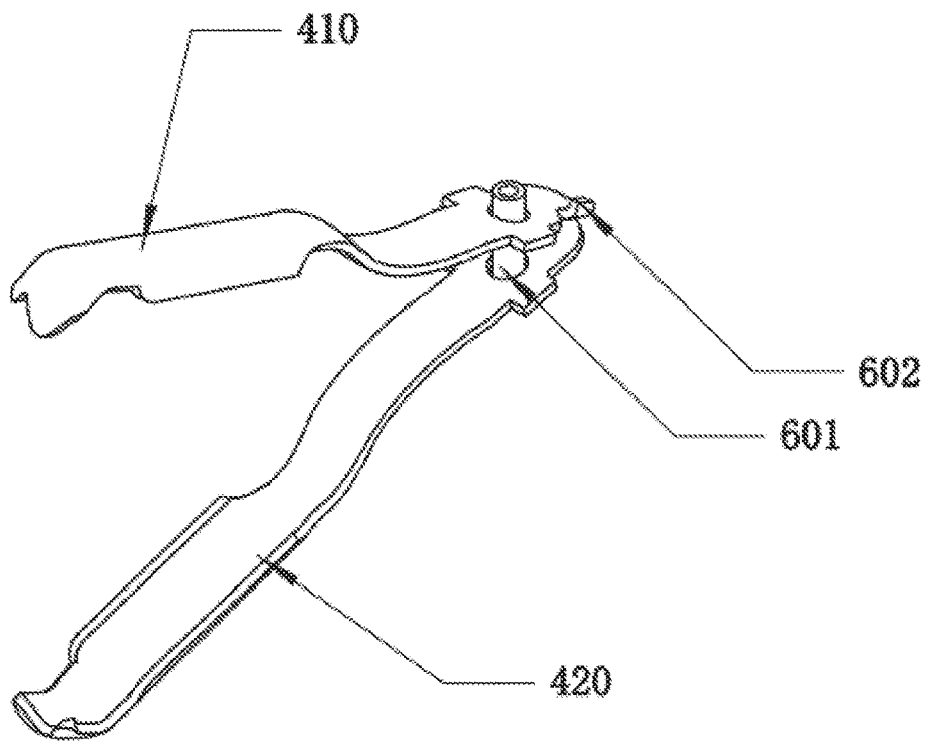
FIG. 41 is a schematic diagram illustrating a clip according to some embodiments of the present disclosure.
Figure 42:
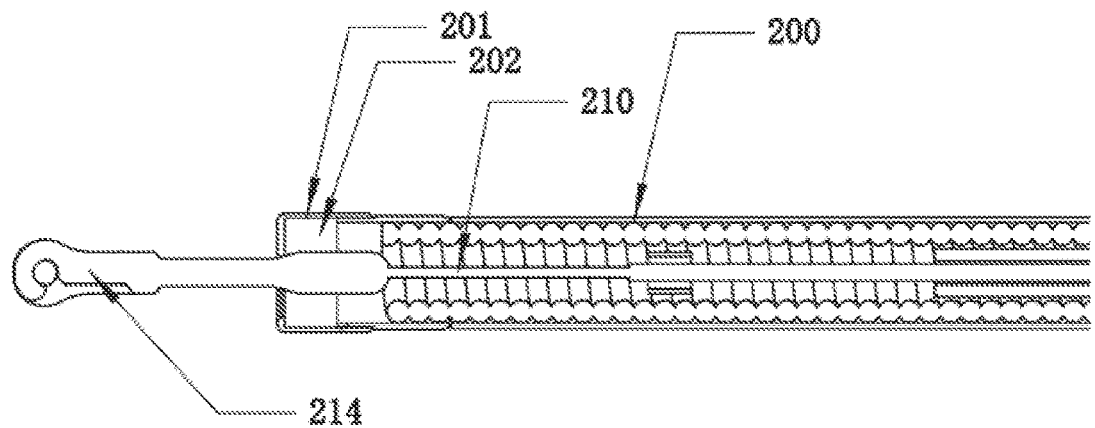
FIG. 42 is a schematic diagram illustrating a sheath tube according to some embodiments of the present disclosure.
Figure 43:
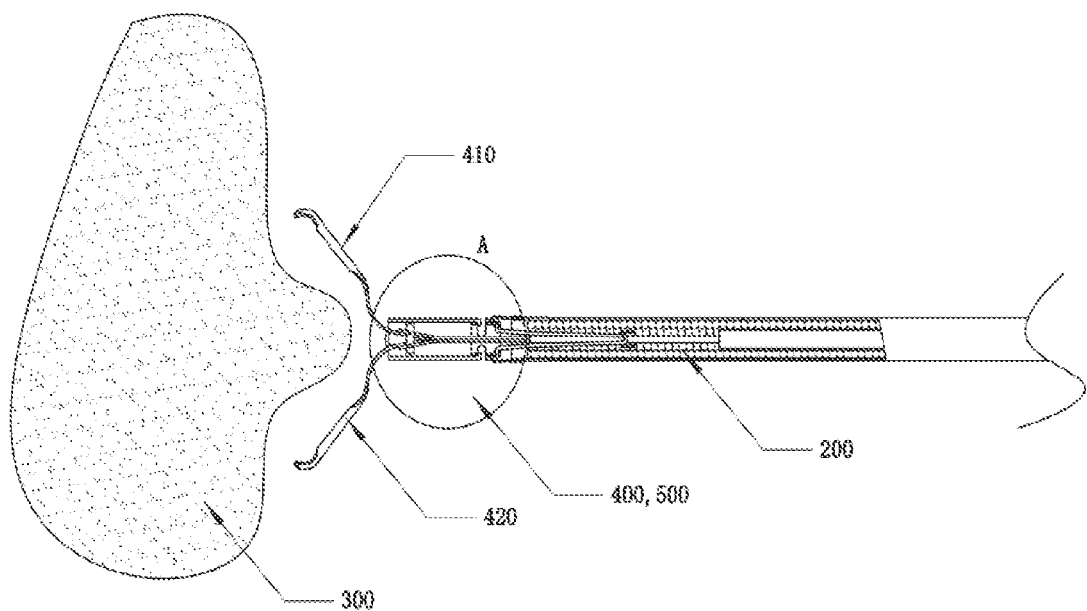
FIG. 43 is a schematic diagram I illustrating a working process of a clip device according to some embodiments of the present disclosure.

As shown in FIG. 35-FIG. 36, in some embodiments, the storage tube 500 may be provided with a locking slot 560, and the locking slot 560 may form the locking portion 511. In some embodiments, the locking slot 560 may be a recess, a notch, or a slit structure opened in the outer wall of the storage tube 500. In some embodiments, the first clip arm 410 and the second clip arm 420 may be provided with the first protrusion 461 and the second protrusion 462, the first protrusion 461 and the second protrusion 462 forming the locked portion 602. As shown in FIG. 42, the locking slot 560 (locking portion 511) may cooperate with the first protrusion 461 and the second protrusion 462 (locked portion 602) so that the storage tube 500 restricts the movement of the clip 400 toward the distal end relative to the outer wall of the storage tube 500, keeping the distal end of the first clip arm 410 and the distal end of the second clip arm 420 closed, i.e., the clip 400 is in the locked state. As shown in FIG. 43, the first protrusion 461 and the second protrusion 462 (locked portion 602) may be subjected to the radial inward squeezing pressure, the locking slot 560 (locking portion 511) and the first protrusion 461 and the second protrusion 462 (locked portion) may be released from the mutual cooperation relationship, the movement restriction of the storage tube 500 on the clip may be released, and the clip 400 may be in the unlocked state, allowing the distal end of the first clip arm 410 and the distal end of the second clip arm 420 to move away from each other, i.e., the clip 400 is switched from the closed state to the re-opened state.

In some embodiments, referring to FIG. 37-FIG. 42, the clip 400 may include the first clip arm 410, the second clip arm 420, and the connecting pin 601. The proximal end of the first clip arm 410 and the proximal end of the second clip arm 420 may be provided with the first protrusion 461 and the second protrusion 462, respectively, the first protrusion 461 and the second protrusion 462 may form the locked portion 602. The connecting pin 601 may pass through the connecting hole 504 through the proximal end of the first clip arm 410 and the proximal end of the second clip arm 420, and the proximal end of the first clip arm 410 and the proximal end of the second clip arm 420 may be stored in the channel of the storage tube 500. In some embodiments, when the clip 400 moves toward the proximal end relative to the outer wall of the storage tube 500, the first clip arm 410 and the second clip arm 420 may be squeezed by the outer wall of the storage tube, and the distal end of the first clip arm 410 and the distal end of the second clip arm 420 may be close to each other and the clip 400 is closed. In some embodiments, when the clip 400 moves toward the distal end relative to the outer wall of the storage tube 500, the squeezing effect of the outer wall of the storage tube on the first clip arm 410 and the second clip arm 420 may be gradually lost, and the distal end of the first clip arm 410 and the distal end of the second clip arm 420 may move away from each other, and the clip 400 may be re-opened.

Figure 44:
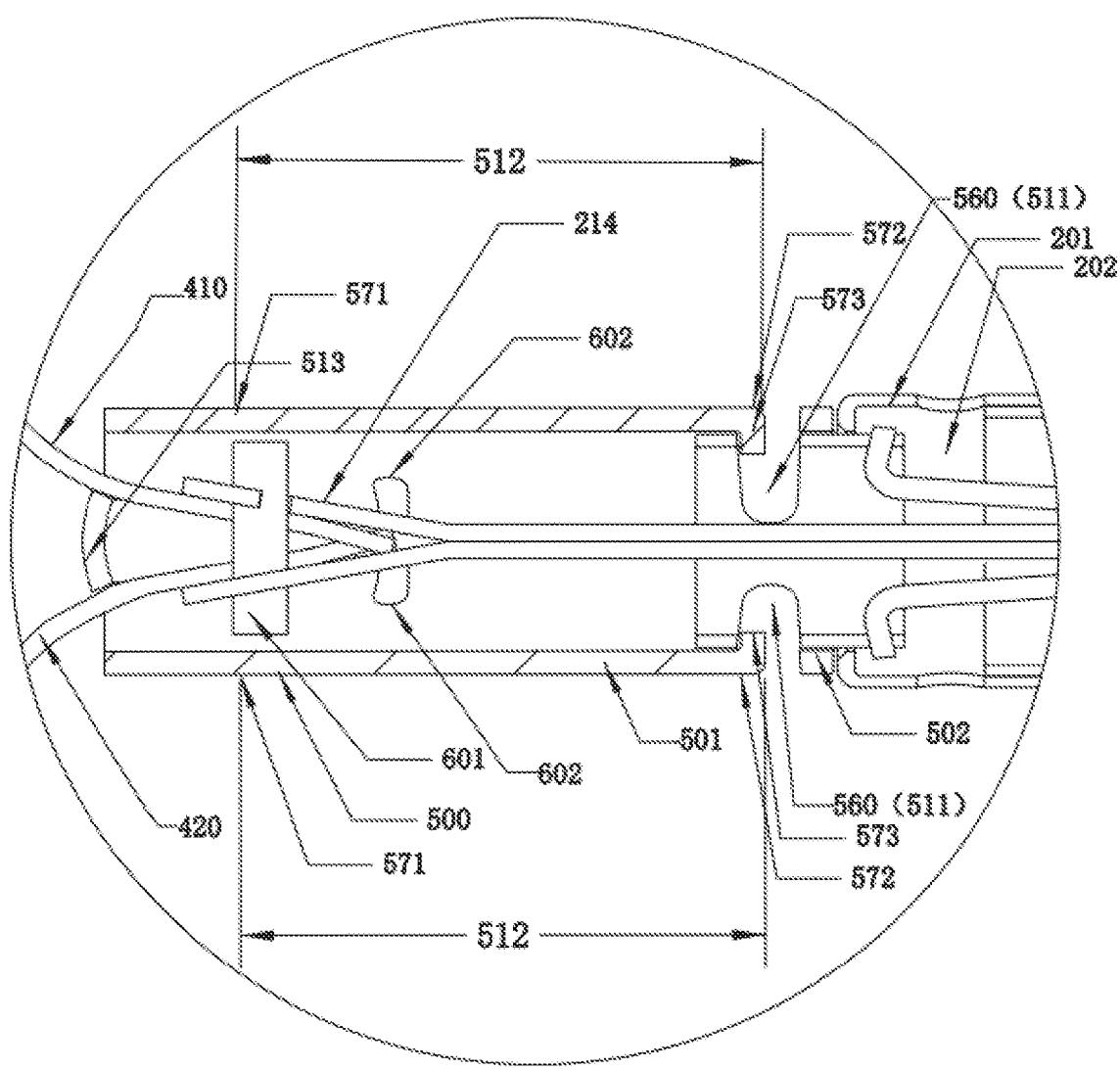
FIG. 44 is an enlarged view of partial A of FIG. 46.

In some embodiments, the proximal end of the first clip arm 410 and the proximal end of the second clip arm 420 may be detachably connected with a connecting piece 214 provided within the delivery device 20, and the connecting piece 214 may cause the proximal end of the first clip arm 410 and the proximal end of the second clip arm 420, which have a tendency to move away from each other, to come closer to each other under the squeeze of the connecting piece 214. In some embodiments, as shown in FIGS. 42-44, the delivery device 20 may include a sheath tube 200 and a mandrel 210 disposed in the channel of the sheath tube 200, with the connecting piece 214 fixed at the distal end of the mandrel 210. In some embodiments, a count of connecting pieces 214 may be two. In some embodiments, the two connecting pieces 214 may be detachably connected with the connecting pin 601, and the two connecting pieces 214 may crimp the first protrusion 461 and the second protrusion 462 of the first clip arm 410 and the second clip arm 420, respectively, radially inward, such that the first protrusion 461 and the second protrusion 462 remain in a mutually abutting state; when the connecting pieces 214 are subjected to sufficient tension, the connecting pieces 214 may deform or break apart from the connecting pin 601, and the first protrusion 461 and the second protrusion 462 of the first clip arm 410 and the second clip arm 420 spring back radially outward due to elastic recovery. In some embodiments, a distal end of the sheath tube 200 may be provided with an end cover 201, and the end cover 201 may be provided with the restriction recess 202, and the proximal end of the storage tube 500 may be stored in the restriction recess 202 so that the sheath tube 200 and the storage tube 500 are detachably connected.

Figure 46:
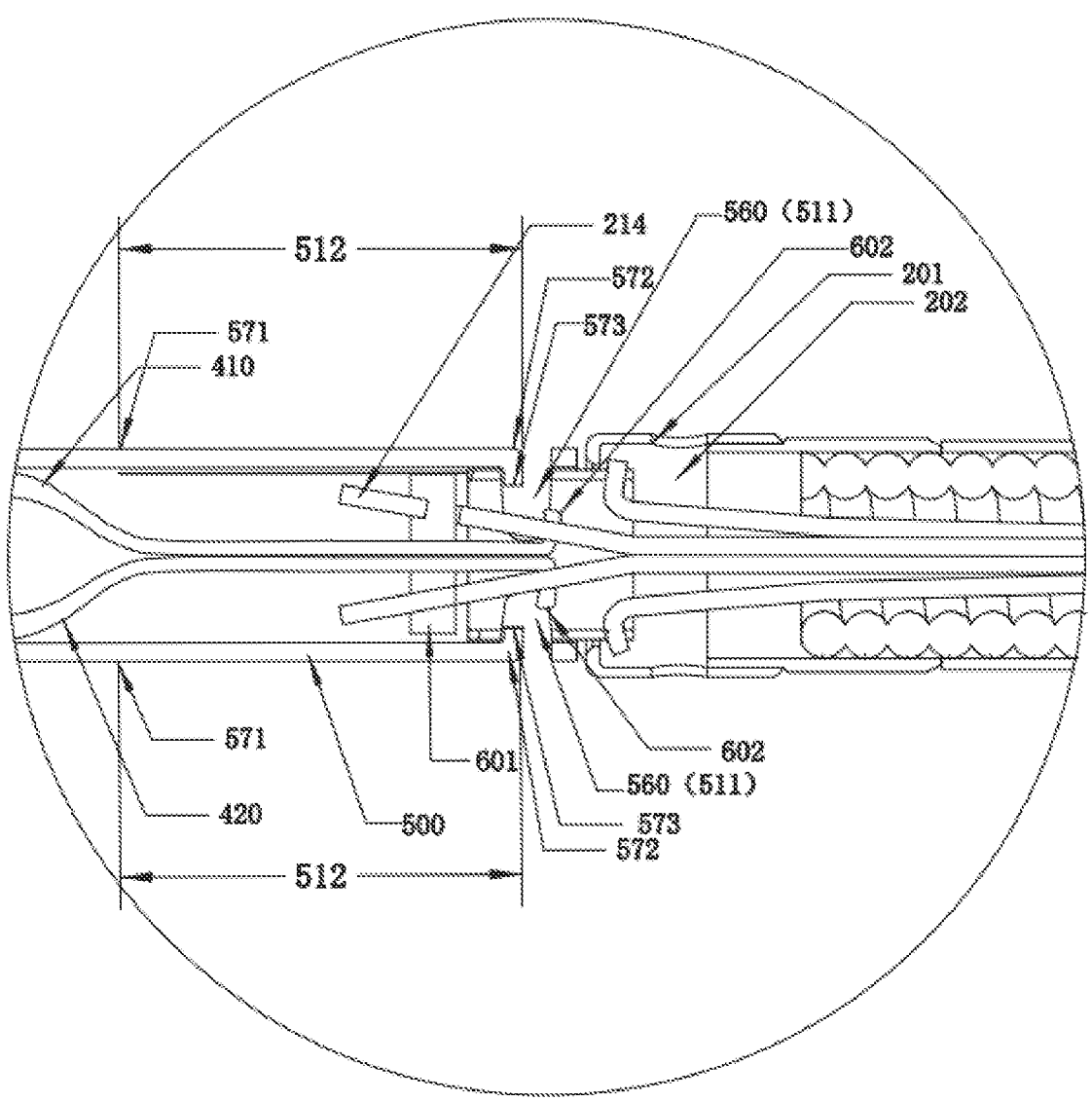
FIG. 46 is an enlarged view of partial B of FIG. 45.
Figure 48:
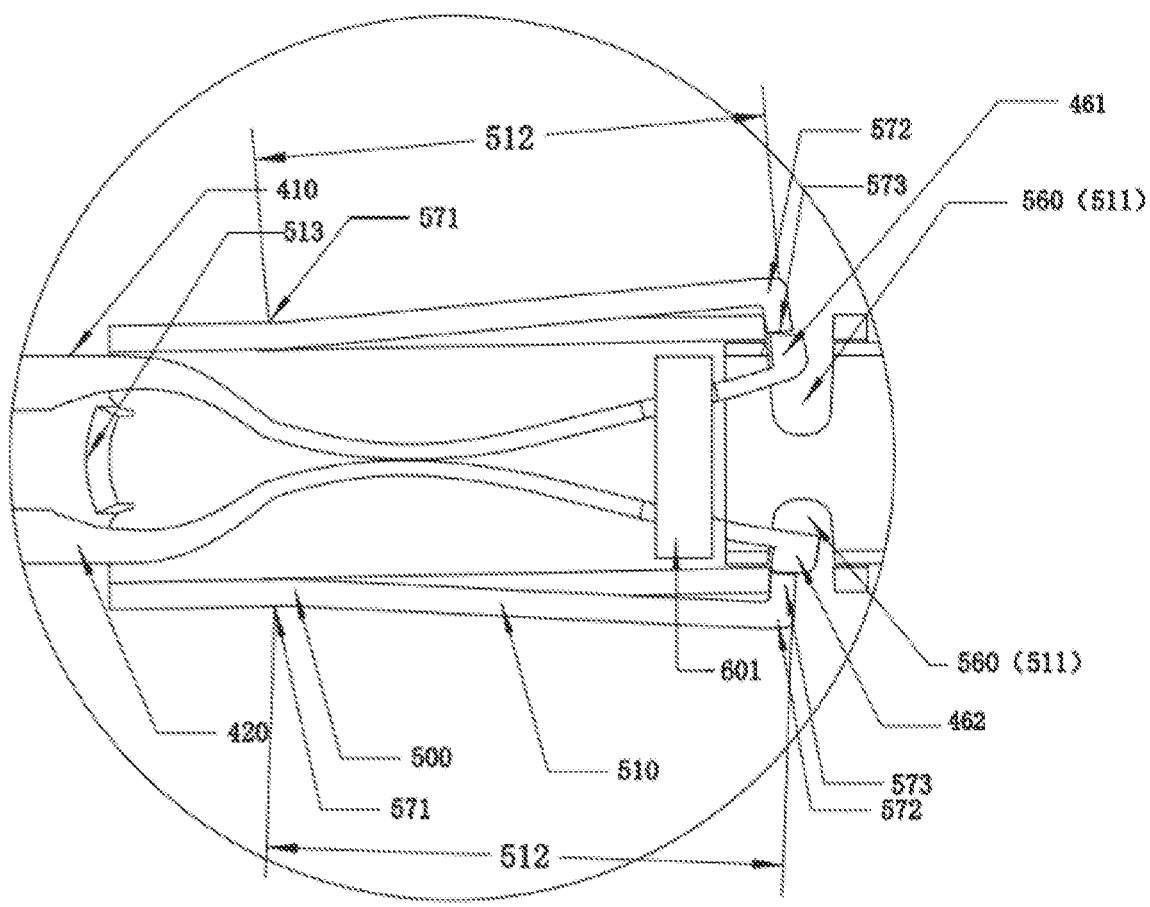
FIG. 48 is an enlarged view of partial C of FIG. 47.

In some embodiments, the proximal end wall of the storage tube 500 may be provided with the locking slot 560, the locking slot 560 may form the locking portion 511; when the clip 400 is connected with the connecting pieces 214, the first protrusion 461 and the second protrusion 462 of the first clip arm 410 and the second clip arm 420 may be held in a mutually supportive state by the connecting pieces 214, as shown in FIGS. 44 and 46; when the clip 400 and the connecting pieces 214 are released from each other, the first protrusion 461 and the second protrusion 462 of the first clip arm 410 and the second clip arm 420 may expand radially outward and hook up in the locking slot 560, as shown in FIG. 48, so that the clip is in the locked state.

In some embodiments, the storage tube 500 may be molded in one piece, as shown in FIG. 46, and the locking slot 560 may be opened directly in the storage tube 500 by finishing, reducing part assembly and providing stable performance.

In some embodiments, the storage tubes 500 may include a first storage tube 501 and a second storage tube 502, as shown in FIG. 44; a distal end of the second storage tube 502 may be provided in a proximal channel of the first storage tube 501, and an opening provided in a wall of the second storage tube 502 and an opening provided in the first storage tube 501 may be assembled together as the locking slot 560, because a snap size of the locking slot 560 in the actual product is small (generally less than 0.5 mm), such as the storage tube 500 with an axial dimension of less than 10 mm and a diameter of less than 1 mm, multiple functional structures (such as shrapnel, locking slot) may lead to a low yield and high cost of a single storage tube 500, so the shrapnel 510 is provided at the wall of the first storage tube 501, and then the locking slot 560 is formed by opening holes in the first storage tube 501 and the second storage tube 502 respectively, reducing the processing difficulty of individual parts and reducing costs.

In some embodiments, the first protrusion 461 and the second protrusion 462 (locked portion) may be subjected to the radial inward squeezing pressure, the locking slot 560 (locked portion) and the first protrusion 461 and the second protrusion 462 (locked portion) may be released from the mutual cooperation relationship, the movement restriction of the storage tube on the clip may be released, and the clip 400 may be in the unlocked state, allowing the distal end of the first clip arm 410 and the distal end of the second clip arm 420 to move away from each other, i.e., the clip 400 is switched from the closed state to the re-opened state.

In some embodiments, the storage tube 500 may be further provided with an unlocking portion 512 opposite the locked portion 602, and the locked portion 602 may be released from the cooperation relationship between the locked portion 602 and the locking portion 511 by the force of the unlocking portion 512. The unlocking portion 512 may be an assembly capable of applying an external force to the locking portion 511 or the locked portion 602 to release the cooperation relationship between the locked portion 602 and the locking portion 511.

In some embodiments, the unlocking portion 512 may include a shrapnel 510 provided on the outer wall of the storage tube 500; the shrapnel 510 and the first protrusion 461 and the second protrusion 462 may butt against each other, and the shrapnel 510 may be subjected to force to drive the first protrusion 461 and the second protrusion 462 to deflect radially toward the inner side of the channel, so that the cooperation relationship between the locked portion 602 and the locking portion 511 is released. In some embodiments, at least two slots 570 may be opened at the outer wall of the storage tube 500 along an axial extension direction of the channel of the storage tube 500, a portion of the wall of the storage tube 500 may form the shrapnel 510, a shrapnel portion fixedly connected or integrally connected with the storage tube 500 may be a fixed end 571, a shrapnel portion radially deflectable along the channel of the storage tube 500 relative to the fixed end 571 may be a free end 572, and a shrapnel region between the fixed end 571 and the free end 572 may form the unlocking portion 512, i.e., the unlocking portion 512 is provided at the wall of the storage tube 500. In some embodiments, the free end 572 may be provided with a docking portion 573 extending in a radially inward direction along the channel of the storage tube 500, and the docking portion 573 may be deflected radially within the locking slot 560 or deflected outside the locking slot 560, as shown in FIG. 48. The docking portion 573 may be an assembly for abutting the protrusions (first protrusion 461 and second protrusion 462) of the clip arms, which may transmit the force applied to the free end 572 in the radial direction of the storage tube toward the channel to the protrusions of the clip arms. In some embodiments, the storage tubes 500 may include a first storage tube 501 and a second storage tube 502. A distal end of the second storage tube 502 may be snapped into a channel at a proximal end of the first storage tube 501; the unlocking section 512 may be provided in the first storage tube 501, and the locking slot 560 may be provided in the second storage tube 502.

In some embodiments, the clip 400 may be in the open state, as shown in FIGS. 43-44. The distal end of the first clip arm 410 and the distal end of the second clip arm 420 may be distant from each other, the clip 400 may be connected with the connecting pieces 214, and the first protrusion 461 and the second protrusion 462 of the first clip arm 410 and the second clip arm 420 may be held radially inward against each other by the connecting pieces 214. The shrapnel 510 at the storage tube 500 may be in a non-stressed state, and the docking portion 573 of the free end 572 extending radially inward along the channel of the storage tube 500 may be partially or fully extended into the locking slot 560

(locking portion 511) of the storage tube 500, and the docking portion 573 may be not interlocked with the first protrusion 461 and the second protrusion 462 (locked portion 602).

Figure 45:
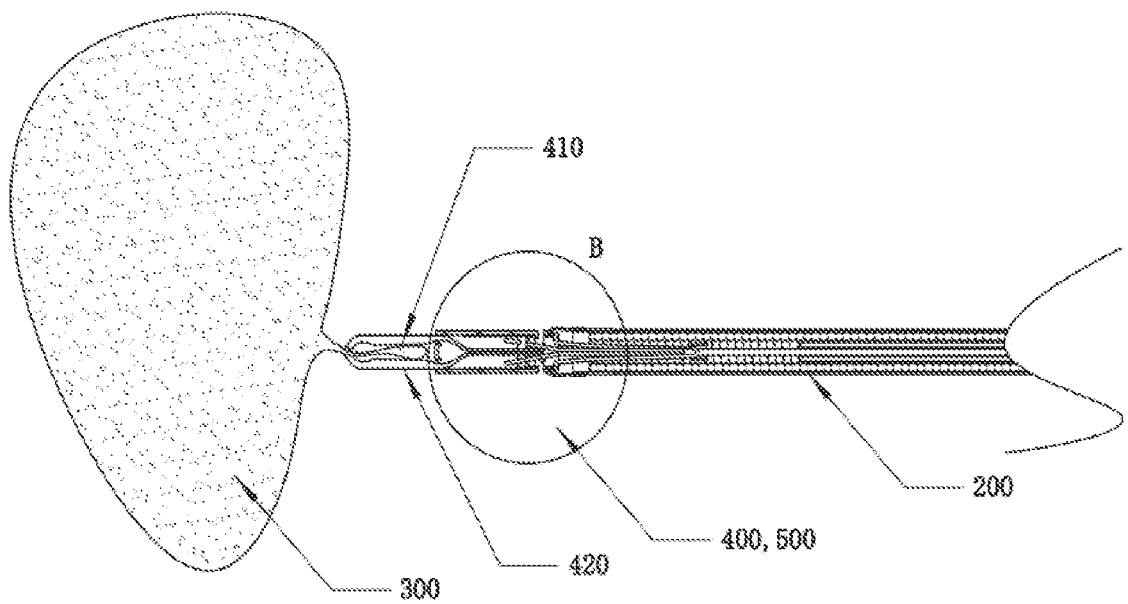
FIG. 45 is a schematic diagram II illustrating a working process of a clip device according to some embodiments of the present disclosure.

In some embodiments, the clip may be in a closed non-locked state, as shown in FIGS. 45-46. The distal end of the first clip arm 410 and the distal end of the second clip arm 420 may be close to each other, and the tissue 300 may be stored between the distal end of the first clip arm 410 and the distal end of the second clip arm 420, the clip 400 and the connecting pieces 214 remain connected, and the first protrusion 461 and the second protrusion 462 of the first clip arm 410 and the second clip arm 420 may be kept radially inward against each other by the connecting pieces 214, so that when a clipping angle or a position needs to be adjusted, the mandrel 210 may be pushed from the distal end to the proximal end to make the first clip arm 410 and the second clip arm 420 re-open. The shrapnel 510 at the storage tube 500 may be in a non-stressed state, and the docking portion 573 of the free end 572 bent inward along the radial direction of the channel of the storage tube 500 may extend partially or completely into the locking slot 560 (locking portion 511) of the storage tube 500, and the docking portion 573 may be not interlocked with the protrusions (locked portion 602).

Figure 47:
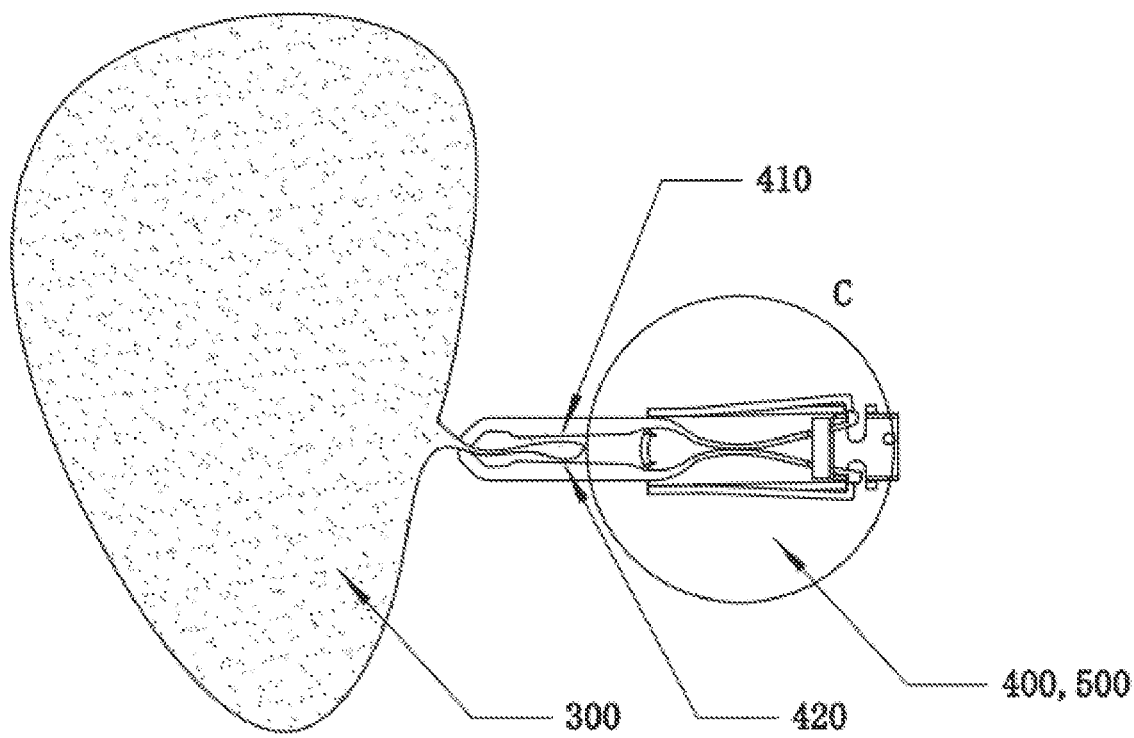
FIG. 47 is a schematic diagram III illustrating a working process of a clip device according to some embodiments of the present disclosure.

In some embodiments, the clip 400 may be in the locked state, as shown in FIG. 47-FIG. 48, the distal end of the first clip arm 410 and the distal end of the second clip arm 420 clip the tissue 300 and may be close to each other, the connecting pieces 214 may continue to be subjected to tension from the distal end to the proximal end causing the connecting pieces 214 to deform or break, and the connecting pieces 214 may be separated from the clip 400 (the delivery device 20 and the clip device 10 are released), the first protrusion 461 and the second protrusion 462 (locked portion 602) of the first clip arm 410 and the second clip arm 420 may spring back radially outward and may enter the locking slot 560 (locking portion 511) of the storage tube 500, and the first protrusion 461 and the second protrusion 462 (locked portion 602) may cooperate with the locking slot 560 (locking portion 511). The first protrusion 461 and the second protrusion 462 (locked portion 602) may be interlocked with the docking portion 573, the docking portion 573 may be deflected radially outward, the unlocking portion 512 may be deflected radially outward relative to the storage tube 500 axially, and the unlocking portion 512 may be located outside the locking slot 560 (locking portion 511).

Figure 49:
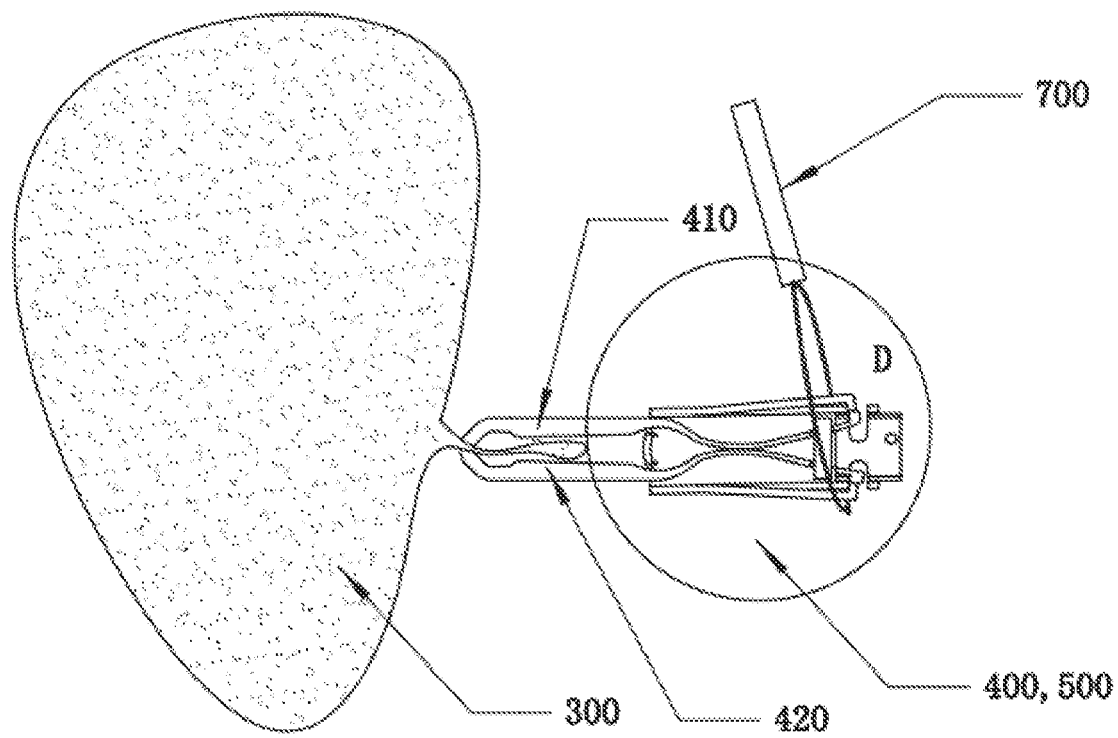
FIG. 49 is a schematic diagram IV illustrating a working process of a clip device according to some embodiments of the present disclosure.
Figure 50:
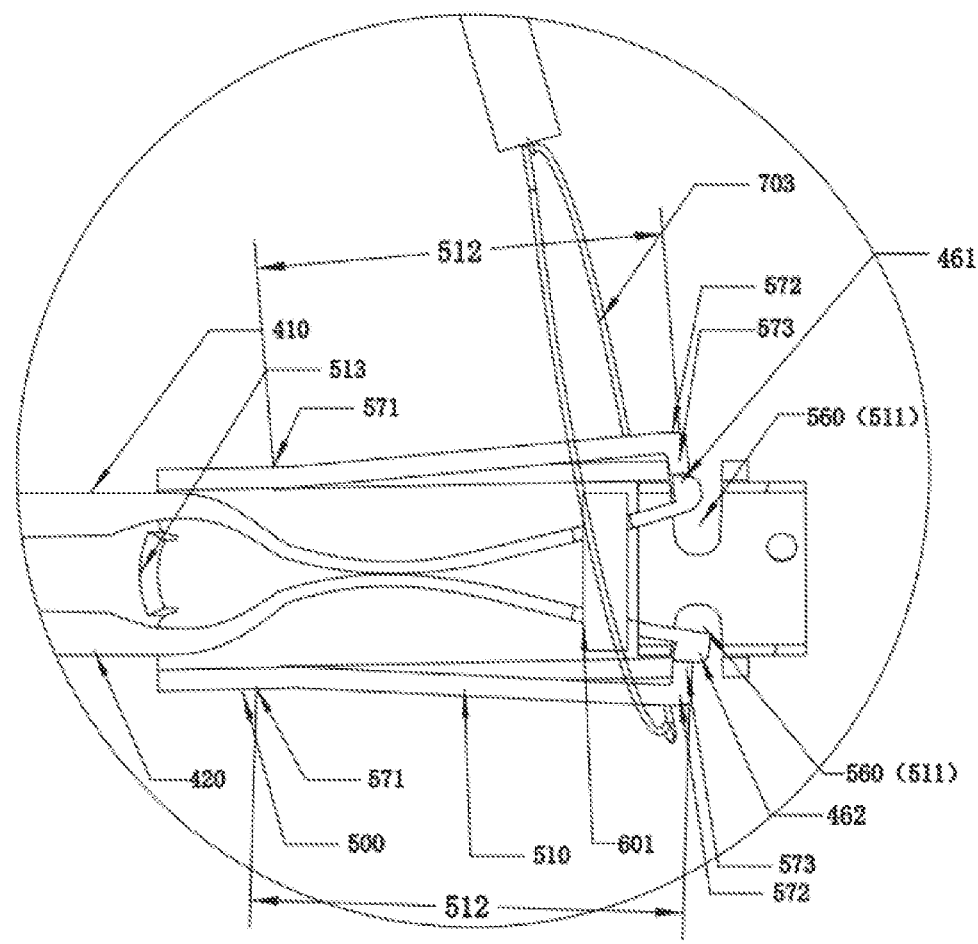
FIG. 50 is an enlarged view of partial D of FIG. 49.

In some embodiments, after the clip 400 is in a closed and locked state, the first clip arm 410 and the second clip arm 420 need to be re-opened, i.e., the first protrusion 461 and the second protrusion 462 (locked portion 602) and the locking slot 560 (locking portion 511) need to be released (disassembled) from their cooperation relationship, as shown in FIG. 49-FIG. 50. The disassembly device 700 may apply a disassembly force to the clip device 10, and the disassembly device 700 may be a biopsy forceps, or a trap, or an energy instrument, or a specialized disassembly device, etc. The disassembly device 700 may apply the disassembly force to the locked portion 602 by approaching the clip device 10 through the endoscopic jaw channel. In some embodiments of the present disclosure, an axial distance of the unlocking section 512 (shrapnel 510) may be 2 mm-10 mm, and only the disassembly force of the disassembly device 700 needs to be applied to the unlocking portion 512 (shrapnel 510) located at the wall of the storage tube 500, thus increasing the disassembly force area of the disassembly device 700. At the same time, since the unlocking portion 512 deflects radially outward relative to the storage tube 500 axially when the clip 400 is locked, i.e., the unlocking portion 512 may partially protrude from a surface of the storage tube 500, it is more suitable for the disassembly device 700 (especially a captive device) to pick up the unlocking portion 512 (shrapnel 510) and apply the disassembly force radially outward. Therefore, the present disclosure reduces the difficulty of disassembly and increases the success rate of disassembly.

Figure 51:
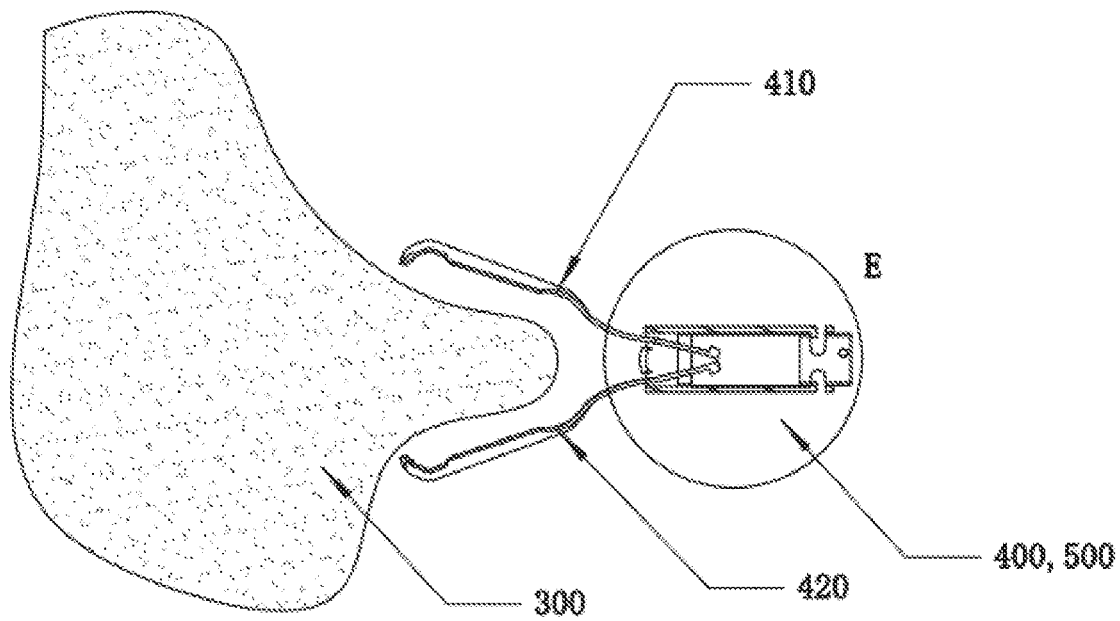
FIG. 51 is a schematic diagram IV illustrating a working process of a clip device according to some embodiments of the present disclosure.
Figure 52:
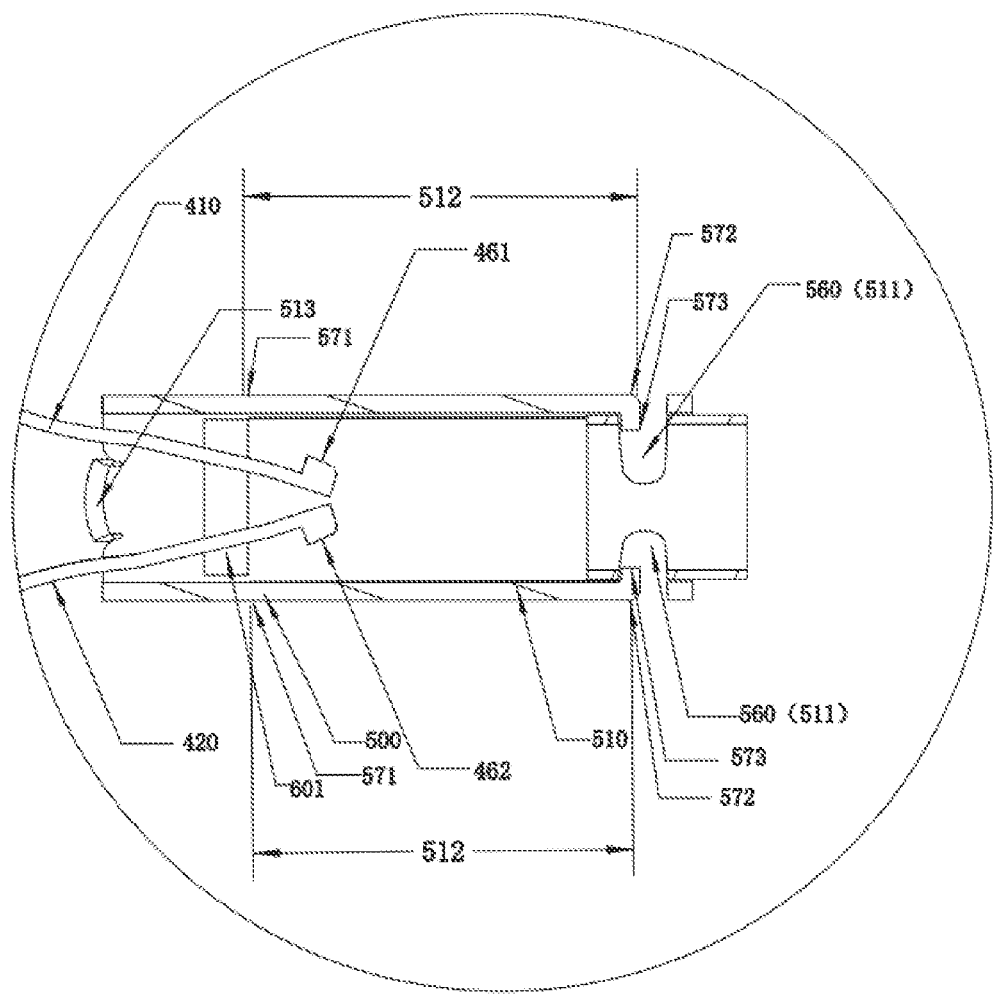
FIG. 52 is an enlarged view of partial E of FIG. 51.
Figure 53:
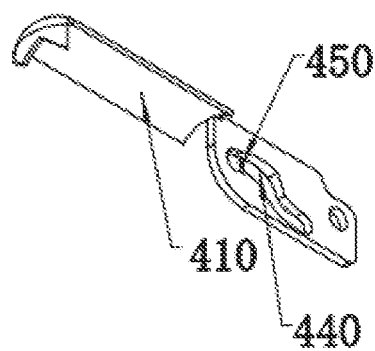
FIG. 53 is a schematic diagram illustrating a first clip arm according to some embodiments of the present disclosure.
Figure 54:
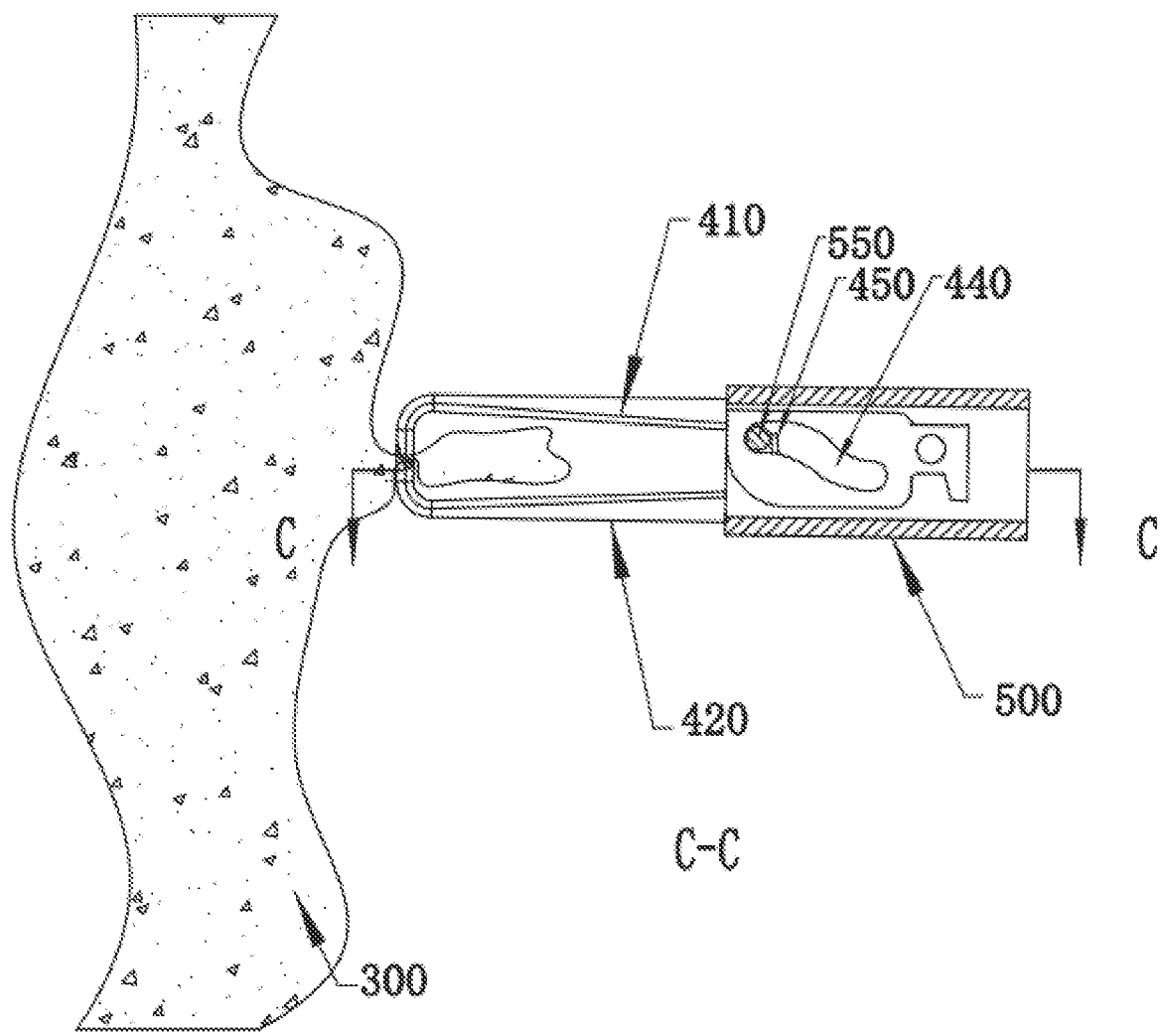
FIG. 54 is a schematic diagram IV illustrating a working process of a clip device according to some embodiments of the present disclosure.
Figure 55:
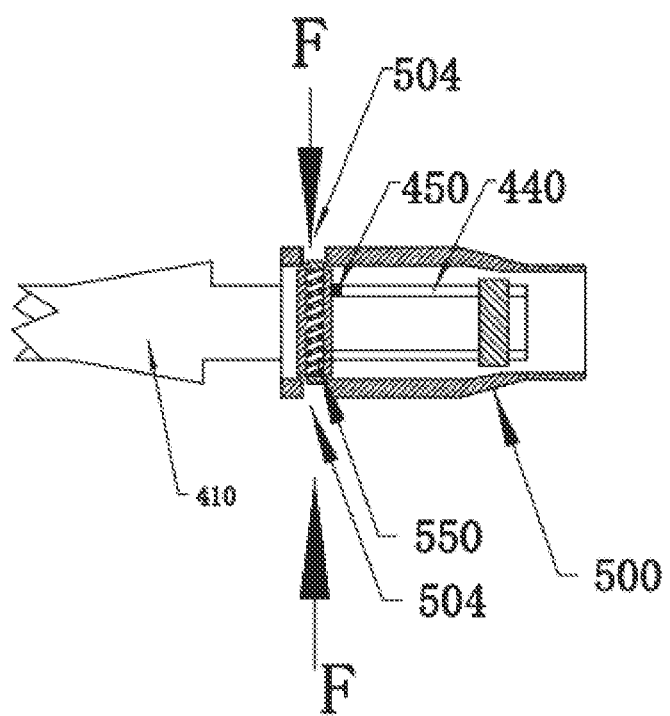
FIG. 55 is a cross-sectional view of the clip device 10C-C of FIG. 54.

In some embodiments, the clip 400 may be in the unlocked state and the cooperation relationship between the first protrusion 461 and the second protrusion 462 (locked portion 602) and the locking slot 560 (locking portion 511) may be released, as shown in FIG. 51-FIG. 52. The disassembly device 700 (e.g., a sleeve) may pick up the unlocking portion 512 (shrapnel 510) at the wall of the storage tube 500, apply a disassembly force radially inward, deflect the unlocking portion 512 (shrapnel 510) radially inward, and the docking portion 573 of the unlocking portion 512 (shrapnel 510) may enter the locking slot 560 (locking portion 511), that is, the unlocking portion 512 (shrapnel 510) is deflected radially inward into the locking slot 560 (locking portion 511), and the first protrusion 461 and the second protrusion 462 (locked portion 602), which are interfaced with the docking portion 573, are deflected radially inward by the radially inward force on the first protrusion 461 and the second protrusion 462 (locked portion 602 The first protrusion 461 and the second protrusion 462 (locked portion 602) are deflected radially inward, and the first protrusion 461 and the second protrusion 462 may be deflected radially inward by the radially inward force on the docking portion 573, the distal end of the first clip arm 410 and the distal end of the second clip arm 420 may re-open, then the clip device 10 left at the lesion is separated from the tissue 300.

In some embodiments, the locking portion may include a pin provided in the storage tube. The pin may be fixed relative to the outer wall of the storage tube. The clip arms may include a sliding slot, the pin may pass through an inside of the sliding slot and slidably connected with the sliding slot. The locked portion may include an elastic blocking member provided in a path of the sliding slot.

As shown in FIG. 53-FIG. 57, in some embodiments, the proximal ends of the clip arms may be provided with slots 440, and the stowage tube 500 may include a pin 550 and a connecting hole 504. The pin 550 may run through the storage tube 500 along the radial direction of the storage tube 500. The proximal end of the first clip arm 410 and the proximal end of the second clip arm 420 may be subjected to axial pull from the distal to the proximal end, the sliding slot 440 may move around the pin 550 from the distal end to the proximal end, the position of the pin 550 in the sliding slot 440 may move from the proximal end of the sliding slot 440 to the distal end of the sliding slot 440, and the distal end of the first clip arm 410 and the distal end of the second clip arm 420 may gradually come closer. In some embodiments, the sliding slot 440 may be provided with the elastic blocking member 450, and the elastic blocking member 450 may be an assembly that provides a blocking action in the path of movement of the pin 550.

In some embodiments, the pin 550 may form the locking portion and the elastic blocking member 450 may form the locked portion. In some embodiments, the clip 400 may be in the open state and the clip arms may drive the elastic blocking member 450 toward the pin 550 under tension. The elastic blocking member 450 may move to the position of the pin 550 and cross the pin 550 under tension and may be located proximal to the pin 550. In some embodiments, after the elastic blocking member 450 crosses the pin 550, the pin 550 may prevent the elastic blocking member 450 from moving from the proximal end of the pin 550 to the distal end of the pin 550 so that the pin 550 forms a cooperation relationship with the elastic blocking member 450 and the clip 400 is in the locked state with the first clip arm 410 and the distal end of the second clip arm 420 remaining closed.

In some embodiments, the elastic blocking member 450 may be deflected by force to cause the termination of the cooperation relationship between the locked portion 602 and the locking portion 511.

Figure 56:
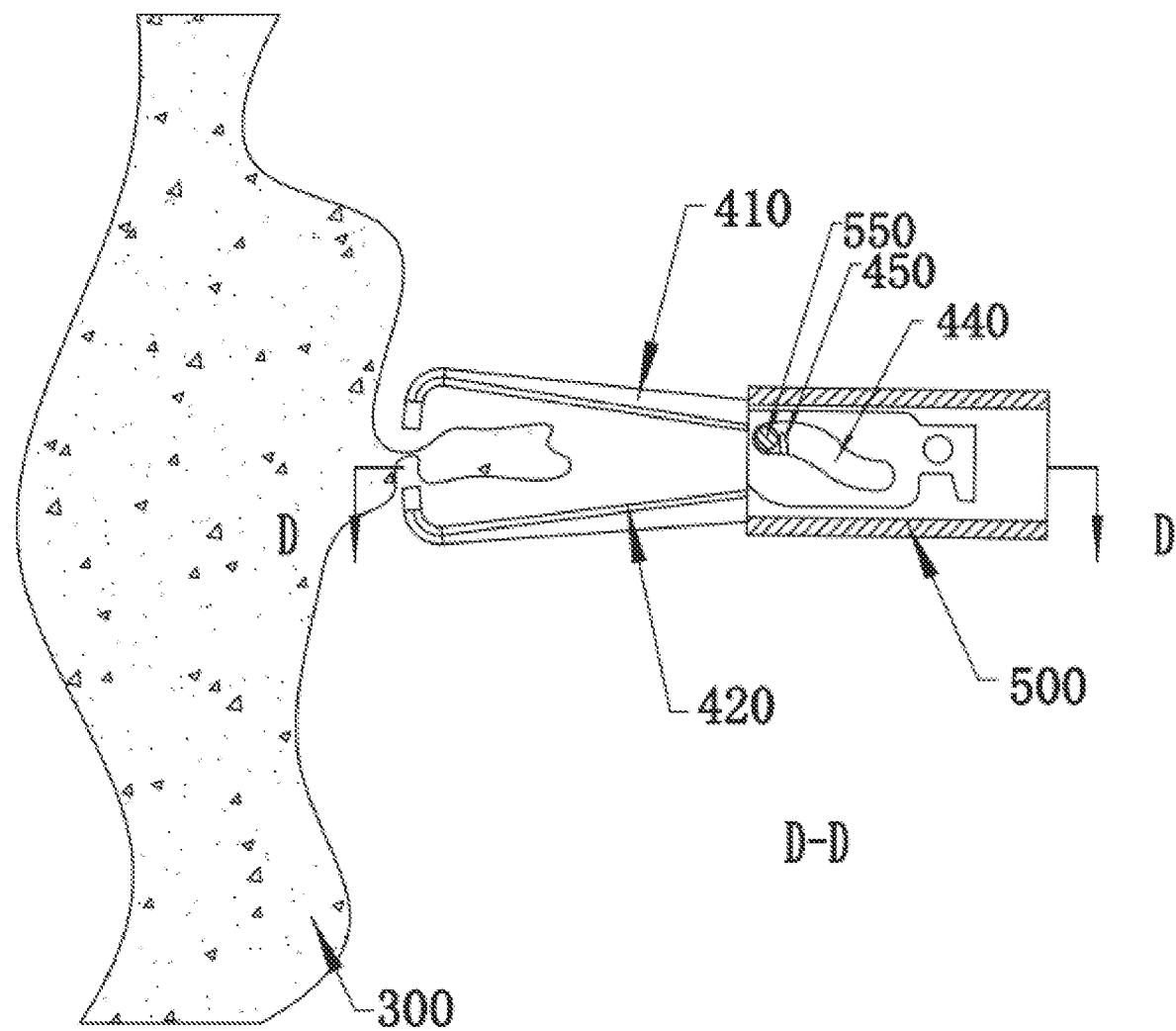
FIG. 56 is a schematic diagram V illustrating a working process of a clip device according to some embodiments of the present disclosure.
Figure 57:
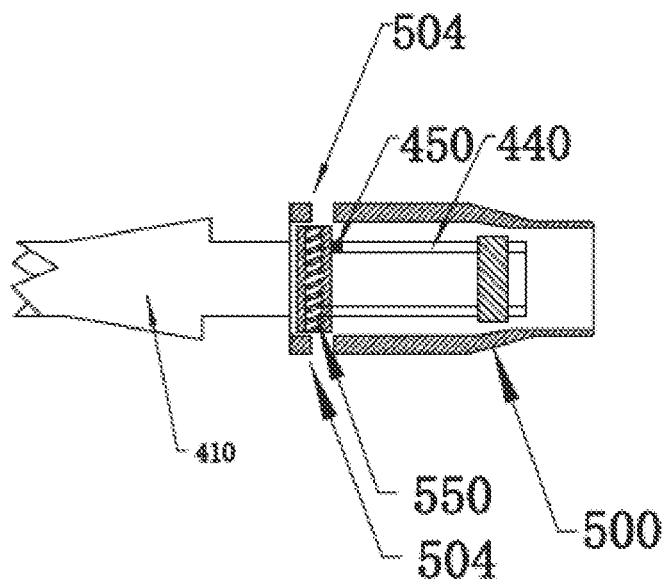
FIG. 57 is a cross-sectional view of the clip device 10D-D of FIG. 56.

In some embodiments, referring to FIGS. 56 and 57, the clip 400 may be in the unlocked state and the disassembly device 700 may be combined with the elastic blocking member 450 (locked portion) by axially pulling the elastic blocking member 450, causing the elastic blocking member 450 (locked portion 602) to be axially displaced or deflected so that the cooperation relationship between the pin 550 (locking portion 511) and the elastic blocking member 450 (locked portion 602) is released, which causes the clip arms to be able to move toward the distal end relative to the pin 550, and the distal end of the first clip arm 410 and the distal end of the second clip arm 420 to move away from each other, i.e., the clip 400 is switched from the locked state to the unlocked state.

In some embodiments, the pin 550 may be compressed in the radial direction of the storage tube by force and detach from the storage tube 500, causing the cooperation relationship between the locking portion 511 and the locked portion 602 to be released.

As shown in FIG. 56-FIG. 57, in some embodiments, the clip 400 may be in the unlocked state, and the pin 550, which is provided with a spring inside the storage tube 500, may be radially contracted by the radial inward squeezing pressure, and the pin 550 may be detached from the connecting hole 504, i.e., the pin 550 is detached from the storage tube 500, and the pin 550 may no longer form an obstruction to the movement of the elastic blocking member 450, then the connection relationship between the pin 550 (locking portion 511) and the storage tube 500 may be released, and the clip 400 may be in the unlocked state, so that the distal end of the first clip arm 410 and the distal end of the second clip arm 420 may move away from each other, i.e., the clip 400 may be opened again.

In some embodiments, the termination of the connection relationship between the locked portion 602 and the clip arms may cause the termination of the movement restriction of the storage tube 500 to the clip 400.

In some embodiments, as shown in FIG. 58-FIG. 61, the clip 400 may be switched from the locked state (the clip 400 is in a locked and waited to be disassembled state) to the unlocked state (the clip 400 is in the re-opened state). In some embodiments, the clip 400 may include a first clip arm 410, a second clip arm 420, and a connecting pin 601. In some embodiments, the first clip arm 410 and the second clip arm 420 may be connected by the connecting pin 601, with one or both ends of the connecting pin 601 forming the locked portion 602. In some embodiments, the proximal ends of the first clip arm 410 and the second clip arm 420 may form an accommodation space, the connecting pin 601 may extend radially through the accommodation space, the connecting pin 601 may be connected with the first clip arm 410 and the second clip arm 420 by a pin fixing portion 603, respectively, and one or both ends of the connecting pin 601 may form the locked portion 602. In some embodiments, the storage tube may include a shrapnel, the shrapnel may include a first end and a second end. The first end 510A may be fixedly connected with the storage tube 500; the second end 510B may extend inside the channel of the storage tube 500, and the second end 510B may form the locking portion 511.

Figure 58:
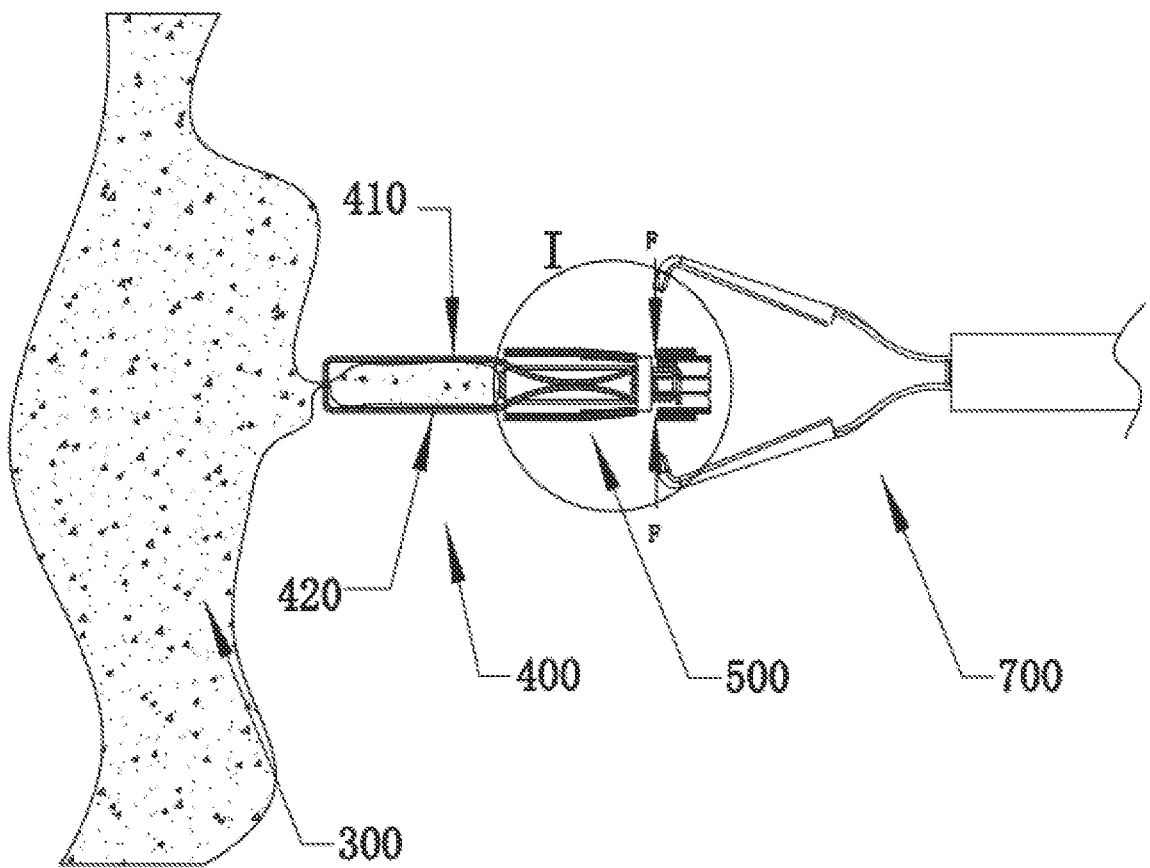
FIG. 58 is a schematic diagram IV illustrating a working process of a clip device according to some embodiments of the present disclosure.
Figure 59:
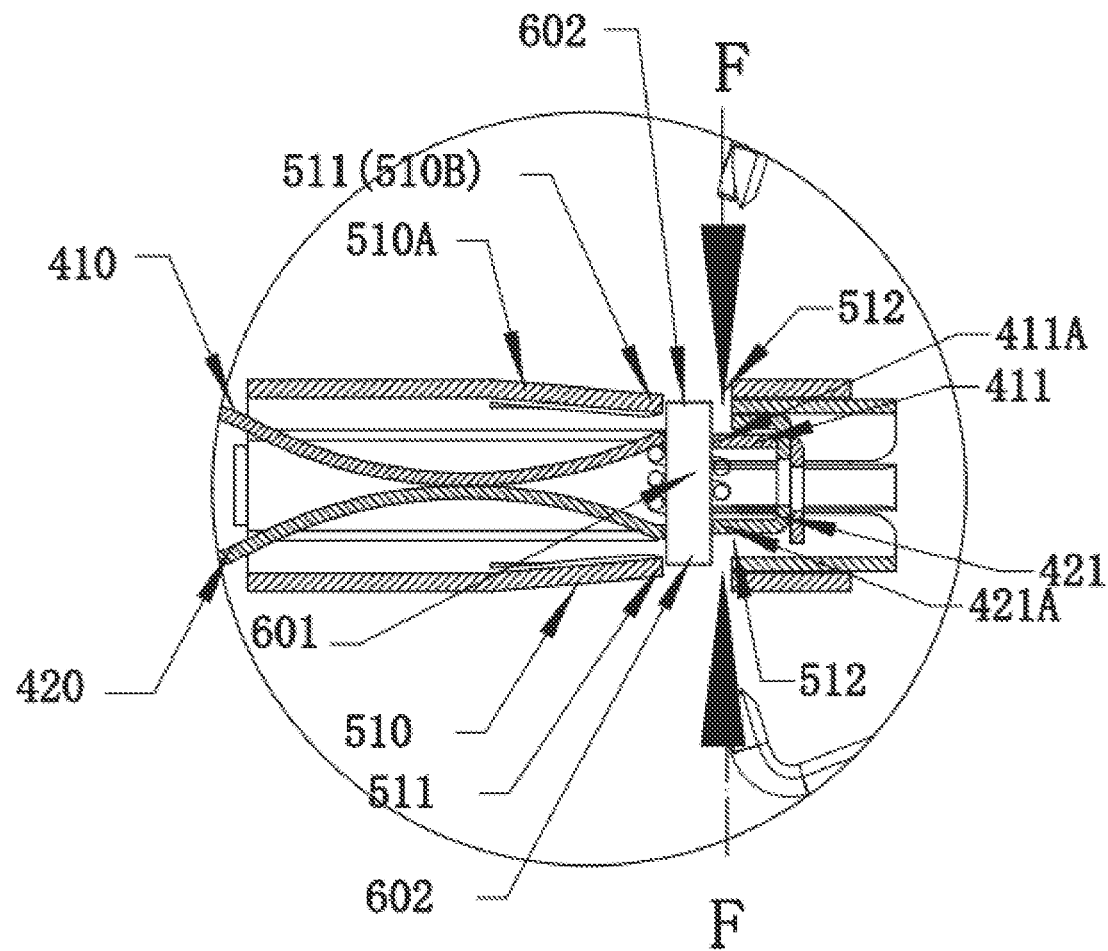
FIG. 59 is an enlarged view of partial I of FIG. 58.
Figure 60:
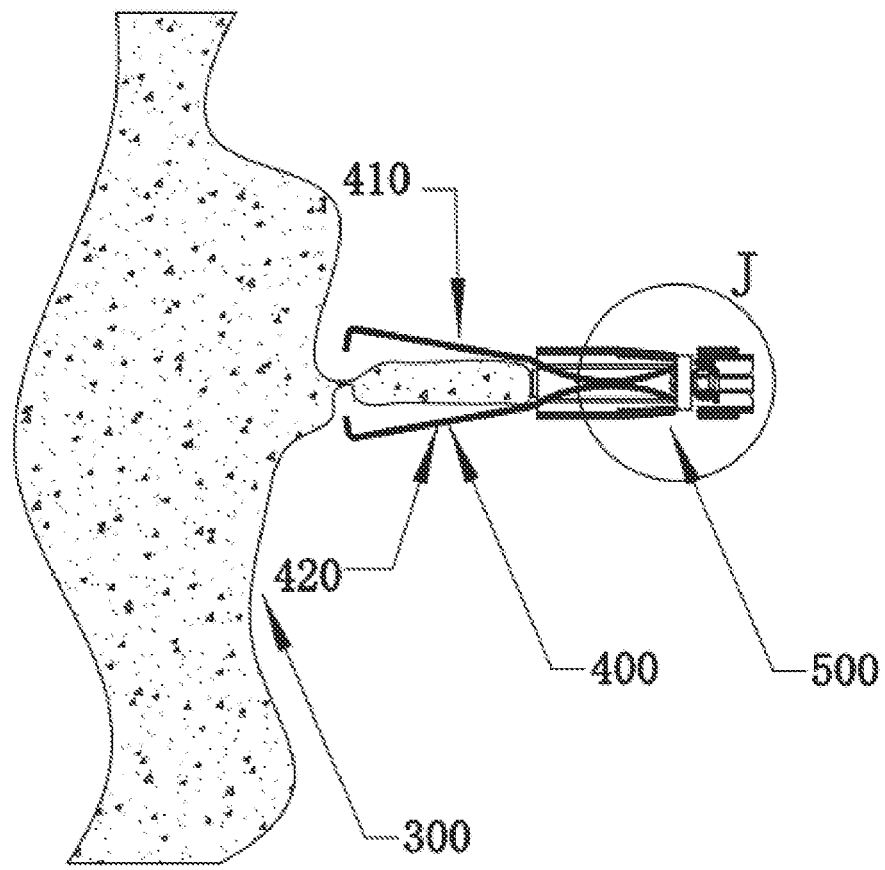
FIG. 60 is a schematic diagram V illustrating a working process of a clip device according to some embodiments of the present disclosure.
Figure 61:
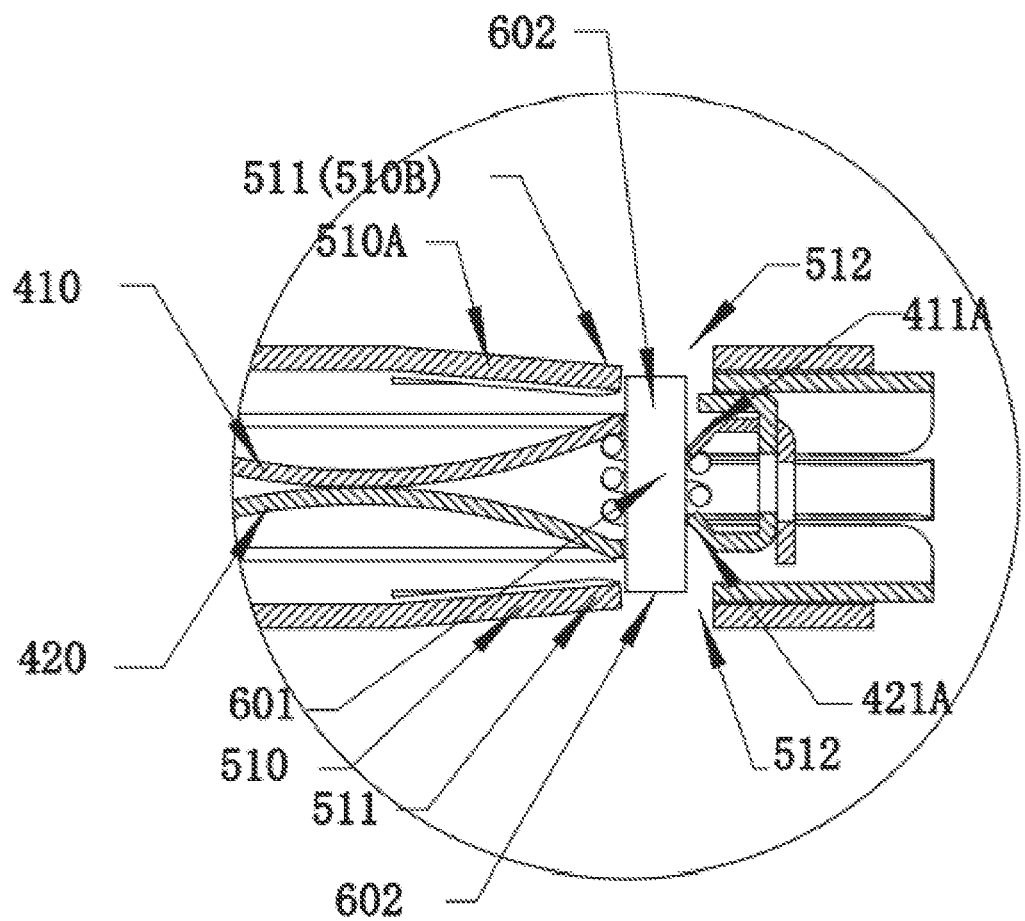
FIG. 61 is an enlarged view of partial J of FIG. 60.
Figure 62:
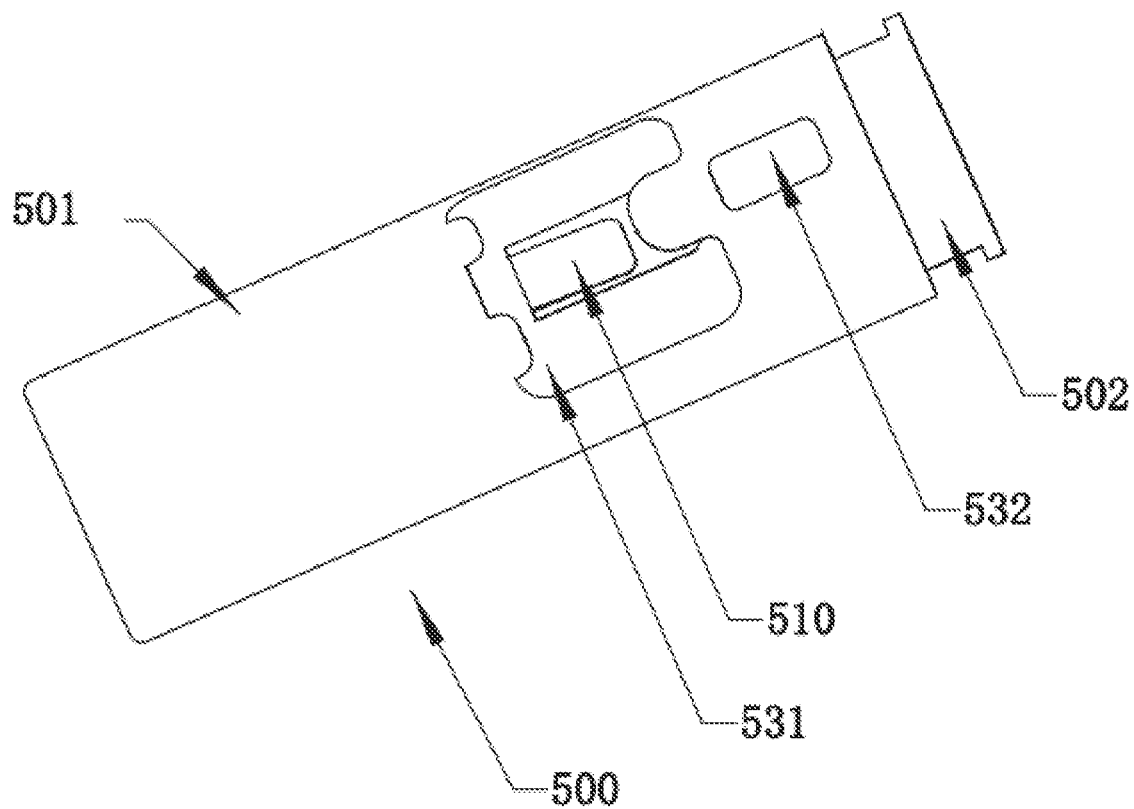
FIG. 62 is a schematic diagram illustrating a stowage tube according to some embodiments of the present disclosure.
Figure 63:
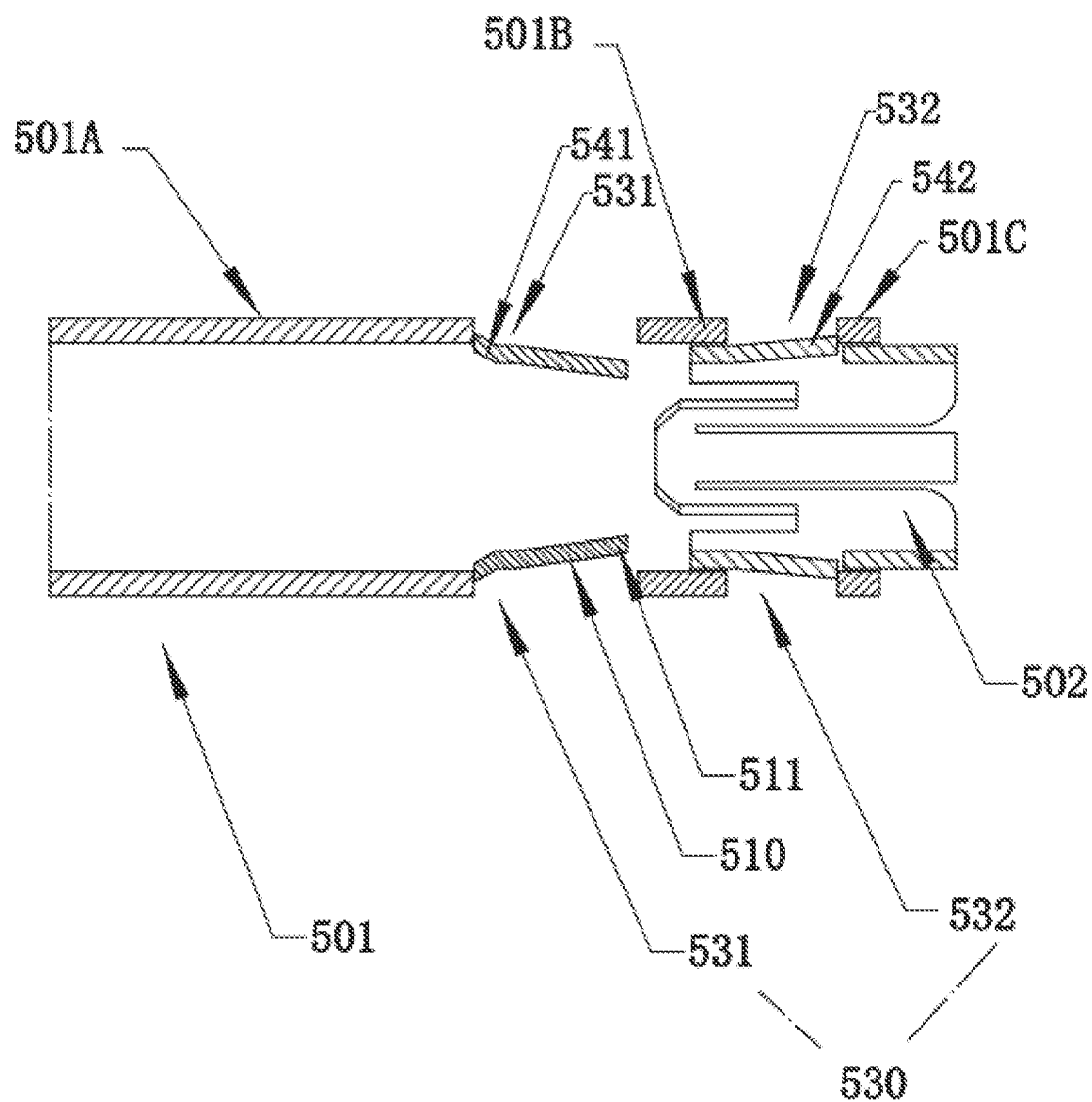
FIG. 63 is a cross-sectional view illustrating a stowage tube according to some embodiments of the present disclosure.
Figure 64:
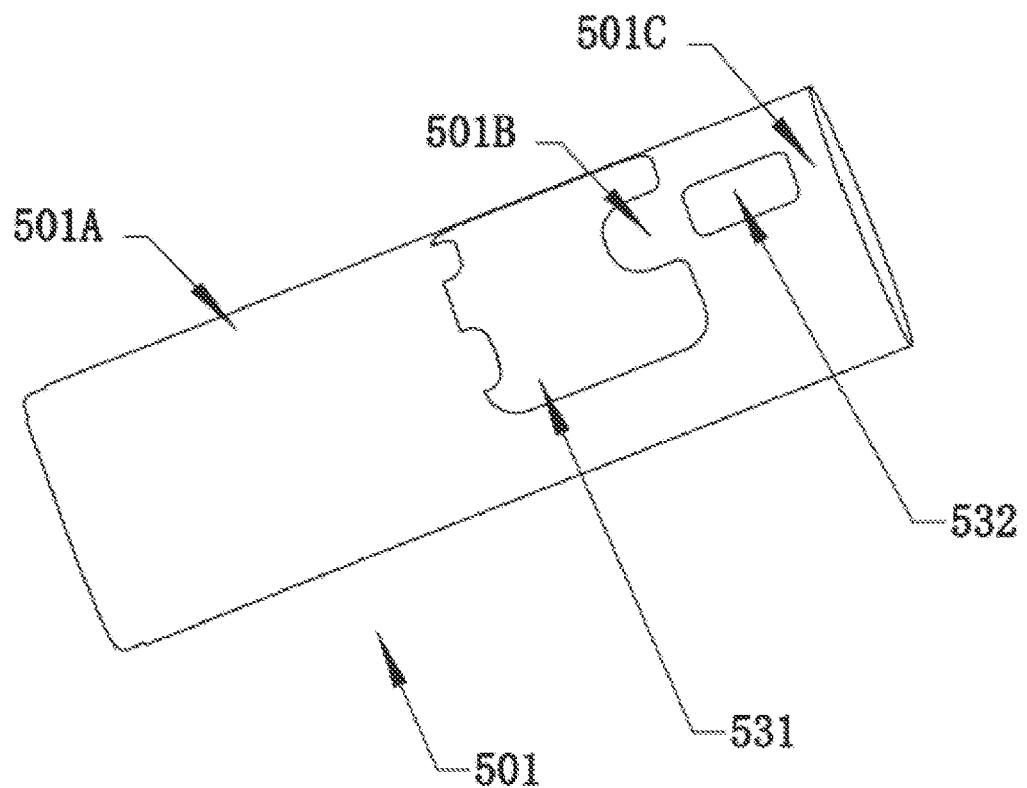
FIG. 64 is a schematic diagram illustrating a first stowage tube according to some embodiments of the present disclosure.
Figure 65:
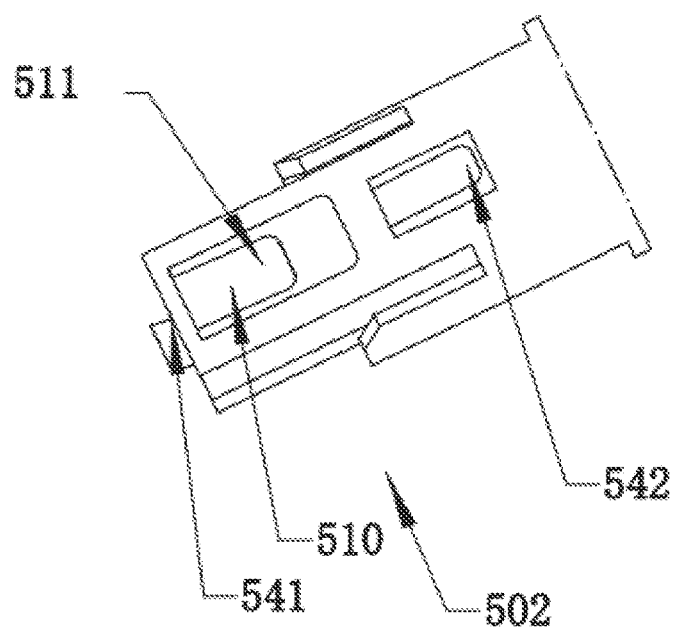
FIG. 65 is a schematic diagram illustrating a second stowage tube according to some embodiments of the present disclosure.

As shown in FIG. 58 and FIG. 59, in some embodiments, the clip 400 may be in the locked and waited to be disassembled state, the clip 400 may be in the locked state, the locking portion 511 and the locked portion 602 may be locked in cooperation with each other, and the distal ends of the first clip arm 410 and the second clip arm 420 remain closed. The disassembly device 700 may be accessed through the endoscopic jaw channel. The first disassembly arm 701 and the second disassembly arm 702 of the disassembly device 700 may be spread close to the unlocking portion 512 of the clip 400 that is already in the locked state.

In some embodiments, deformation, or breakage, or displacement of the clip arms by force may cause the termination of the connection relationship between the locked portion 602 and the clip arms.

In some embodiments, the first clip arm 410 may be provided with a first bent portion 411 bent toward the second clip arm 420 at an end near the connecting pin 601, the first bent portion 411 and a mutually abutting end with the connecting pin 601 may be a first combination portion 411A. The second clip arm 420 near the end of the connecting pin 601 may be provided with a second bent portion 421 bent toward the first clip arm 410, the second bent portion 421 and a mutually abutting end with the connecting pin 601 may be a second combination portion 421A. In some embodiments, the first combination portion 411A and the second combination portion 421A may form a first connecting portion, and the clip 400 and the locked portion 602 may form a connection relationship through the first connecting portion. In some embodiments, the first combination portion 411A or the second combination portion 421A may form the first connecting portion, and the clip 400 and the locked portion 602 may form a connection relationship through the first connecting portion. In some embodiments, the first connecting portion may be a structure that forms the connecting hole 504 in the clip arms. In some embodiments, the first connecting portion may also be a structure that forms the pin fixing portions 603 on the clip arms.

In some embodiments, when the first connecting portion is subjected to a radial squeezing force toward the inside of the channel, deformation, or breakage, or displacement of the first connecting portion may cause the termination of the connection relationship between the clip and the locked portion. The first disassembly arm 701 and the second disassembly arm 702 may apply radially inward force to the first connecting portion (first combination portion 411A and/or second combination portion 421A) through the unlocking portion 512, and the first combination portion 411A and/or the second combination portion 421A may be deformed when they are subjected to the radially inward squeezing force, and the connection relationship between the proximal end of the clip 400 and the locked portion 602 may be released, the proximal end of the first clip arm 410 and the proximal end of the second clip arm 420 may move from the proximal end to the distal end relative to the connecting pin 601, and the clip 400 may be in the unlocked state, so that the distal end of the first clip arm 410 and the distal end of the second clip arm 420 move away from each other, i.e., the clip 400 is switched from the locked state to the unlocked state, and the clip 400 is able to open again. In some embodiments, the termination of the connection relationship may also include breakage, or displacement. In some embodiments, the first connecting portion may be a structure that forms the connecting hole 504 on the clip arms. The first connecting portion may be broken by force, the connecting hole 504 may be broken, and the connection relationship between the proximal end of the clip 400 and the connecting pin 601 (i.e., the locked portion 602) may be released. In some embodiments, the first connecting portion may be a structure forming the pin fixing portions 603 on the clip arms, and the displacement, or breakage, or deformation of the first connecting portion by force may make the pin fixing portions 603 unable to fix the connecting pin anymore, and the connection relationship between the proximal end of the clip 400 and the locked portion 602 may be released.

In some embodiments, the termination of the movement restriction of the locking portion 511 relative to the outer wall may cause the termination of the movement restriction of the storage tube 500 to the clip 400.

In some embodiments, referring to FIG. 62-FIG. 65, the storage tubes 500 may include a first storage tube 501 and a second storage tube 502, the second storage tube 502 may be provided inside the first storage tube 501 with the outer wall provided in the first storage tube 501 and the locking portion 511 may be provided in the second storage tube 502. The first storage tube 501 may be fixed relative to the second storage tube 502 when the clip 400 is in the locked state. When the clip 400 is switched from the locked state to the unlocked state, the first stowage tube 501 and the second stowage tube 502 may move relative to each other, so that the movement restriction of the locked portion 511 relative to the outer wall is released.

In some embodiments, the first storage tube 501 may be provided with a hook-up slot 530 and the second storage tube 502 may be provided with a hook-up portion 540, as shown in FIG. 62-FIG. 65. In some embodiments, the hook-up slot 530 and the hook-up portion 540 may form a second connecting portion, and the storage tube 500 and the locking portion 511 may form a connection relationship through the second connecting portion. In some embodiments, the hook-up slot 530 and the hook-up portion 540 may be connected with each other so that the first storage tube 501 and the second storage tube 502 are fixed relative to each other, and the hook-up portion 540 may be detached from the hook-up slot 530 so that the first storage tube 501 and the second storage tube 502 may move relative to each other.

In some embodiments, the second storage tube 502 may include a shrapnel 510, the shrapnel 510 may include a first end 510A at a distal end and a second end 510B at a proximal end. The first end 510A may cooperate with a second hook-up slot 532 to form the hook-up portion 540, and the second end 510B may extend inside a channel of the second storage tube 502 to form the locking portion 511.

In some embodiments, the hook-up slots 530 may include a first hook-up slot 531 and a second hook-up slot 532, and the hook-up portions 540 may include a first hook-up portion 541 and a second hook-up portion 542. In some embodiments, the first hook-up portion 541 and the second hook-up portion 542 may be the first end 510A and the second end 510B snap-fitted to the first hook-up slot 531 and the second hook-up slot 532, respectively.

In some embodiments, deformation, or breakage, or displacement of the first end 510A by force may cause the hook-up portion 540 to detach from the hook-up slot 530.

Figure 66:
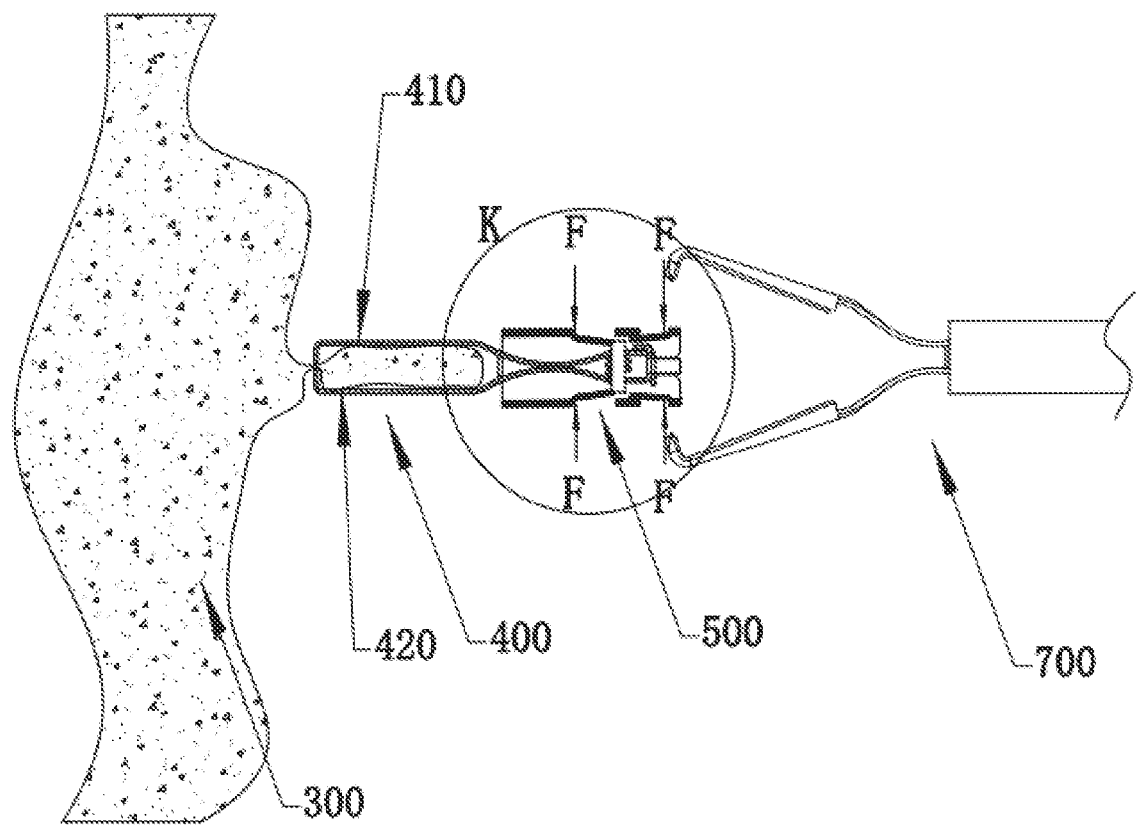
FIG. 66 is a schematic diagram IV illustrating a working process of a clip device according to some embodiments of the present disclosure.
Figure 67:
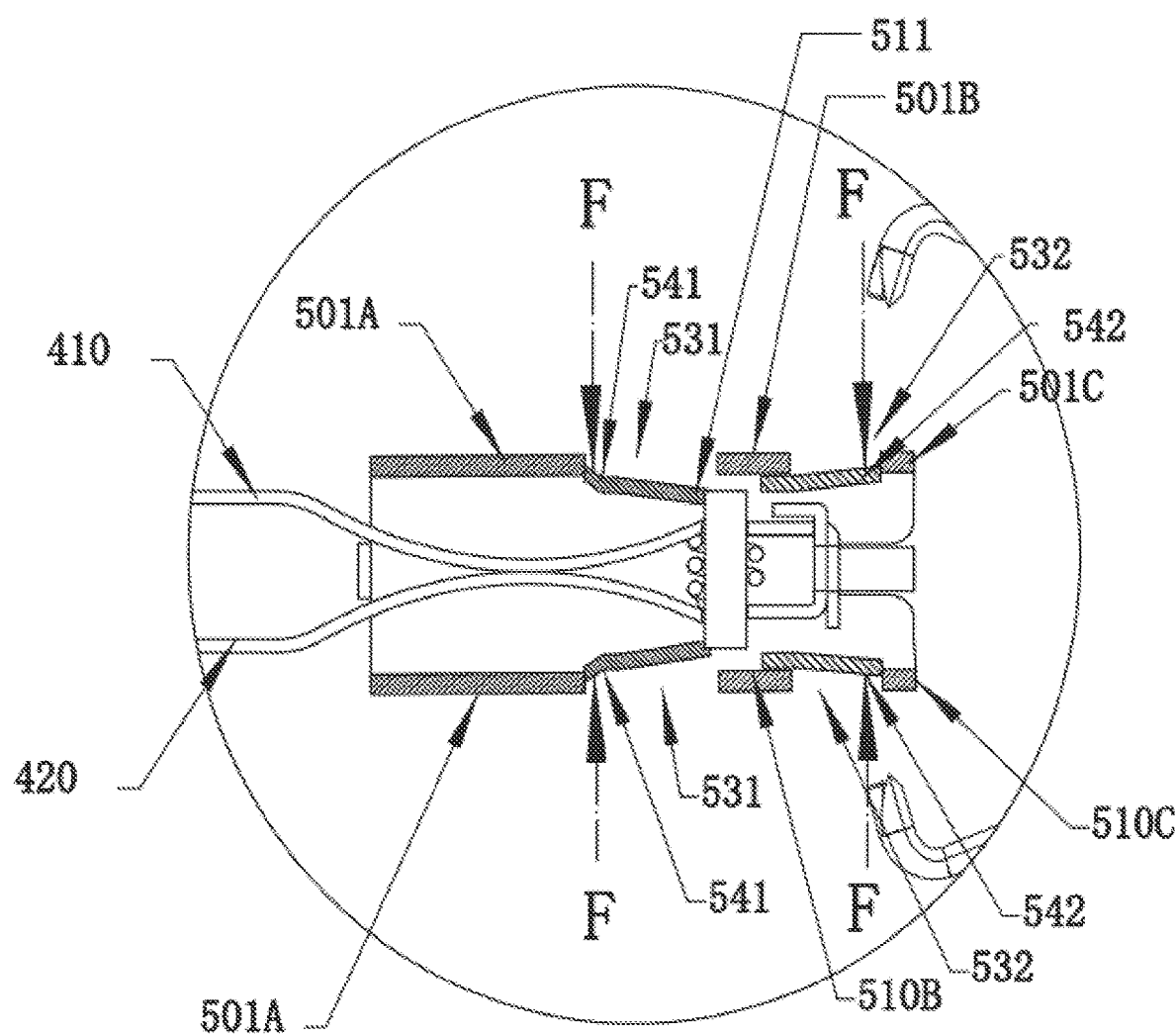
FIG. 67 is an enlarged view of partial K of FIG. 66.

As shown in FIG. 66-FIG. 67, in some embodiments, the clip 400 may be in the locked state, the first hook-up portion 541 of the second storage tube 502 may be hooked to the first hook-up slot 531 of the first storage tube 501, the second hook-up portion 542 of the second storage tube 502 may be hooked to the second hook-up slot 532 of the first storage tube 501, and the first storage tube 501 and the second storage tube 502 may be connected; and the locked portion 602 and the locking portion 511 may cooperate with each other, and the first clip arm 410 and the second clip arm 420 remain closed at the distal ends. In some embodiments, the locked portion 602 may be a connecting pin (e.g., the connecting pin 601 connecting the first clip arm 410 to the second clip arm 420, or, a connecting pin provided at a hinge point of the linkage structure 605). In some embodiments, the locked portion 602 may also be a protrusion provided on the proximal ends of the clip arms. The disassembly device 700 may be accessed through the endoscopic jaw channel. The first disassembly arm 701 and the second disassembly arm 702 of the disassembly device 700 may be spread out close to the second connecting portion of the clip 400 that is already in the locked state.

Figure 68:
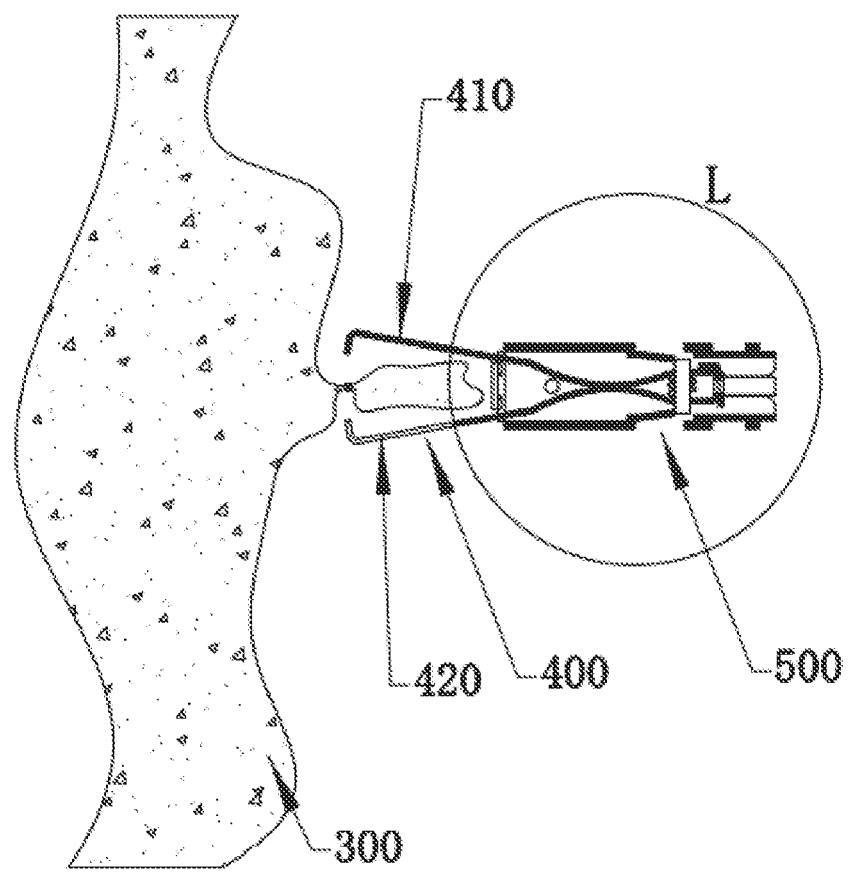
FIG. 68 is a schematic diagram V illustrating a working process of a clip device according to some embodiments of the present disclosure.
Figure 69:
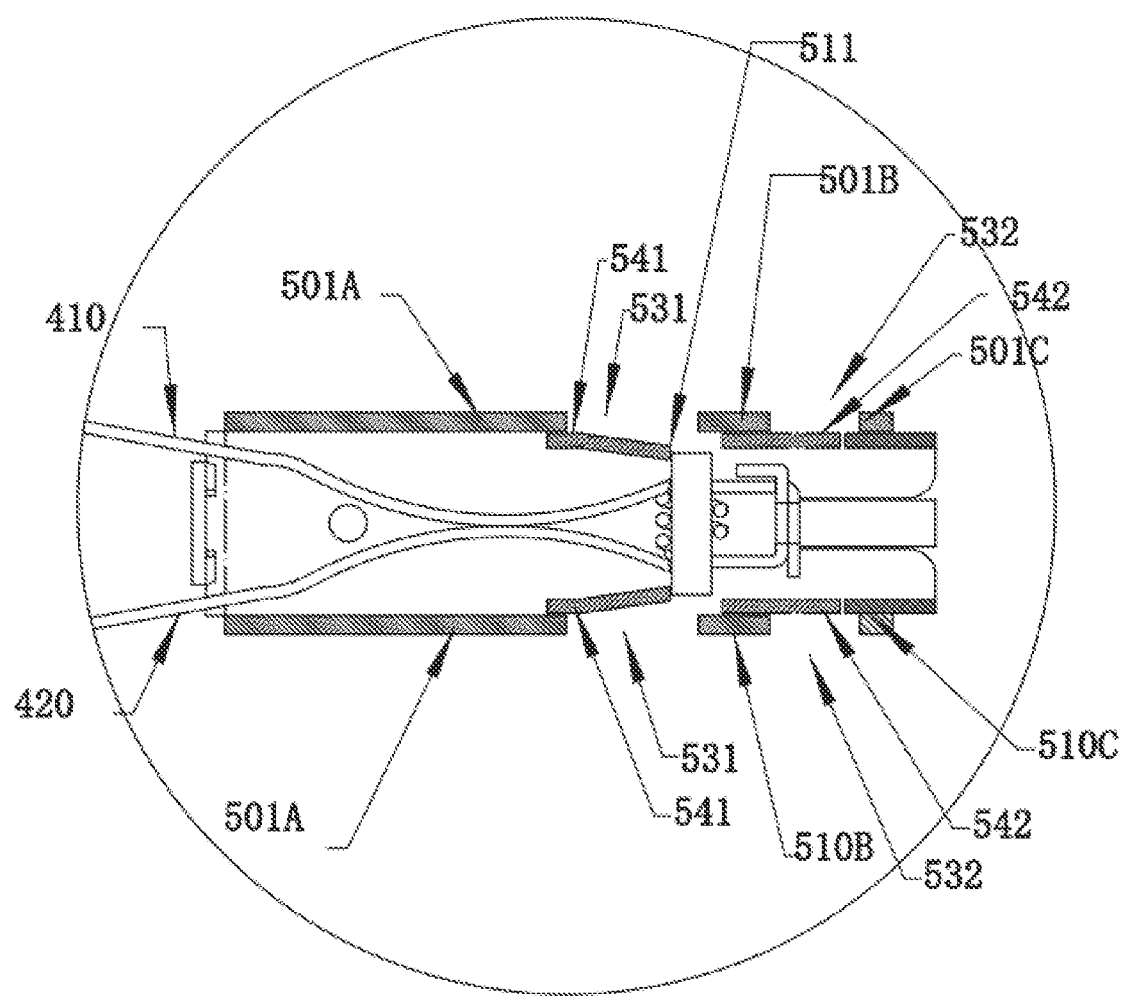
FIG. 69 is an enlarged view of partial L of FIG. 68.

As shown in FIG. 68-FIG. 69, in some embodiments, the clip 400 may be in the unlocked state and the first and second hook-up portions 541 and 542 may be deformed by the radially inward squeezing pressure on the shrapnel forming the hook-up portions. In some embodiments, when the first hook-up portion 541 is subjected to the radially inward squeezing force, termination of the snap-fit connection relationship between the first hook-up portion 541 and the first hook-up slot 531 of the first storage tube 501 may cause the termination of the movement restriction of the locking portion 511 relative to the outer wall of the storage tube 500. In some embodiments, when the first hook-up portion 541 and the second hook-up portion 542 are each subjected to the radially inward squeezing pressure, the first hook-up portion 541 and the second hook-up portion 542 may be released from the first hook-up slot 531 of the first storage tube 501 and the second hook-up slot 532 of the first storage tube 501, respectively, so that the movement restriction of the locking portion 511 relative to the outer wall of the storage tube 500 is released. In some embodiments, after the termination of the movement restriction of the locking portion 511 relative to the outer wall of the storage tube 500, the proximal end of the first clip arm 410 and the proximal end of the second clip arm 420 are able to move from the proximal end to the distal end relative to the storage tube 500, and the clip 400 is in the unlocked state, allowing the distal end of the first clip arm 410 and the distal end of the second clip arm 420 to move away from each other, i.e., the clip 400 may be re-opened. In some embodiments, the termination of the connection relationship may also include breakage, or displacement.

The present disclosure also provides a method for unlocking a clip device, the method for unlocking a clip device may be applied to the clip device 10 in any embodiment of the present disclosure. In some embodiments, the method for unlocking a clip device may comprise: operating a disassembly device (e.g., disassembly device 700) to provide a disassembly force to a clip in a locked state; applying the disassembly force to a locked portion to cause termination of a cooperation relationship between a locking portion and the locked portion to cause the clip to switch from the locked state to an unlocked state; or, applying the disassembly force to the locking portion to cause the termination of the cooperation relationship between the locking portion and the locked portion to cause the clip to switch from the locked state to the unlocked state; or, applying the disassembly force to clip arms of the clip to cause the termination of a connection relationship between the clip arms and the locked portion to cause the clip to switch from the locked state to the unlocked state; or, applying the disassembly force to a storage tube to move the locking portion toward a distal end relative to an outer wall of the storage tube to cause the clip to switch from the locked state to the unlocked state; when the clip is in the unlocked state, the distal ends of the clip arms open.

In some embodiments, after the clip is in a closed and locked state (with the clip in the first position), the clip may be unlocked by disassembling the device and reopening the clip arms of the clip device (e.g., first clip arm 410 and second clip arm 420). In some embodiments, the disassembly device 700 may be moved through the endoscopic jaw channel to the clip device to apply the disassembly force to the clip device. In some embodiments, the disassembly device 700 may include, but is not limited to, a biopsy forceps, or a trap, or an energy instrument, or other specialized disassembly device, etc.

In some embodiments, the disassembly device 700 may apply a disassembly force to the locked portion to deform, or break, or displace the locked portion so that the cooperation relationship between the locking portion and the locked portion is released and the clip is switched from the locked state to the unlocked state.

In some embodiments, the locked portion may be a connecting pin 601 provided in the clip 400. In some embodiments, referring to FIG. 28, the clip 400 includes a connecting pin 601, which may be deformed along its own axial direction to change a length of the connecting pin 601 along its own axial direction, with one or both ends of the connecting pin 601 forming the locked portion 602. In some embodiments, the locking portion 511 may include a shrapnel, or a recess, or a locking slot 560 provided on the storage tube 500. Both ends of the connecting pin 601 may cooperate with the locking portion 511 to keep the clip 400 in the locked state. In some embodiments, the connecting pin 601 may include movable ends provided at both ends of the connecting pin 601 and a spring 604 connecting the movable ends, and the movable ends may be compressed by force along the axis direction of the connecting pin 601 (or the radial direction of the storage tube 500) to compress the spring 604 so that a dimension of the connecting pin 601 along the radial direction of the storage tube 500 is less than a distance of the locking portion 511 (e.g., a distance between two second ends 510B, or, a distance between two recesses). For more information about the construction details of the connecting pin 601, please refer to the description elsewhere in the present disclosure.

In some embodiments, the locked portion may be a protrusion provided on the clip 400. In some embodiments, as shown in FIG. 35-FIG. 36, the storage tube 500 may be provided with a locking slot 560, and the locking slot 560 may form the locking portion 511. In some embodiments, the first clip arm 410 and the second clip arm 420 may be provided with a first protrusion 461 and a second protrusion 462, with the first protrusion 461 and the second protrusion 462 forming the locked portion 602. As shown in FIG. 42, the locking slot 560 (locking portion 511) may cooperate with the first protrusion 461 and the second protrusion 462 (locked portion 602) so that the storage tube 500 restricts the movement of the clip 400 toward the distal end relative to the outer wall of the storage tube 500 and the clip 400 is in the locked state. For more information about the construction details of the protrusions, please refer to the descriptions elsewhere in the present disclosure.

In some embodiments, the locked portion 602 may include an elastic blocking member 450 and the locking portion 511 may include a pin 550 provided in the storage tube 500. The elastic blocking member 450 may cooperate with the pin 550 to keep the clip 400 in the locked state.

In some embodiments, the disassembly device may apply a disassembly force directly to the locked portion to deform, or break, or displace the locked portion to cause the termination of the cooperation relationship between the locked portion and the locking portion, and the clip may be switched from the locked state to the unlocked state. The disassembly device may apply the disassembly force to the locked portion 602 through the endoscope clamp channel approaching the clip device.

In some embodiments, as shown in FIG. 31-FIG. 32, the first disassembly arm 701 and the second disassembly arm 702 of the disassembly device 700 may exert radially inward force on the locked portion 602 (e.g., the movable ends of the connecting pins 601), and the spring 604 interlocked with the locked portion 602 may undergo radial inward contraction when subjected to radial inward squeezing pressure, i.e., a radial distance of the locked portion 602 becomes smaller. The radial distance D2 of the locked portion 602 may be smaller than the distance H of the locking portion 511, the locked portion 602 may be detached from the locking portion 511, and the clip 400 may be switched from the locked state to the unlocked state.

In some embodiments, the first disassembly arm 701 and the second disassembly arm 702 of the disassembly device 700 may apply a radially inward disassembly force to the first protrusion 461 and the second protrusion 462, respectively, along the radially inward disassembly force of the storage tube 500, and the first protrusion 461 and the second protrusion 462 (the locked portion 602) may be deflected by the squeezing effect of the radially inward disassembly force and detached from the locking slot 560, so that the locking slot 560 (the locking portion 511) and the first protrusion 461 and the second protrusion 462 (the locked portion) are released from the mutual cooperation relationship, the movement restriction of the storage tube 500 on the clip is released, and the clip 400 is in the unlocked state.

In some embodiments, the disassembly device 700 may be combined with the elastic blocking member 450 and apply to the elastic blocking member 450 a disassembly force that causes the elastic blocking member 450 to move along the axial direction of the storage tube 500, such that a cooperation relationship between the elastic blocking member 450 and the pin 550 is released, the movement restriction of the storage tube 500 on the clip is released, and the clip 400 is in the unlocked state.

In some embodiments, the clip device may further include an unlocking portion 512, and the disassembly device may apply a disassembly force to the locked portion through the unlocking portion 512. In some embodiments, the unlocking portion 512 may be provided in the storage tube 500. In some embodiments, the storage tubes 500 may include a first storage tube 501 and a second storage tube 502, and the unlocking portion 512 may be provided in the first storage tube 501.

In some embodiments, referring to FIGS. 49 and 50, the disassembly device 700 (e.g., a captive device) may sleeve the unlocking portion 512 (e.g., shrapnel 510) at the wall of the storage tube 500, apply a disassembly force radially inward, deflect the unlocking portion 512 (shrapnel 510) radially inward, and the docking portion 573 of the unlocking portion 512 (shrapnel 510) enters the locking slot 560 (locking portion 511), i.e., the unlocking portion 512 (shrapnel 510) is deflected radially inward into the locking slot 560 (locking portion 511). That is, the unlocking portion 512

(shrapnel 510) is deflected radially inward into the locking slot 560 (locking portion 511), and the locked portion 602, which is interlocked with the docking portion 573, is subjected to a radially inward force that causes the locked portion 602 to be deflected radially inward or compressed radially inward. The locked portion 602 is released from the locking slot 560 (locking portion 511), and the cooperation relationship between the locked portion 602 and the locking slot 560 (locking portion 511) is released, and the clip arms re-opens the distal end of the first clip arm 410 and the distal end of the second clip arm 420 due to its own elasticity, and then the clip device left at the lesion is separated from the tissue 300. In some embodiments, if the storage tube 500 is not provided with the unlocking portion 512, an axial distance of the locking slot 560 may be generally 0.5 mm, and the disassembly device 700 needs to be extended into the locking slot 560 to act on the locked portion 602 to unlock it, which is more difficult to operate. In some embodiments, when the storage tube 500 includes the unlocking portion 512, the axial distance of the unlocking portion 512 (shrapnel 510) may be 2 mm to 10 mm, and only the disassembly force of the disassembly device 700 needs to be applied to the unlocking portion 512 (shrapnel 510) located at the wall of the storage tube 500, thereby increasing the area of the disassembly force of the disassembly device 700. At the same time, because the unlocking portion 512 deflects radially outward relative to the storage tube 500 axially when the clip is in the first position, i.e., the unlocking portion 512 may partially protrude from the surface of the storage tube 500, which is more suitable for the disassembly device 700 (especially the captive device) to pick up the unlocking portion 512 (shrapnel 510) and apply the disassembly force radially outward, thus reducing the difficulty of disassembly and improving the success rate of disassembly.

In some embodiments, the disassembly device 700 may apply a disassembly force to the locking portion to deform, or break, or displace the locking portion so that the cooperation relationship between the locking portion and the locked portion is released and the clip is switched from the locked state to the unlocked state.

In some embodiments, referring to FIG. 22-FIG. 23, the locking portion may include a shrapnel 510 provided in the storage tube 500, and the shrapnel 510 may include a first end 510A, a second end 510B, and a third end 510C, the second end 510B located proximal to the shrapnel 510 forming the locking portion 511.

In some embodiments, the first disassembly arm 701 and the second disassembly arm 702 of the disassembly device 700 may be spread close to the clip 400 that is already in the locked state and apply a disassembly force to the unlocking portion 512 (i.e., the third end 510C located distal to the shrapnel 510). Under the action of disassembly force, the first disassembly arm 701 and the second disassembly arm 702 may apply force radially inward to the third end 510C (unlocking portion 512), and the third end 510C may be switched from the state of extending outside the channel of the storage tube 500 to the state of extending inside the channel of the storage tube 500, thus driving the second end 510B to be displaced radially outward, i.e., the second end 510B is switched from the state of extending inside the channel of the storage tube 500 to the state of extending outside the channel of the storage tube 500, so that the cooperation relationship between the locked portion 511 and the locked portion 602 is released and the clip 400 is in the unlocked state.

In some embodiments, the locked portion 602 may include an elastic blocking member 450 and the locking portion 511 may include a pin 550 provided in the storage tube 500. The elastic blocking member 450 may cooperate with the pin 550 to keep the clip 400 in the locked state. In some embodiments, the pin 550 may be connected with the storage tube 500 through the connecting hole 504. In some embodiments, the pin 550 may be compressed along the radial direction of the storage tube 500.

In some embodiments, as shown in FIGS. 56 to 57, the pin 550 may be provided with a spring inside the storage tube, and the disassembly device may apply a disassembly force to both ends of the pin 550, and the pin 550 may be radially contracted by the radial inward squeezing force, and the pin 550 may be detached from the connecting hole 504, i.e., the pin 550 is detached from the storage tube 500, and the connection relationship between the pin 550 (locking portion) and the storage tube 500 is released, then the pin 550 no longer forms a movement obstruction to the elastic blocking member 450, and the clip 400 is in the unlocked state.

In some embodiments, the disassembly device 700 may apply a disassembly force to the clip arms to deform, or break, or displace the clip arms so that the connection relationship between the clip arms and the locked portion is released and the clip is switched from the locked state to the unlocked state.

In some embodiments, the clip 400 and the locked portion 602 may form a connection relationship via a first connecting portion (e.g., the first combination portion 411A and/or the second combination portion 421A). In some embodiments, the first connecting portion may be a structure that forms the connecting hole 504 in the clip arms. In some embodiments, the first connecting portion may also be a structure that forms the pin fixing portions 603 on the clip arms. For more information about the first connecting portion, please refer to the description elsewhere in the present disclosure.

In some embodiments, when the first connecting portion is subjected to a radial squeezing force toward the inside of the channel, the first connecting portion may be deformed, or broken, or displaced, and the connection relationship between the clip and the locked portion may be released. The first disassembly arm 701 and the second disassembly arm 702 of the disassembly device 700 may apply radially inward force to the first connecting portion (first combination portion 411A and/or second combination portion 421A) through the unlocking portion 512, and the first combination portion 411A and/or the second combination portion 421A may be deformed when they are squeezed radially inward, and the connection relationship between the proximal end of the clip 400 and the locked portion 602 may be released, and the proximal end of the first clip arm 410 and the proximal end of the second clip arm 420 may move from the proximal end to the distal end relative to the connecting pin 601, and the clip 400 may be in the unlocked state.

In some embodiments, the disassembly device 700 may apply a disassembly force to the storage tube, causing the locking portion to move toward the distal end relative to the outer wall of the storage tube and the clip to switch from the locked state to the unlocked state.

In some embodiments, the storage tubes 500 may include a first storage tube 501 and a second storage tube 502 provided inside the first storage tube 501, and the locking portion 511 may be provided the second storage tube 502. In some embodiments, as shown in FIG. 66-FIG. 67, in some embodiments, the clip 400 may be in the locked state, the first hook-up portion 541 of the second storage tube 502 may be hooked to the first hook-up slot 531 of the first storage tube 501, the second hook-up portion 542 of the second storage tube 502 may be hooked to the second hook-up slot 532 of the first storage tube 501, and the first storage tube 501 and the second storage tube 502 may be connected; and the locked portion 602 and the locking portion 511 may cooperate with each other, and the first clip arm 410 and the second clip arm 420 remain closed at the distal end.

In some embodiments, as shown in FIGS. 68-69, the first disassembly arm 701 and the second disassembly arm 702 of the disassembly device 700 may apply a disassembly force to the first hook-up portion 541 and the second hook-up portion 542, and the first hook-up portion 541 and the second hook-up portion 542 may be subjected to radial inward squeezing force (i.e., disassembly force) when the shrapnel forming the hook-up portion is deformed. In some embodiments, when the first hook-up portion 541 is subjected to radial inward squeezing pressure, the snap-fit connection relationship between the first hook-up portion 541 and the first hook-up slot 531 of the first storage tube 501 may be released, so that the movement restriction of the locking portion 511 relative to the outer wall of the storage tube 500 is released. In some embodiments, when the first hook-up portion 541 and the second hook-up portion 542 are each subjected to radially inward squeezing pressure, the first hook-up portion 541 and the second hook-up portion 542 may be released from the first hook-up slot 531 of the first storage tube 501 and the second hook-up slot 532 of the first storage tube 501, respectively, so that the movement restriction of the locking portion 511 relative to the outer wall of the storage tube 500 is released. In some embodiments, after the movement restriction of the locking portion 511 relative to the outer wall of the storage tube 500 is released, the proximal end of the first clip arm 410 and the proximal end of the second clip arm 420 are able to undergo movement from the proximal to the distal end relative to the storage tube 500, and the clip 400 is in the unlocked state.

In some embodiments, the distal ends of the clip arms of the clip may be opened after the clip is switched from the locked to the unlocked state.

By the clip device, the delivery device and the method for unlocking a clip device involved in some embodiments of the present disclosure, it is possible to unlock and disassemble the clip after it has been closed and locked, avoiding damage to the tissue held by the clip; by applying disassembly forces to the locked portions of different structures by the disassembly device, the difficulty of disassembly can be reduced and the success rate of disassembly can be increased; in addition, the shrapnel and the storage tube can be fixedly connected, simplifying the clip structure and making it easy to produce.

The basic concepts have been described above, and it is clear that the above detailed disclosure serves only as an example to those skilled in the art and does not constitute a limitation of the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "an embodiment", "one embodiment", and/or "some embodiments" means a feature, structure, or characteristic associated with at least one embodiment of the present disclosure. Therefore, it should be emphasized and noted that "one embodiment" or "an embodiment" or "an alternative embodiment" mentioned twice or more in different places in the present disclosure does not necessarily refer to the same embodiment. In addition, some features, structures, or features in the present disclosure of one or more embodiments may be appropriately combined.

In addition, unless expressly stated in the claims, the order of processing elements and sequences, the use of numeric letters, or the use of other names as described in the present disclosure are not intended to qualify the order of the processes and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some embodiments use numbers describing the number of components, attributes, and it should be understood that such numbers used in the description of the embodiment are modified in some examples by the modifier "about," "approximately," or "substantially". Unless otherwise stated, "about", "approximately" or "substantially" indicates that ±20% variation is allowed in the stated figures. Accordingly, in some embodiments, the numerical parameters used in the present disclosure and claims are approximations, which can change depending on the desired characteristics of individual embodiments. In some embodiments, the numerical parameters should take into account the specified number of valid digits and use the general bit retention method. Although the numerical fields and parameters used to confirm the breadth of their ranges in some embodiments of the present disclosure are approximate, in specific embodiments such values are set as precisely as practicable.

For each patent, patent application, patent application disclosure and other materials, such as articles, books, specifications, publications, documents, etc., cited in the present disclosure, the entire contents of which are hereby incorporated by reference into the present disclosure. Except for documents in the history of the application that are inconsistent with or conflict with the contents of the present disclosure, and except for documents (currently or subsequently attached to the present disclosure) that limit the broadest scope of the claims of the present disclosure. It should be noted that in the event of any inconsistency or conflict between the descriptions, definitions, and/or use of terms in the subsidiary materials of this application and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A clip device, comprising:
a clip and a storage tube, the clip including clip arms, the clip arms including a first clip arm and a second clip arm, a distal end of the first clip arm and a distal end of the second clip arm being for ligation;
the storage tube including an outer wall and a channel surrounded by the outer wall, a proximal end of the first clip arm and a proximal end of the second clip arm being stowable within the channel;
the clip further including a locked portion, the locked portion being connected with the clip arms: the storage tube further including a locking portion, the locking portion being restricted in movement relative to the outer wall toward the distal end of the first clip arm and the distal end of the second clip arm;
wherein in the locked state, the distal end of the first clip arm and the distal end of the second clip arm are closed and the locking portion cooperates with the locked portion to cause the storage tube to restrict a movement of the clip relative to the storage tube toward the distal end of the first clip arm and the distal end of the second clip arm; when a disassembly force is applied to the clamp device in a predetermined manner, a movement restriction of the clip by the storage tube is released and the clip is switched from the locked state to the unlocked state, the distal end of the first clip arm and the distal end of the second clip arm are able to be reopened, wherein the predetermined manner comprises:
applying the disassembly force to the locking portion to release the cooperation relationship between the locking portion and the locked portion; or
applying the disassembly force to the clip arms of the clip to release the connection relationship between the clip arms and the locked portion; or
applying the disassembly force to the storage tube to release the movement restriction of the locking portion relative to the outer wall.

2. The clip device of claim 1, wherein deformation, breakage, or displacement of the locking portion by the disassembly force cause the termination of the cooperation relationship between the locking portion and the locked portion.

3. The clip device of claim 2, wherein the locking portion includes a shrapnel, the shrapnel including a first end, a second end, and a third end, the first end being connected with the outer wall of the storage tube, the second end being provided at a proximal end of the first end, the third end being provided at a distal end of the first end, the second end forming the locking portion.

4. The clip device of claim 3, wherein when the clip is in the locked state, the second end extends inside the channel and the third end extends outside the outer wall; and when the clip is switched from the locked state to the unlocked state, the second end extends outside the outer wall and the third end extends inside the channel.

5. The clip device of claim 2, wherein the locking portion includes a pin provided in the storage tube, the pin running in the radial direction of the storage tube through the storage tube; the clip arms includes a sliding slot, the sliding slot being slidably connected with the pin; the locked portion includes an elastic blocking member provided in a path of the sliding slot.

6. The device of claim 5, wherein the pin is forced to compress in the radial direction of the storage tube away from the storage tube to cause the termination of the cooperation relationship between the locked portion and the locked portion.

7. The clip device of claim 1, wherein the clip includes a connecting pin, the connecting pin being connected with the clip arms, one end or both ends of the connecting pin constituting the locked portion; compression of the connecting pin by a force in a radial direction of the storage tube cause the termination of the cooperation relationship between the locking portion and the locked portion.

8. The clip device of claim 7, wherein the connecting pin includes a movable end and a spring connected with the movable end, the movable end being forced to compress the spring in the radial direction of the storage device such that a radial dimension of the connecting pin is less than a distance of the locking portion.

9. The clip device of claim 1, wherein the clip includes a tie rod and a linkage structure, the linkage structure being connected with the proximal end of the clip arms, the tie rod being connected with a proximal end of the linkage structure; the linkage structure driving the clip arms to close when the tie rod drives the linkage structure to move from the distal ends of the clip arms to the proximal ends of the clip arms.

10. The clip device of claim 9, wherein the locked portion is provided at the proximal end of the linkage structure.

11. The clip device of claim 1, wherein deformation, breakage or displacement of the clip arms by the disassembly force cause the termination of the connection relationship between the locked portion and the clip arms.

12. The clip device of claim 11, wherein the clip includes a connecting pin, the first clip arm and the second clip arm being connected by the connecting pin or a proximal end of the first clip arm and a proximal end of the second clip arm forming an accommodation space, the connecting pin extending in the radial direction of the storage tube through the accommodation space, one end of the connecting pin forming the locked portion, or both ends of the connecting pin forming the locked portion.

13. The clip device of claim 12, wherein a portion of the clip arms disposed on a proximal side of the connecting pin constitutes a first connecting portion, the clip and the locked portion forming a connection relationship through the first connecting portion; deformation, breakage or displacement of the first connecting portion by a radial squeezing force toward an inside of the channel to which the first connecting portion is subjected cause the termination of the connection relationship between the clip and the locked portion.

14. The clip device of claim 1, wherein the storage tubes include a first storage tube and a second storage tube, the second storage tube being provided inside the first storage tube, the outer wall being provided on the first storage tube, and the locking portion being provided on the second storage tube;
the first storage tube being fixed relative to the second storage tube when the clip is in the locked state;
the disassembly force applied to the second storage tube is able to cause the first storage tube to be movable relative to the second storage tube, which release the movement restriction of the locking portion relative to the outer wall.

15. The clip device of claim 14, wherein the first storage tube is provided with a hook-up slot and the second storage tube is provided with a hook-up portion; the hook-up slot and the hook-up portion are mutually hooked up such that the first storage tube is fixed relative to the second storage tube; the hook-up portion is detached from the hook-up slot such that the first storage tube is movable relative to the second storage tube.

16. The clip device of claim 15, wherein the second storage tube includes shrapnel, the shrapnel including a first end and a second end; the first end constituting the hook-up portion; the second end extending inside the second storage tube channel and constituting the locking portion.

17. The clip device of claim 16, wherein deformation, breakage or displacement of the first shrapnel end by a force cause the hook-up portion to detach from the hook-up slot.

18. A clip apparatus, comprising a clip device and a delivery device connected with the clip device; the delivery device being configured to deliver the clip device to a target region for performing a specified operation;

wherein the delivery device includes an operating portion, the operating portion being capable of driving the clip device to perform the specified operation; the delivery device being detachably connected with the clip device; and the clip device, comprising:

a clip and a storage tube, the clip including clip arms, the clip arms including a first clip arm and a second clip arm, a distal end of the first clip arm and a distal end of the second clip arm being for ligation;

the storage tube including an outer wall and a channel surrounded by the outer wall, a proximal end of the first clip arm and a proximal end of the second clip arm being stowable within the channel;

the clip including a locked portion, the locked portion being connected with the clip arms; the storage tube including a locking portion, the locking portion being restricted in movement relative to the outer wall toward the distal end of the first clip arm and the distal end of the second clip arm;

wherein in the locked state, the distal end of the first clip arm and the distal end of the second clip arm are closed and the locking portion cooperates with the locked portion to cause the storage tube to restrict a movement of the clip relative to the storage tube toward the distal end of the first clip arm and the distal end of the second clip arm; when a disassembly force is applied to the clamp device in a predetermined manner, a movement restriction of the clip by the storage tube is released and the clip is switched from the locked state to the unlocked state, the distal end of the first clip arm and the distal end of the second clip arm are able to be reopened, wherein the predetermined manner comprises:

applying the disassembly force to the locking portion to release the cooperation relationship between the locking portion and the locked portion; or applying the disassembly force to the clip arms of the clip to release the connection relationship between the clip arms and the locked portion; or applying the disassembly force to the storage tube to release the movement restriction of the locking portion relative to the outer wall.

19. The clip apparatus of claim 18, wherein the clip device includes a clip, the clip including a locked state and an unlocked state; the clip apparatus further includes a disassembly device used to switch the clip from the locked state to the unlocked state.

20. A method for unlocking of a clip device, wherein the clip device includes a clip and a storage tube, the clip including a locked portion, the storage tube including a locking portion, the locking portion cooperating with the locked portion to keep the clip in a locked state and a clip arm of the clip being closed; the method comprises:

operating a disassembly device to provide a disassembly force to the clip in the locked state;

applying the disassembly force to the locked portion to release a cooperation relationship between the locked portion and the locked portion to cause the clip to switch from the locked state to an unlocked state; or applying the disassembly force to the locking portion to release the cooperation relationship between the locking portion and the locked portion to cause the clip to switch from the locked state to the unlocked state; or applying the disassembly force to the clip arms of the clip to release a connection relationship between the clip arms and the locked portion to cause the clip to switch from the locked state to the unlocked state; or applying the disassembly force to the storage tube such that the locking portion moves toward distal ends of the clip arms relative to the outer wall of the storage tube, causing the clip to switch from the locked state to the unlocked state;

wherein when the clip is in the unlocked state, the clip arms are open at the distal ends.

* * * * *